(12) United States Patent
Shinohara et al.

(10) Patent No.: US 8,526,117 B2
(45) Date of Patent: Sep. 3, 2013

(54) ZOOM LENS AND IMAGE PICKUP APPARATUS EQUIPPED WITH ZOOM LENS

(75) Inventors: Kenji Shinohara, Utsunomiya (JP);
Akihisa Horiuchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/540,425

(22) Filed: Jul. 2, 2012

(65) Prior Publication Data

US 2013/0010174 A1 Jan. 10, 2013

(30) Foreign Application Priority Data

Jul. 6, 2011 (JP) .................................. 2011-149734

(51) Int. Cl.
*G02B 15/14* (2006.01)

(52) U.S. Cl.
USPC ........... 359/683; 359/684; 359/685; 359/686; 359/714; 359/740; 359/763; 359/766

(58) Field of Classification Search
USPC .................. 359/683–686, 714, 740, 763, 766
See application file for complete search history.

(56) References Cited

U.S. PATENT DOCUMENTS

| | | | |
|---|---|---|---|
| 5,388,004 A | 2/1995 | Adachi | |
| 5,583,701 A * | 12/1996 | Yamanashi | 359/695 |
| 7,253,961 B2 | 8/2007 | Miyazawa | |
| 7,408,720 B2 * | 8/2008 | Ito et al. | 359/687 |
| 7,894,135 B2 | 2/2011 | Nanba | |
| 2009/0251782 A1* | 10/2009 | Nanba | 359/557 |
| 2011/0032625 A1* | 2/2011 | Saito | 359/683 |
| 2011/0157720 A1* | 6/2011 | Katsuragi | 359/684 |

* cited by examiner

*Primary Examiner* — Evelyn A. Lester
(74) *Attorney, Agent, or Firm* — Canon USA Inc IP Division

(57) ABSTRACT

A zoom lens including first to fifth lens units in order from an object side toward an image. The refractive powers of the first to the fifth lens units are positive, negative, positive, negative and positive, respectively. The distance between the first and the second lens units is increased at the time of zooming from the wide angle end to the telephoto end, and the distance between the second and the third lens unit is decreased at the time of zooming from the wide angle end to the telephoto end. The first lens unit and the fourth lens unit are fixed for the zooming. When M2 and M3 are the amounts of movement of the second lens unit and the third lens unit at the time of zooming from the wide angle end to the telephoto end, respectively, the conditional expression; 0.2<|M2/M3|<5.0 is satisfied.

17 Claims, 41 Drawing Sheets

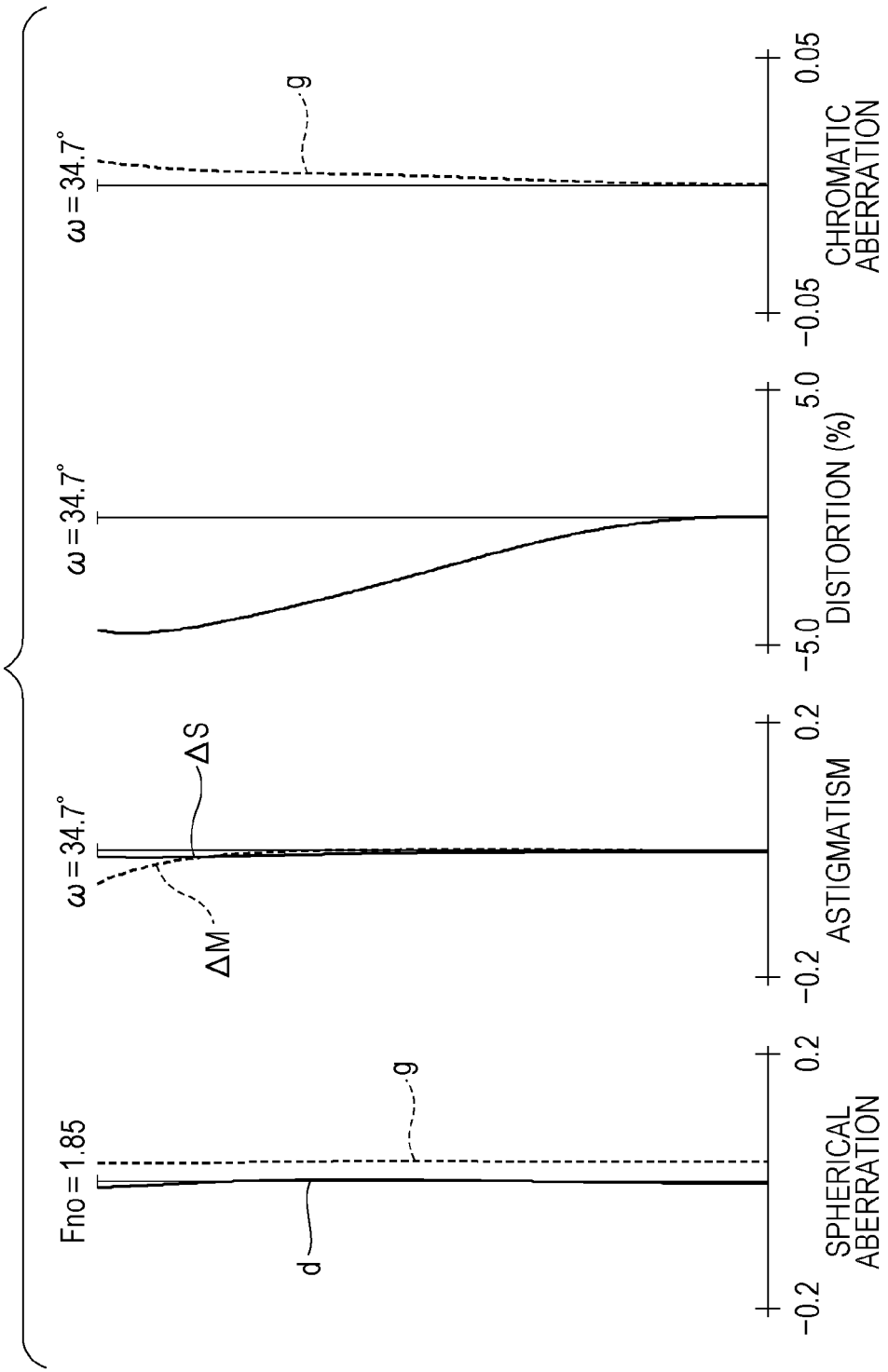

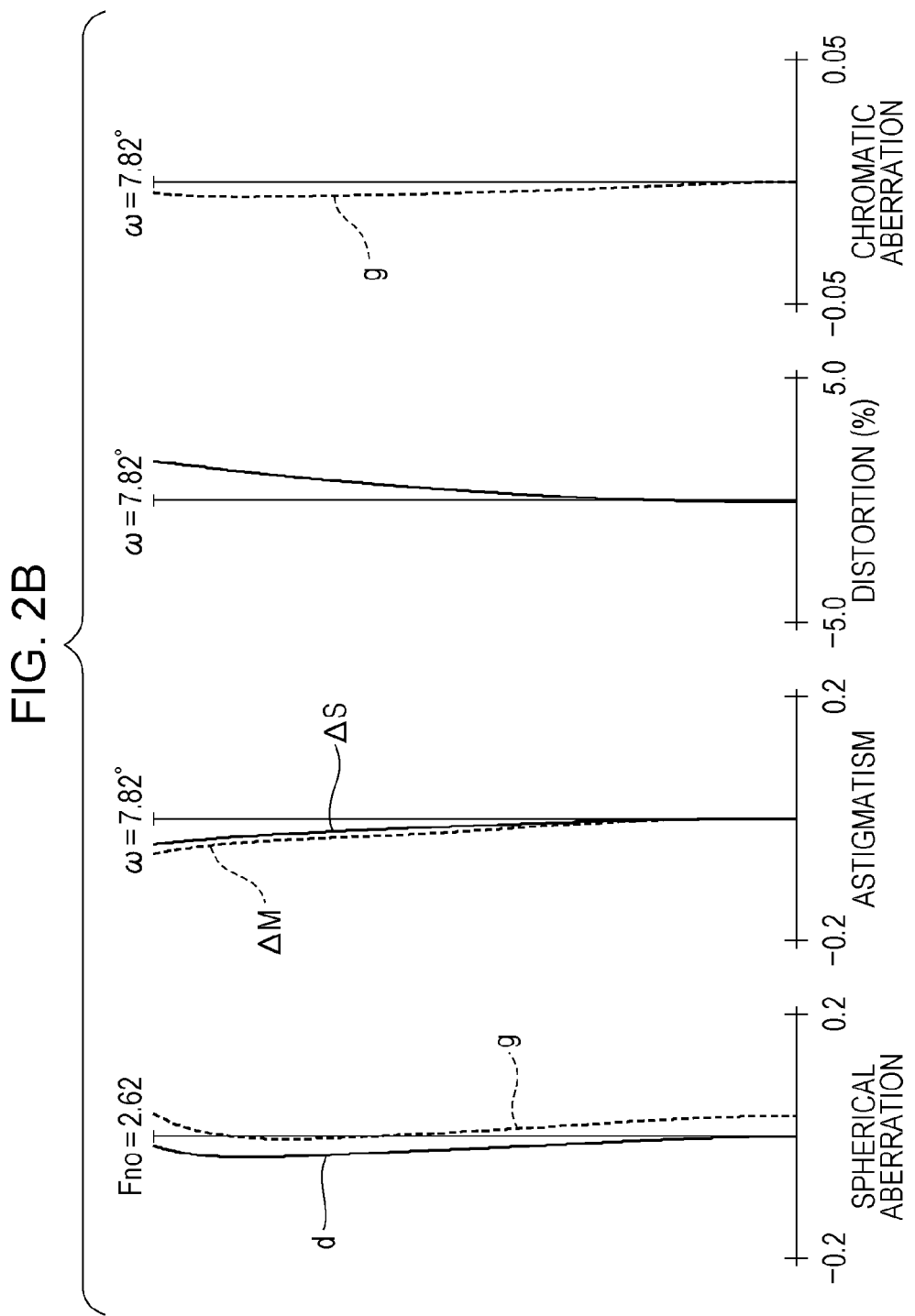

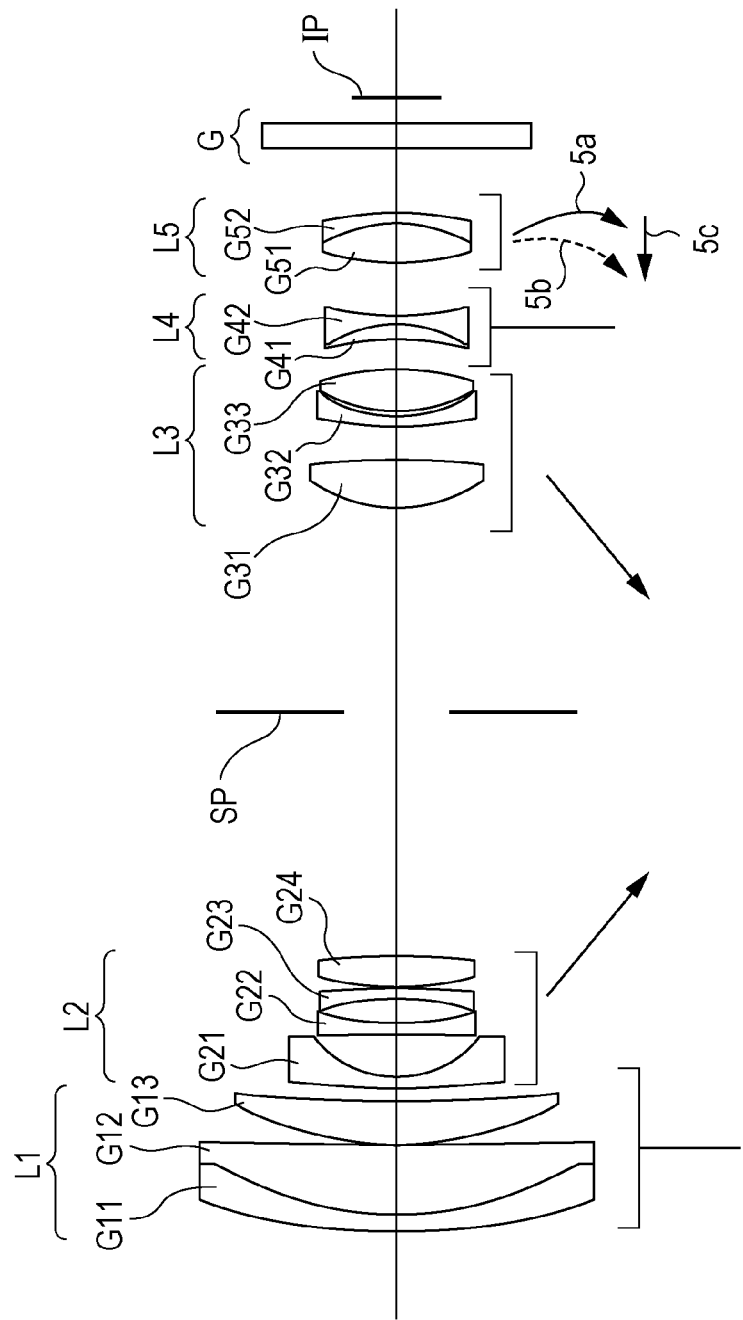

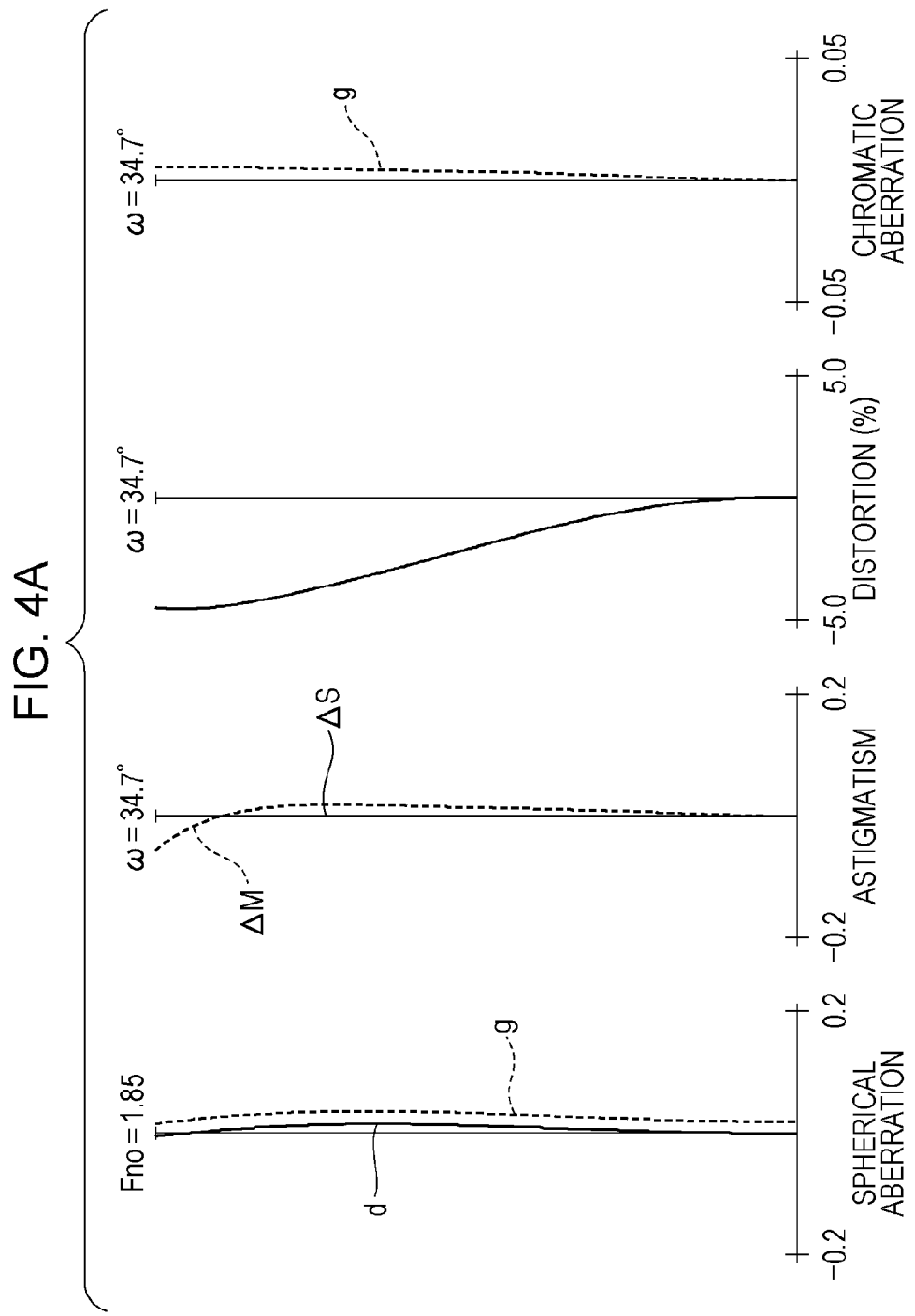

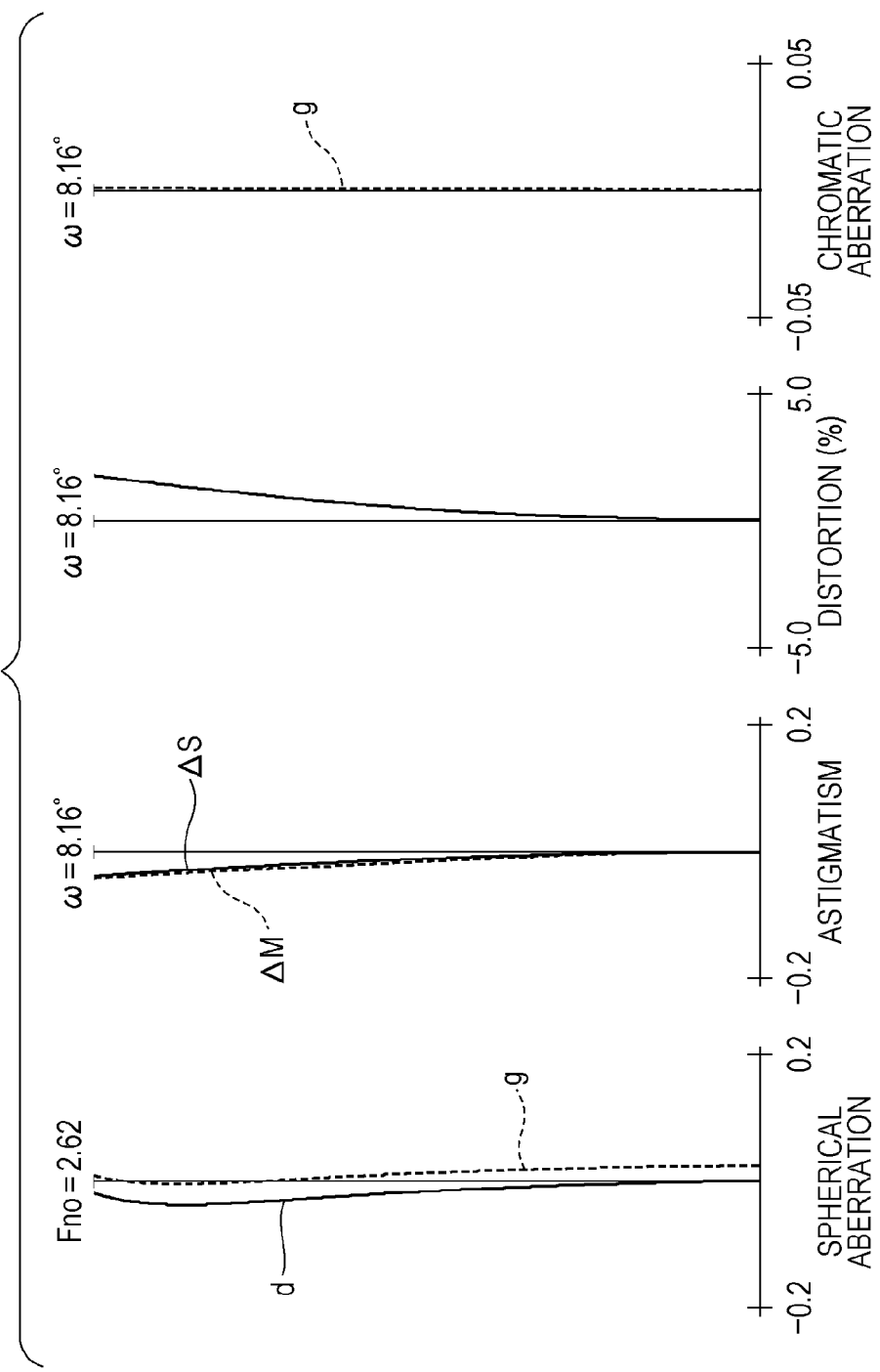

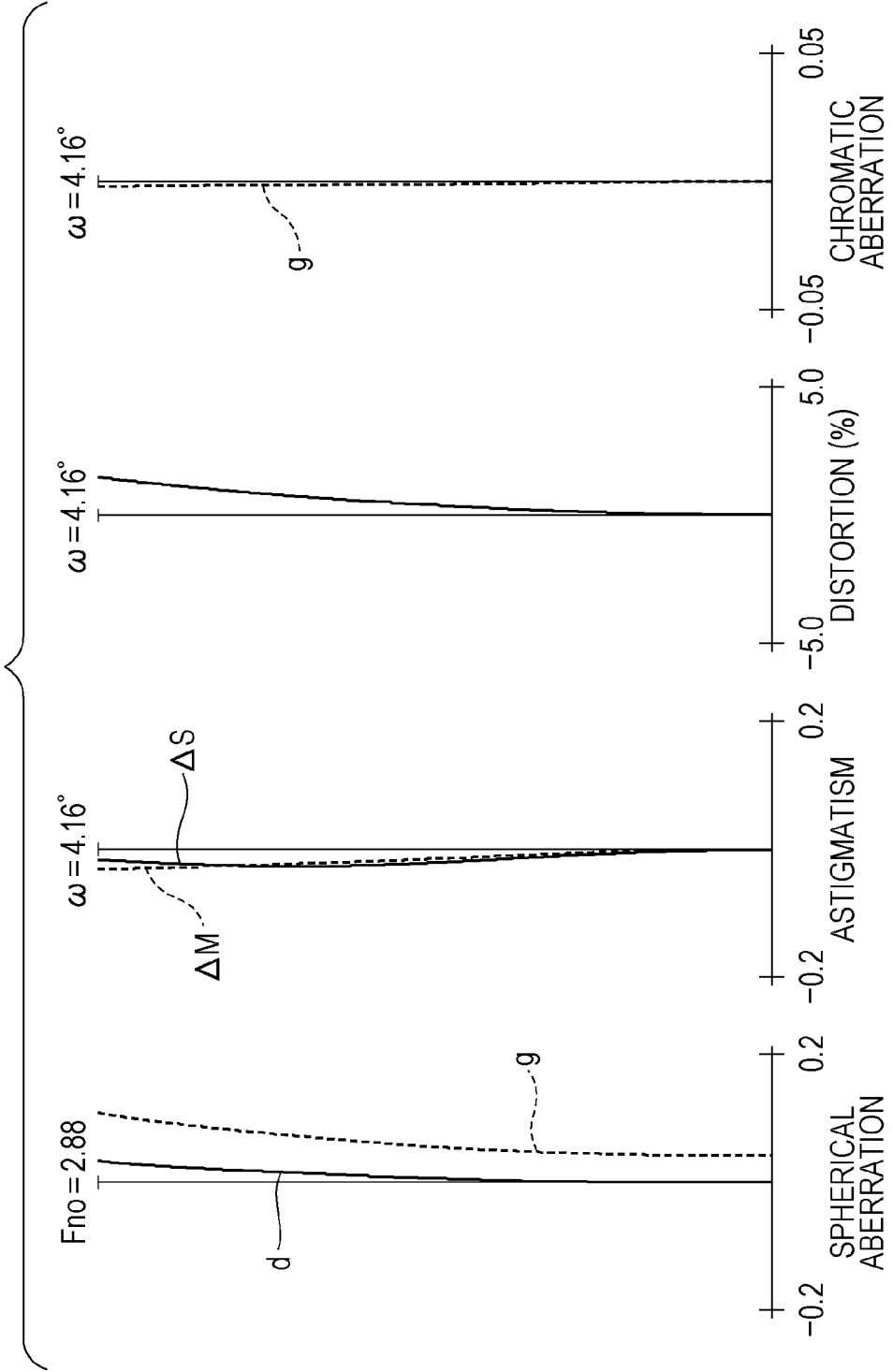

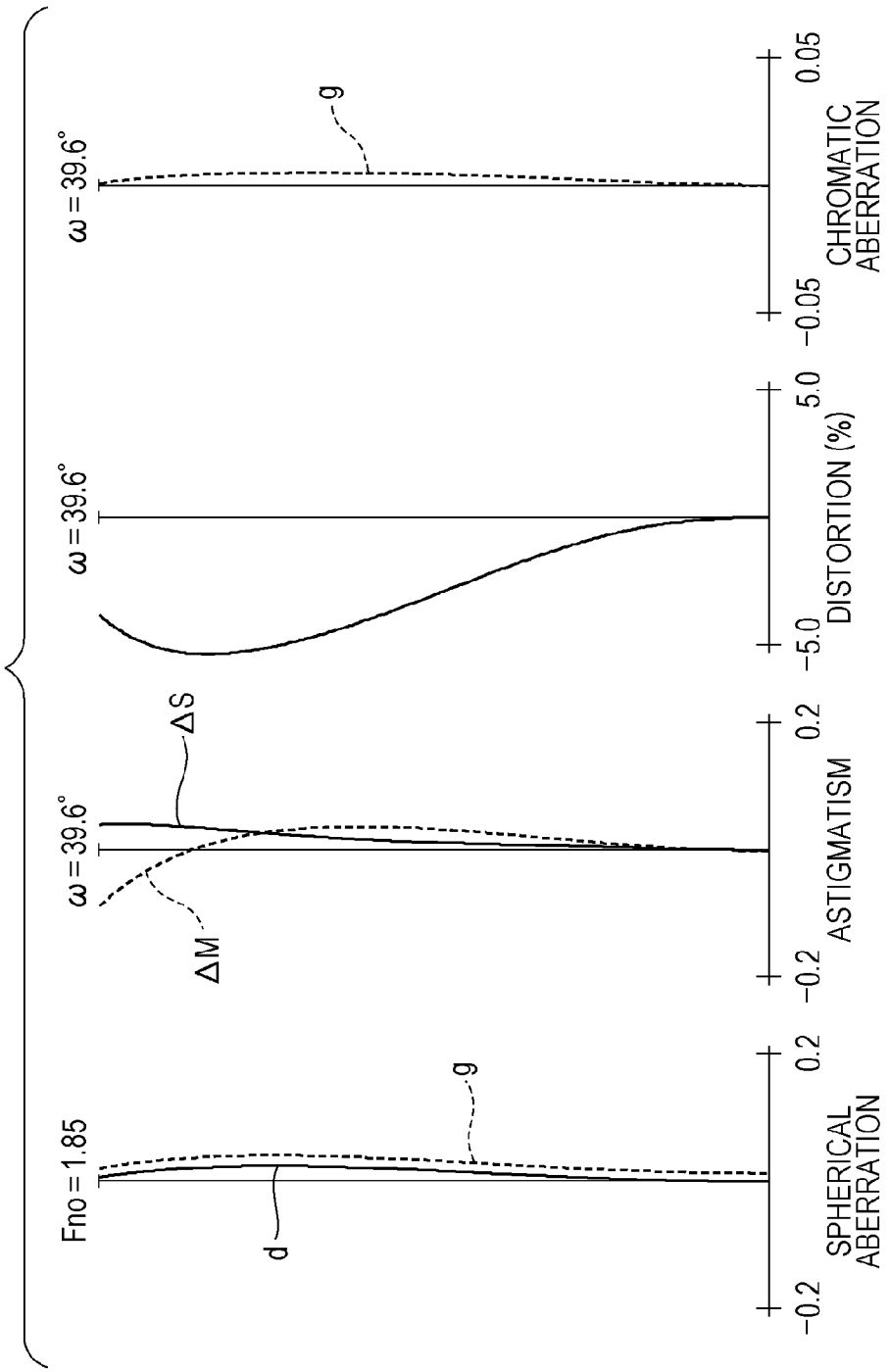

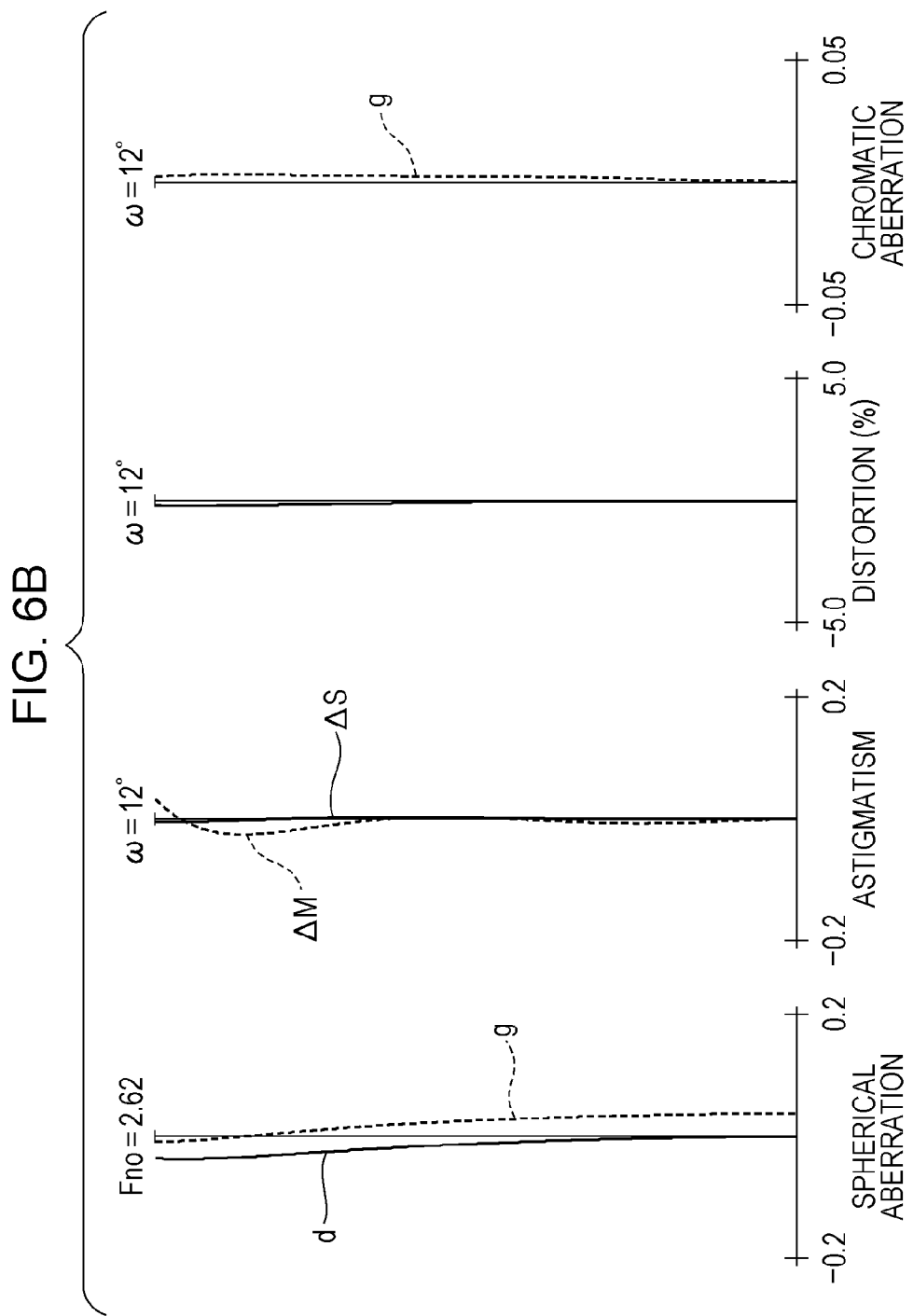

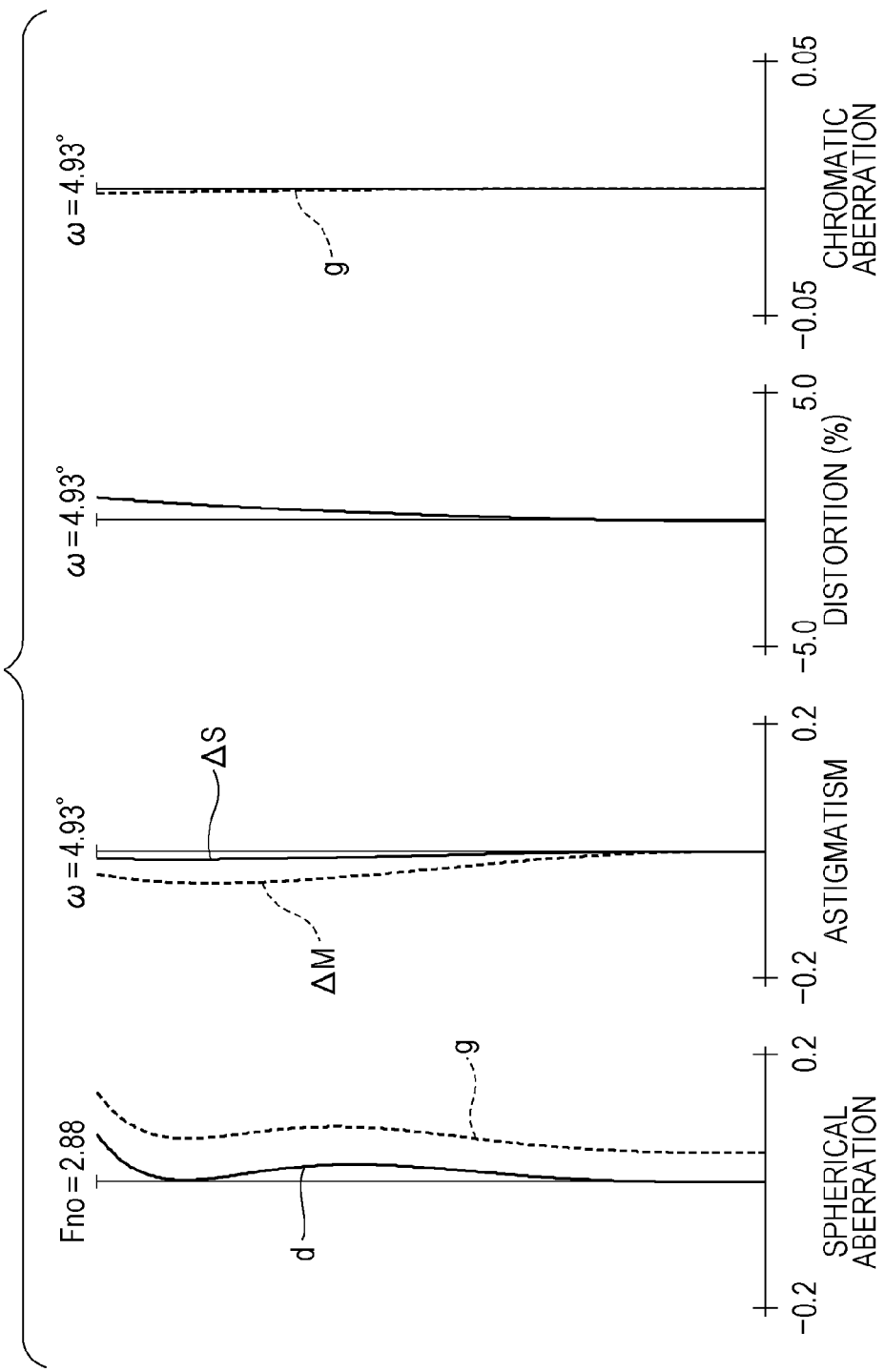

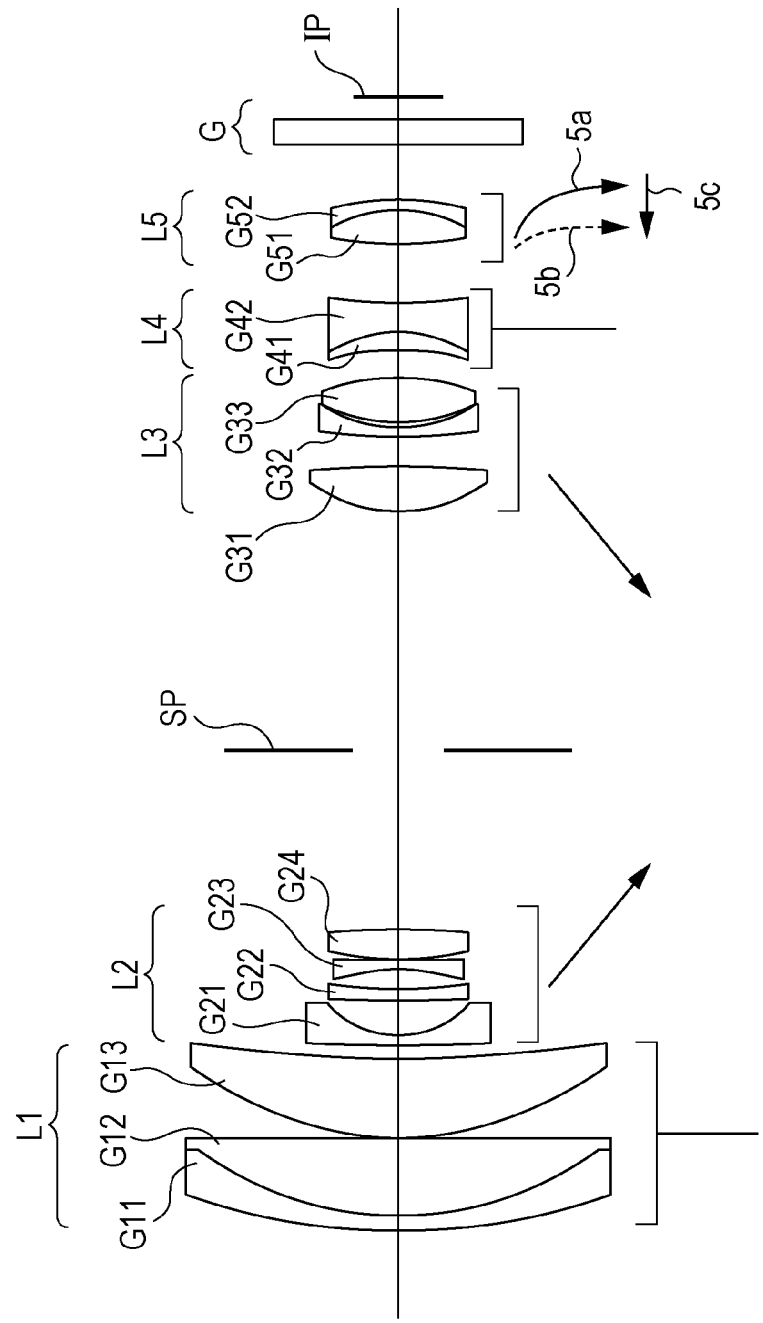

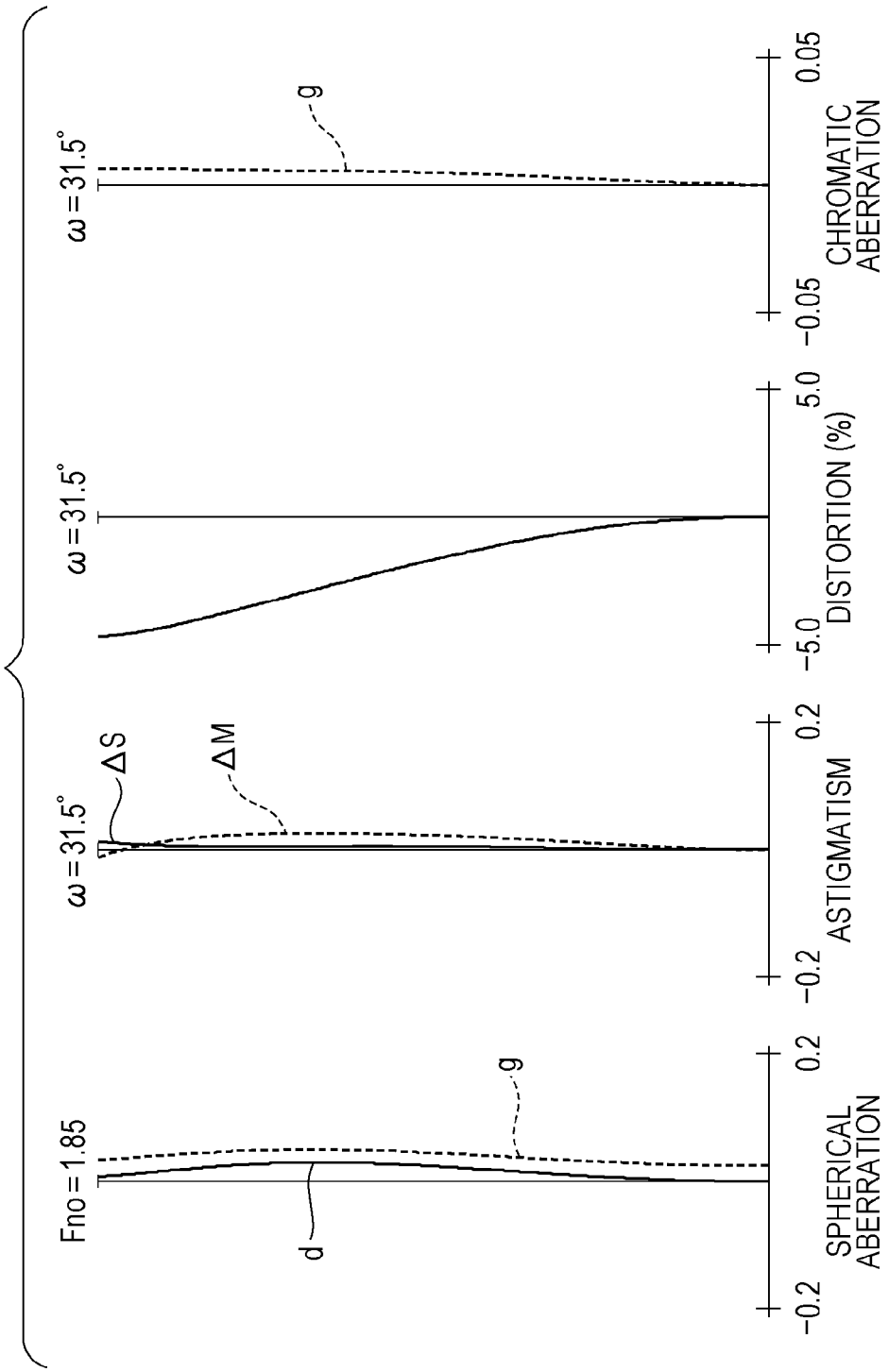

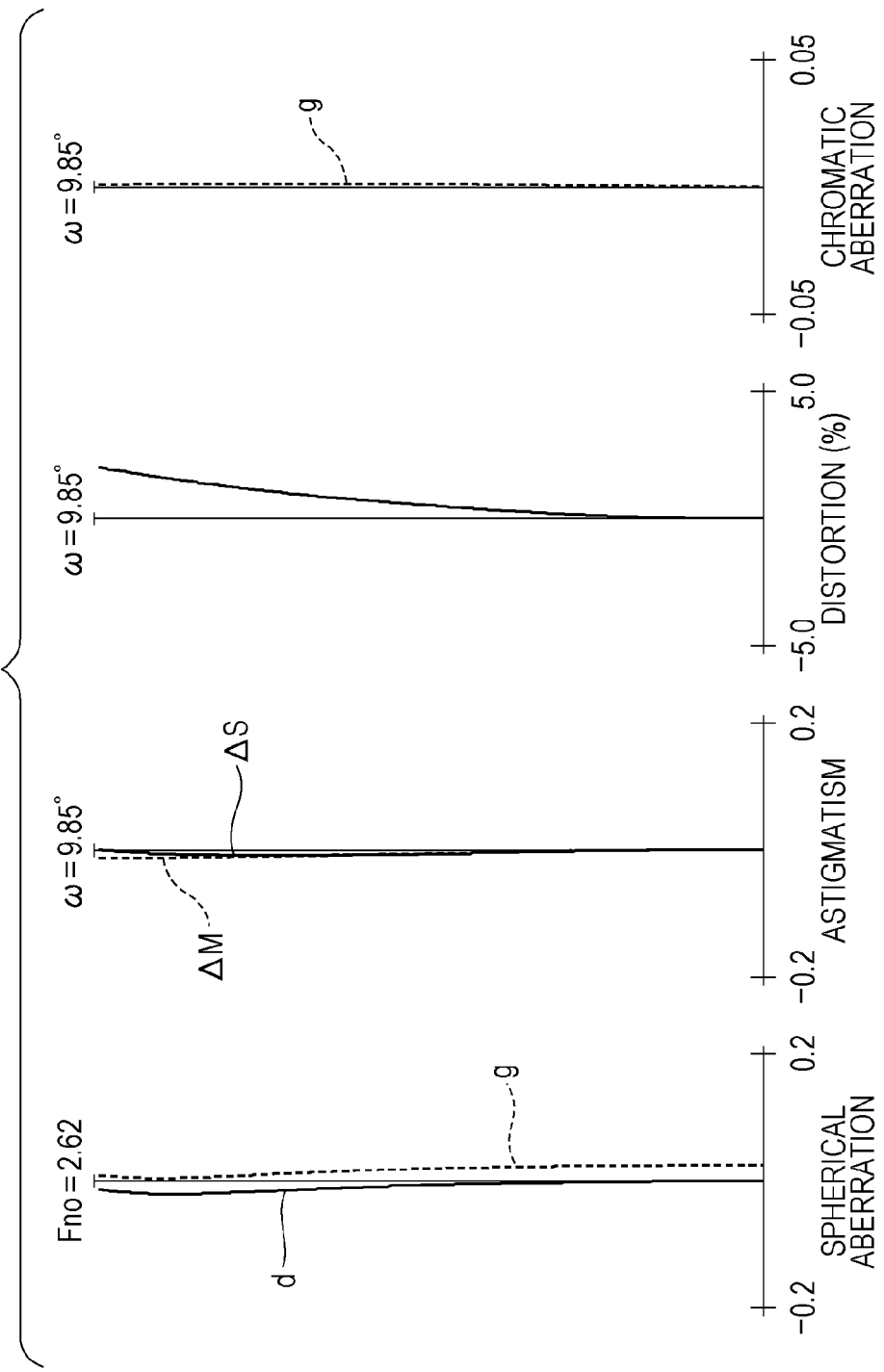

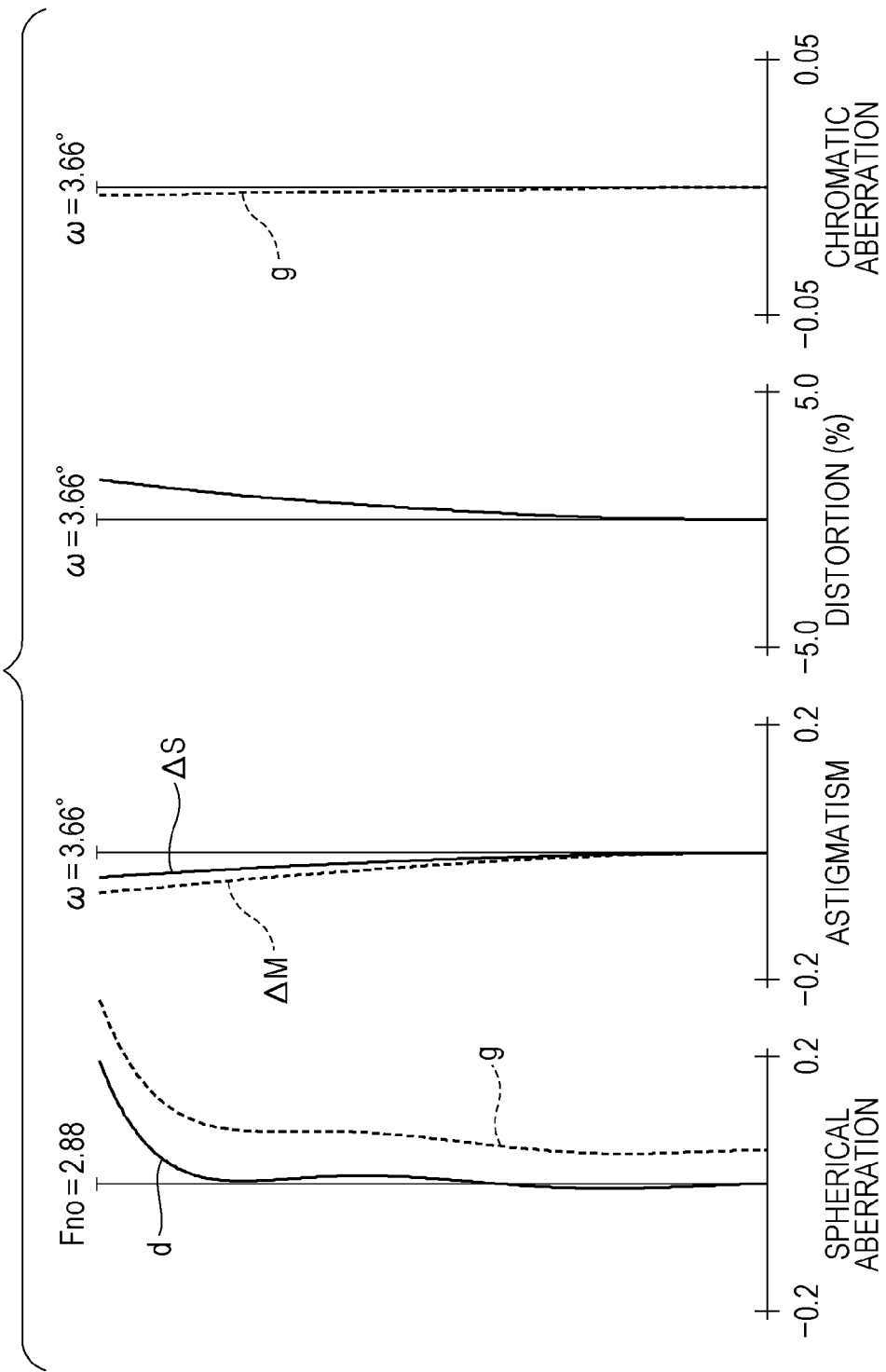

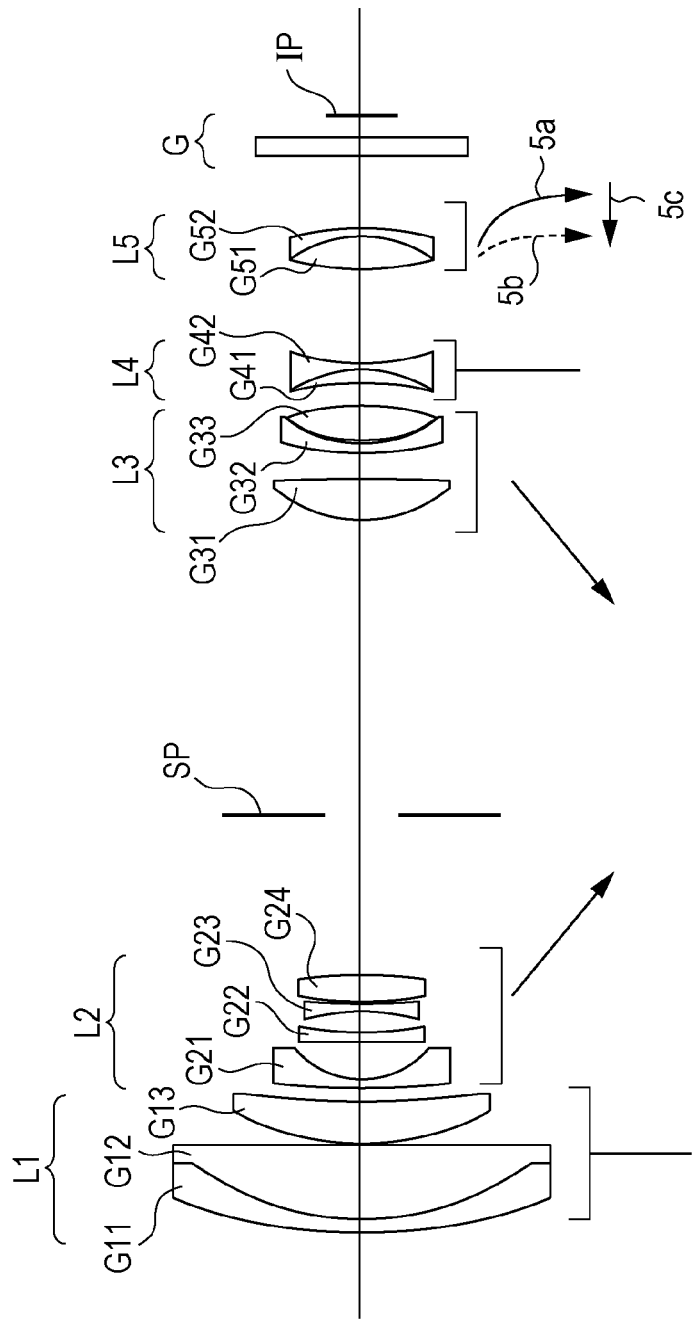

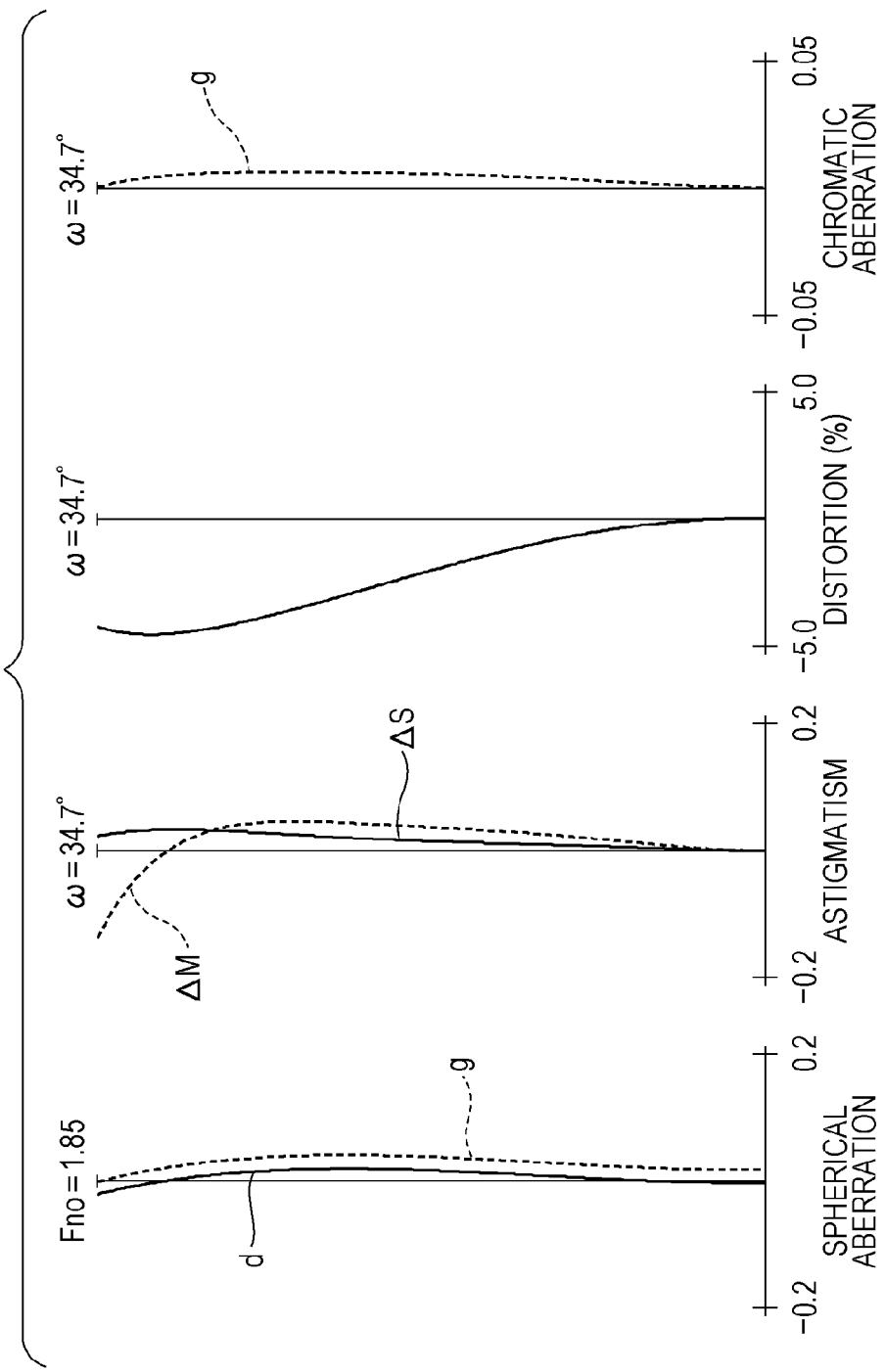

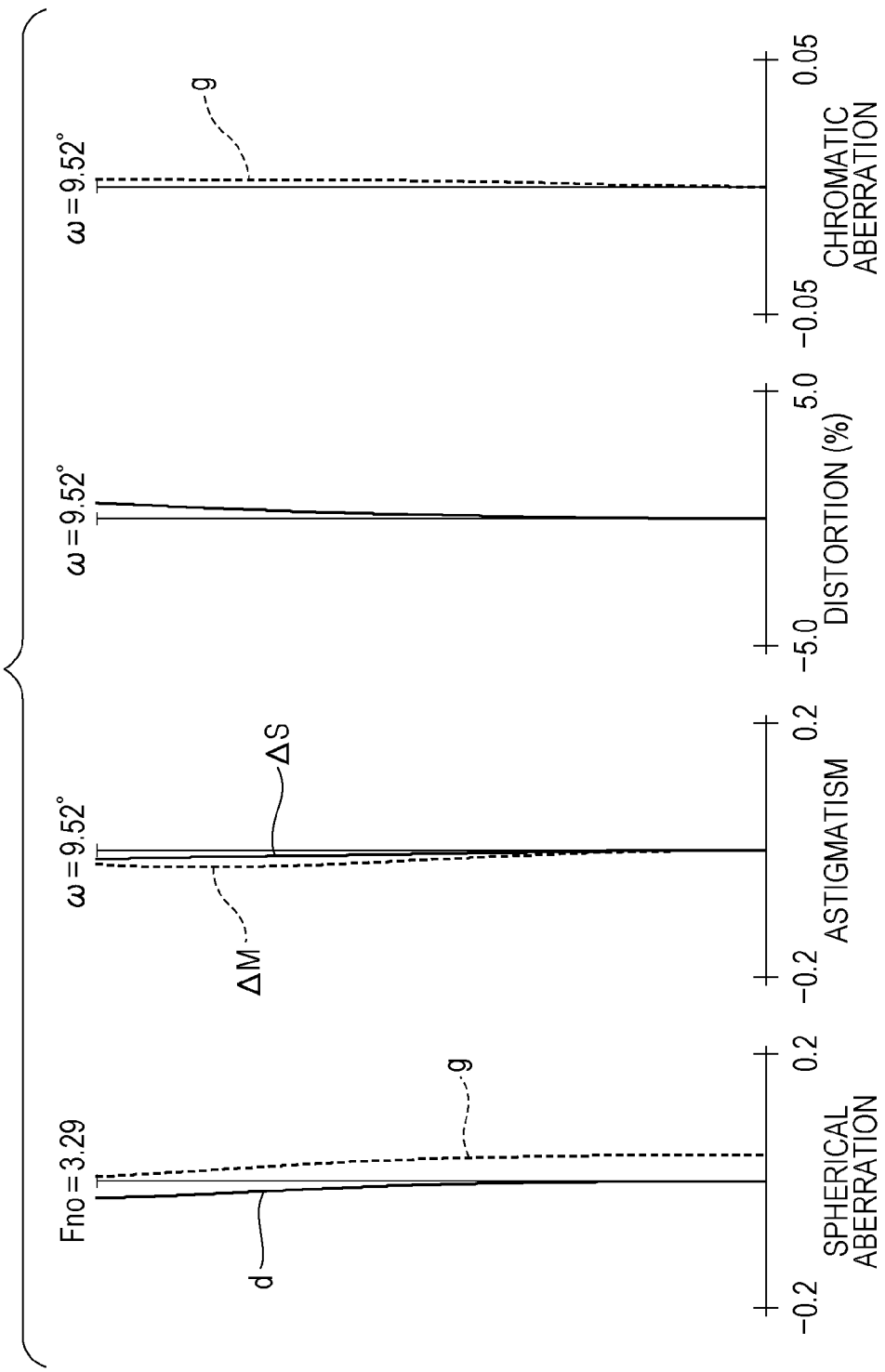

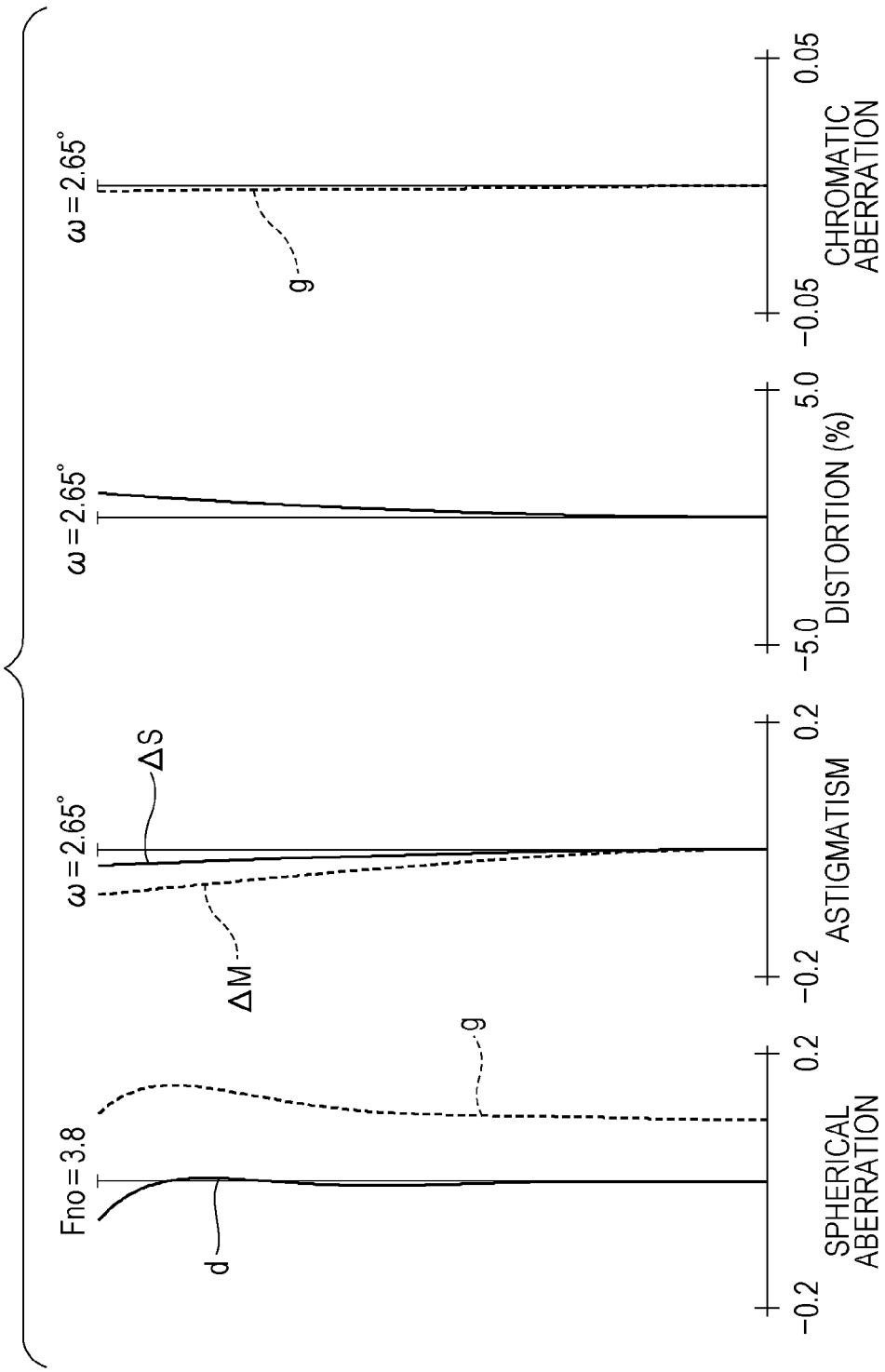

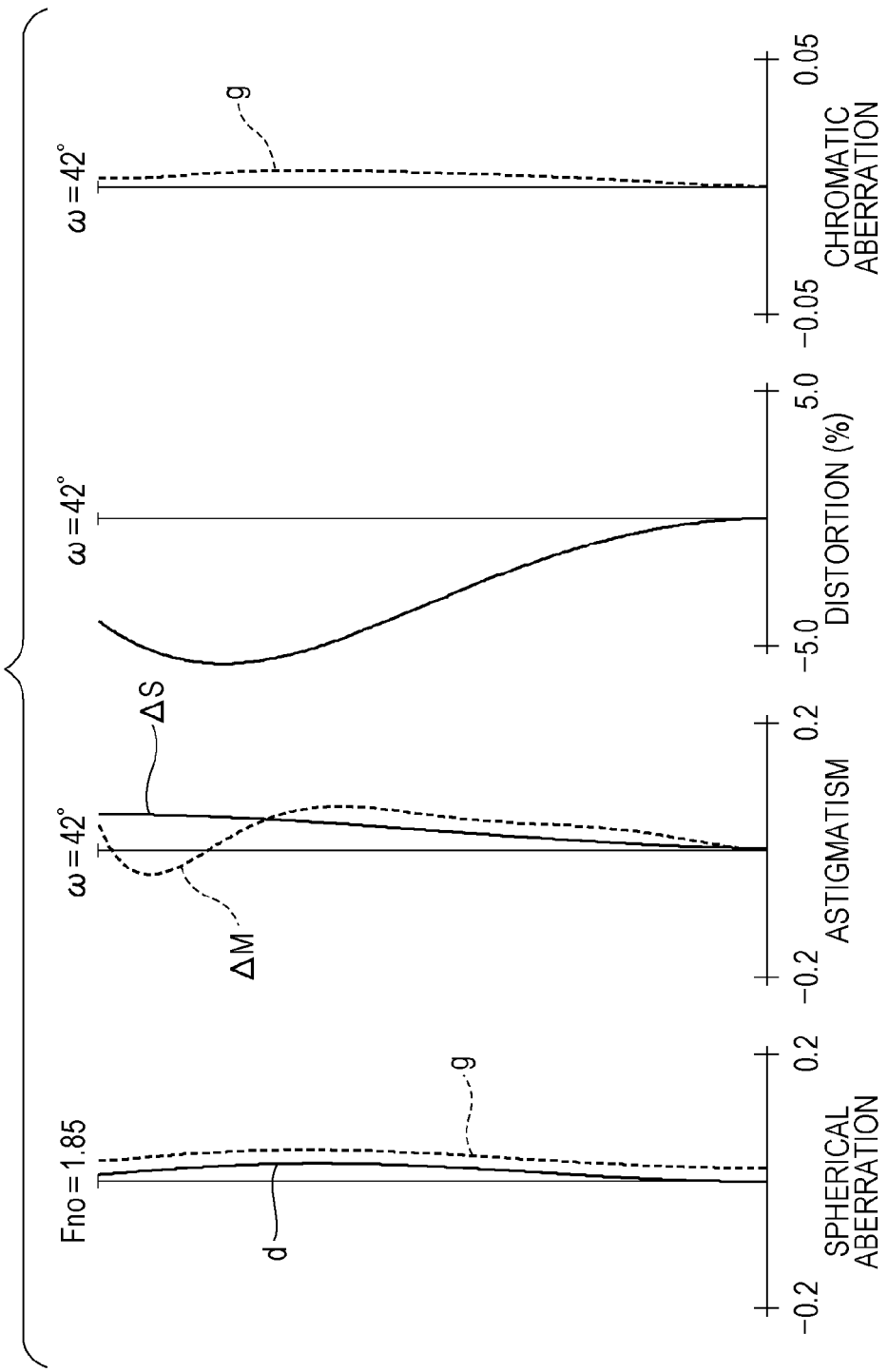

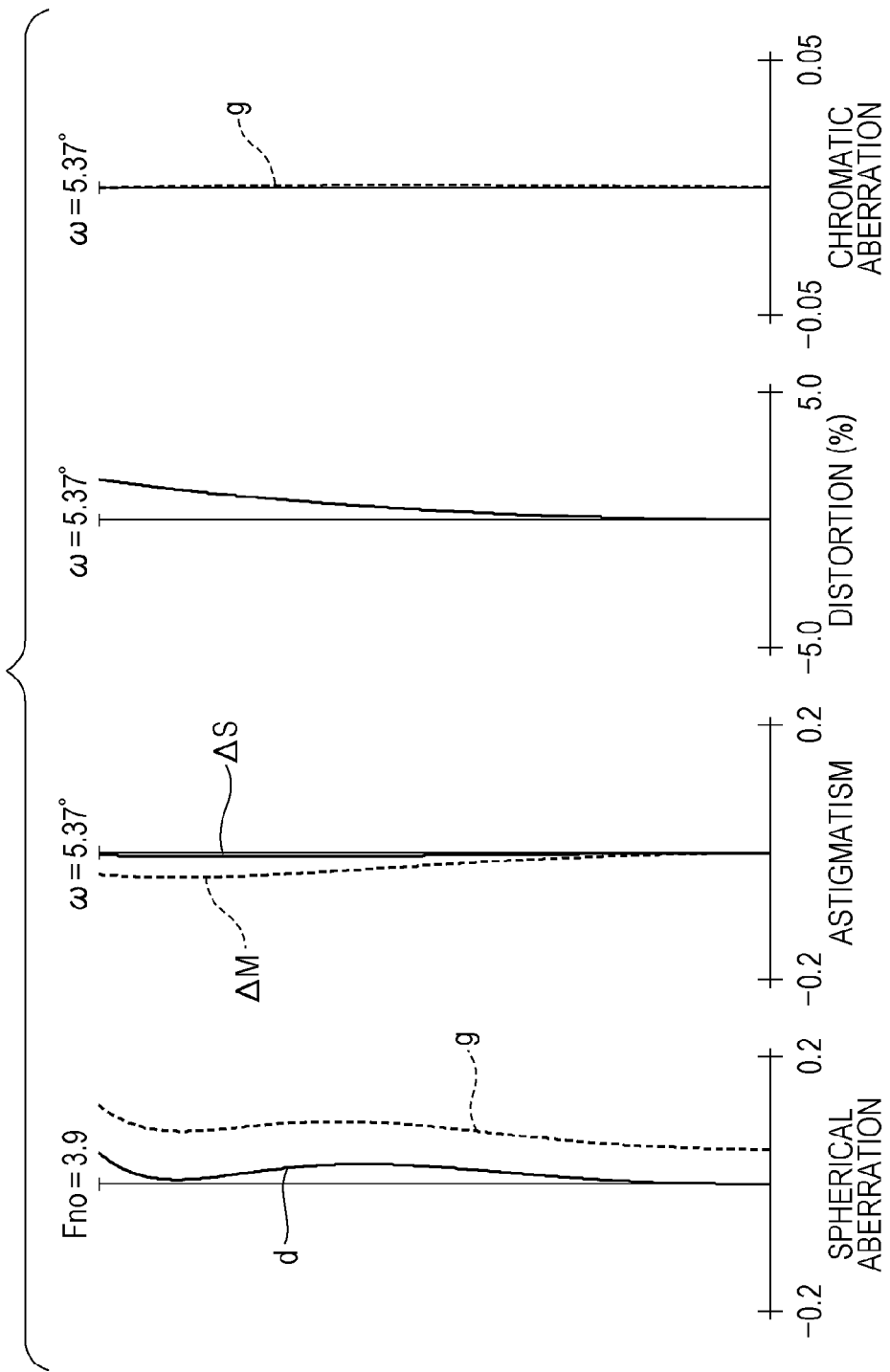

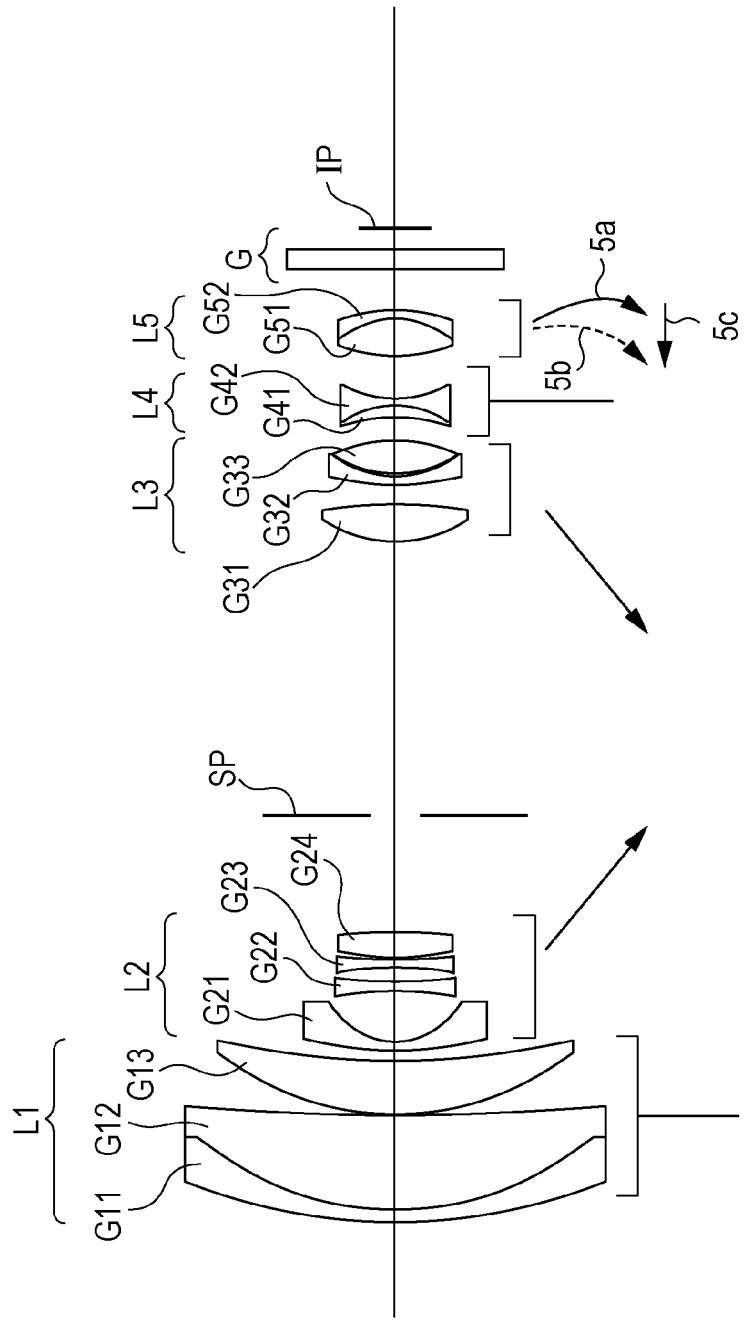

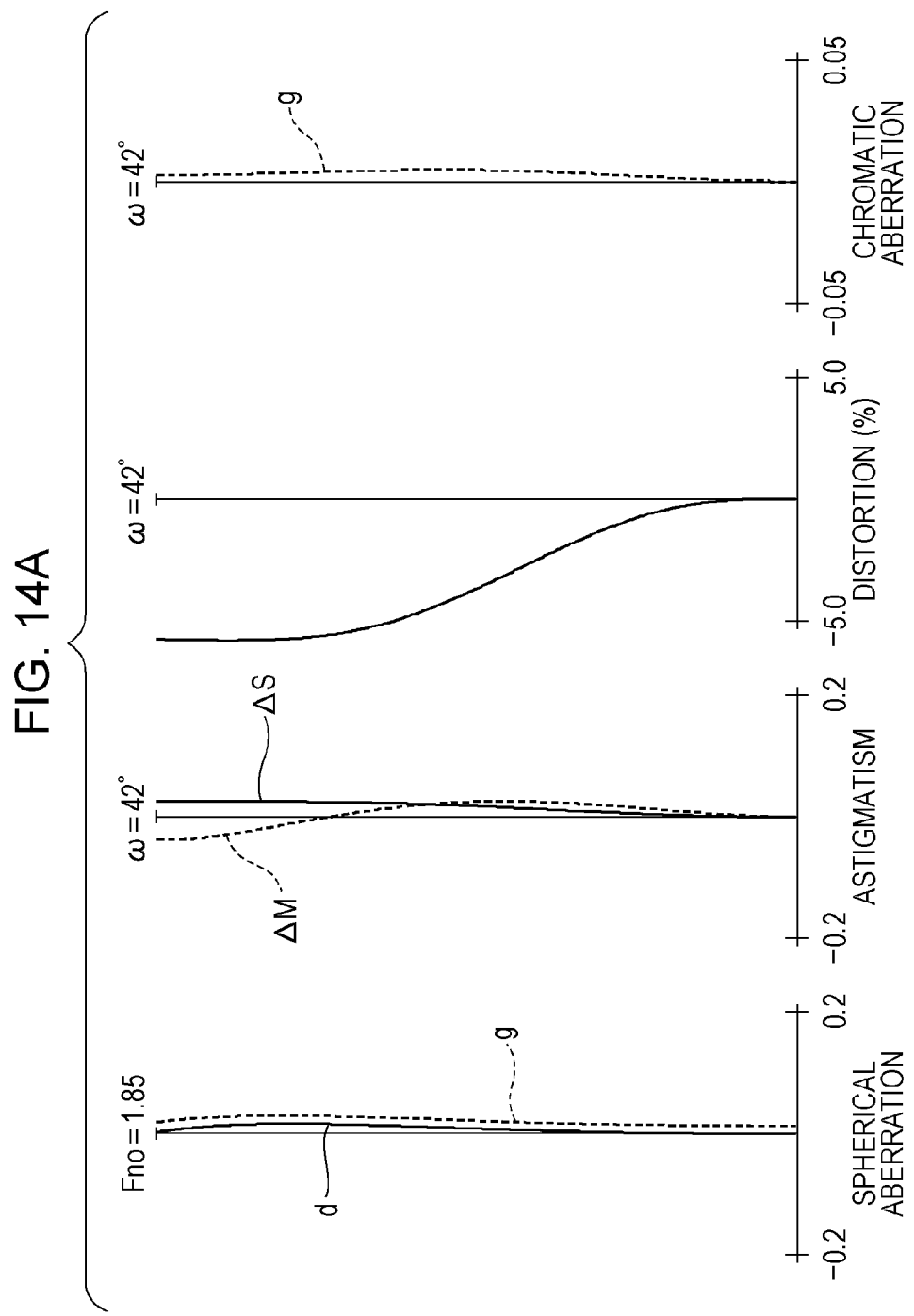

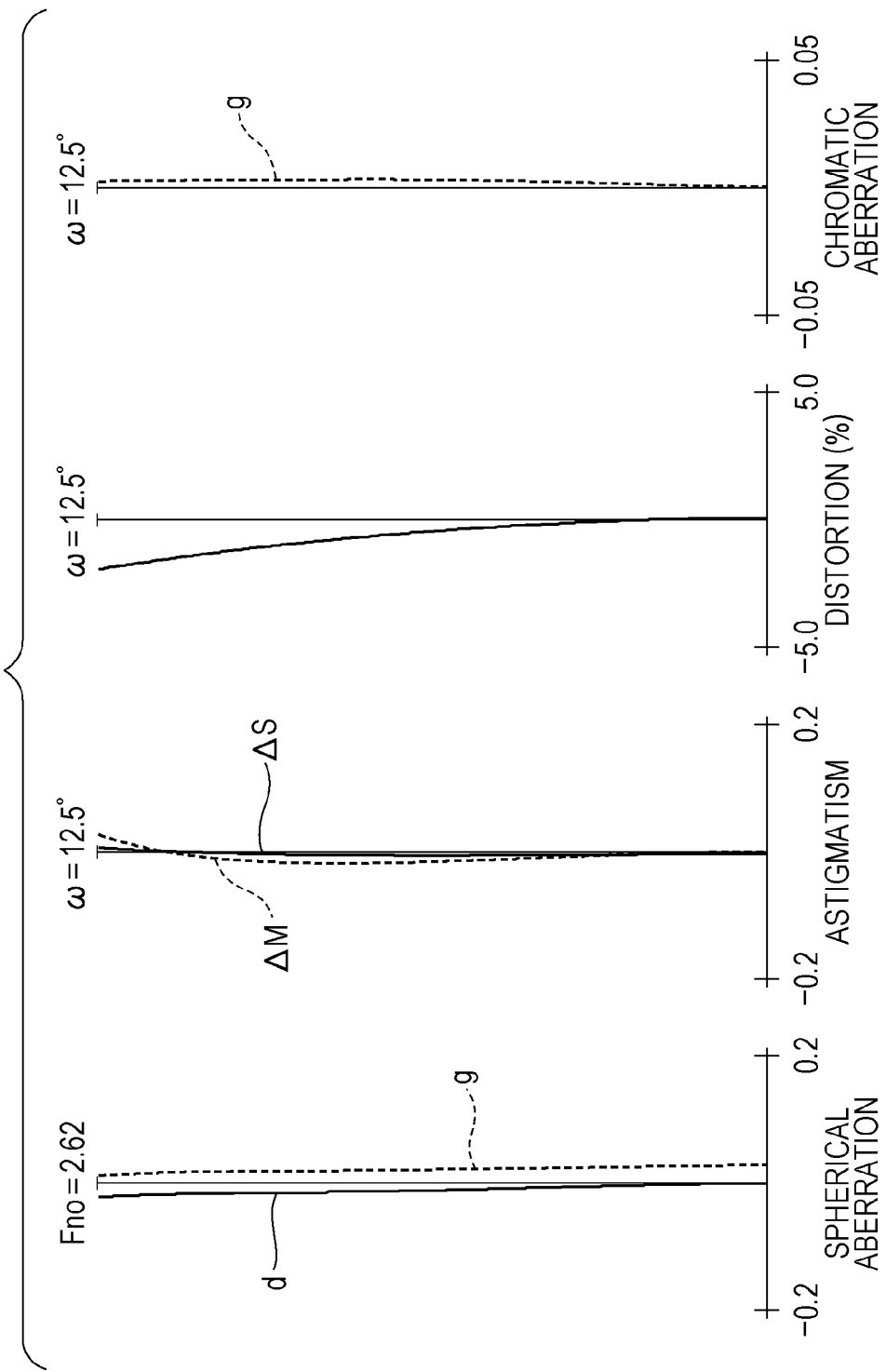

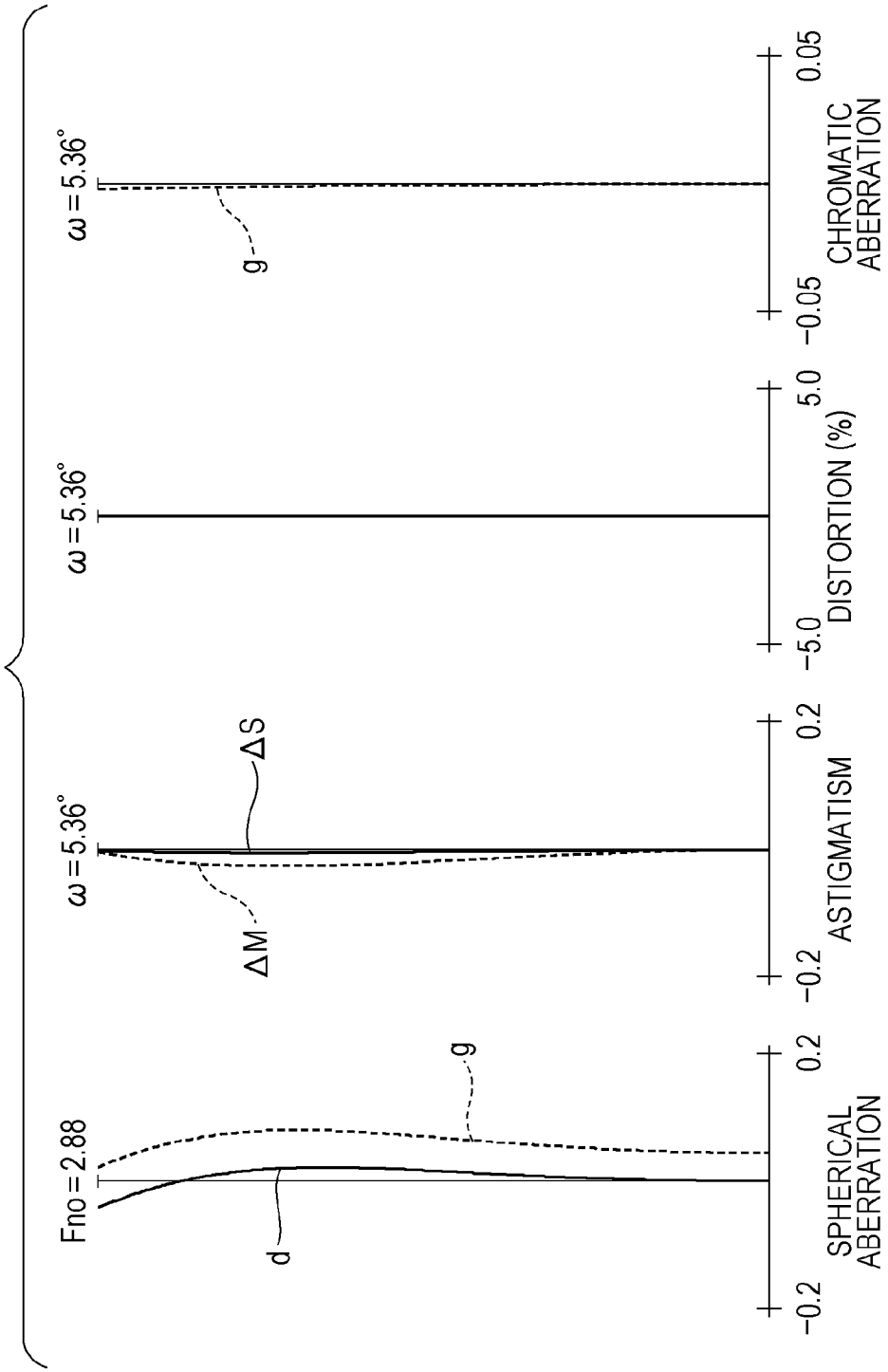

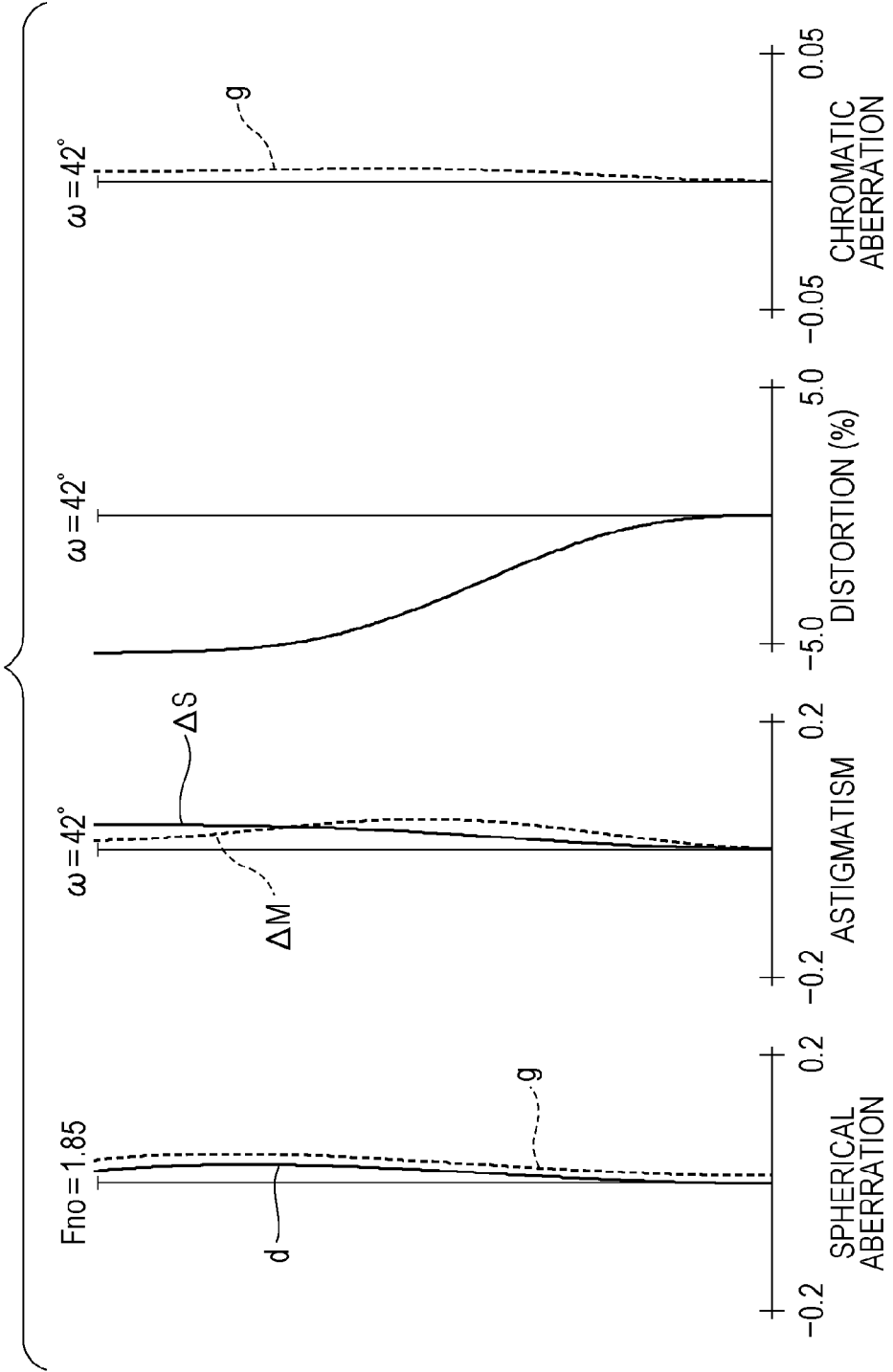

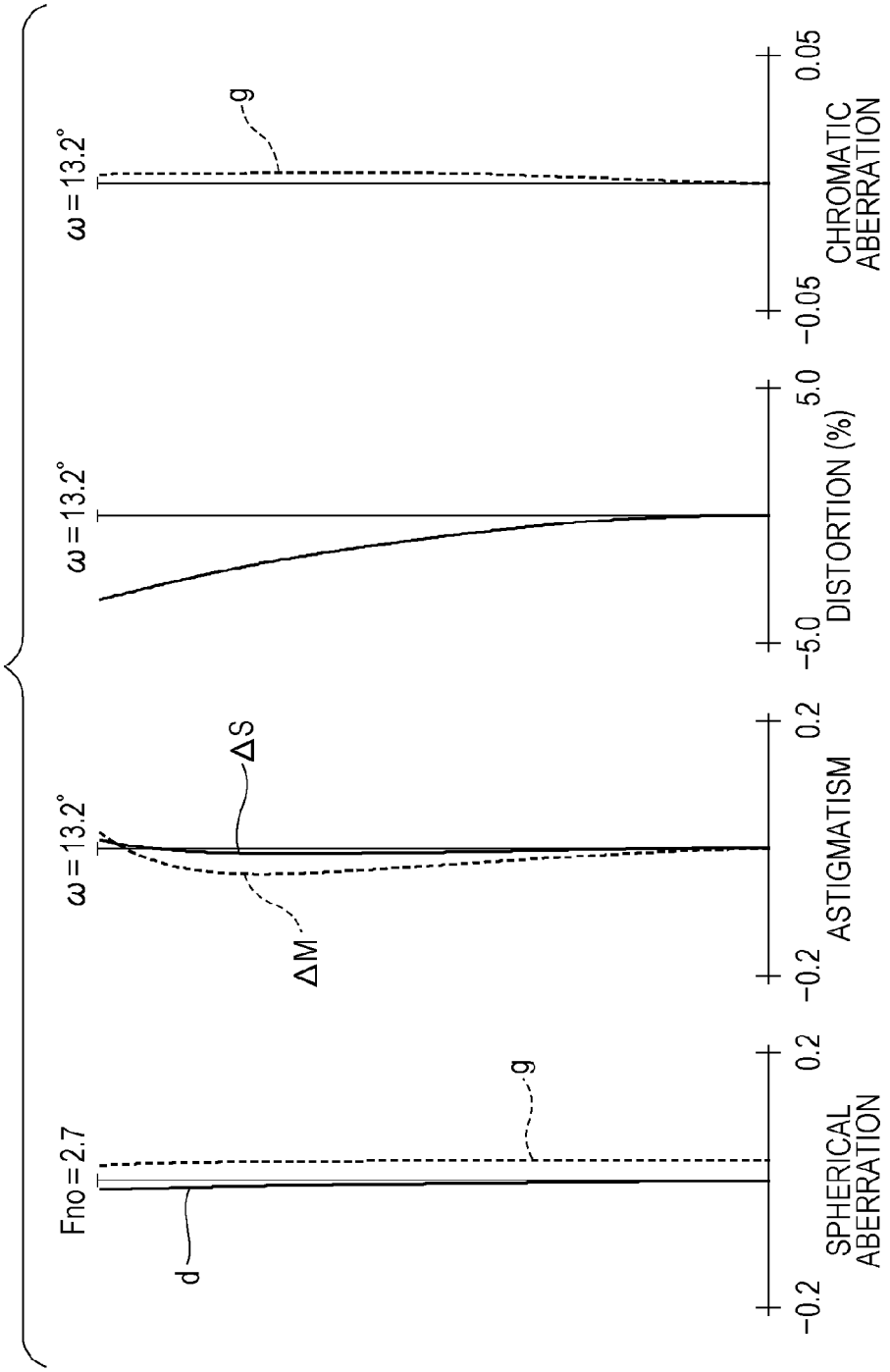

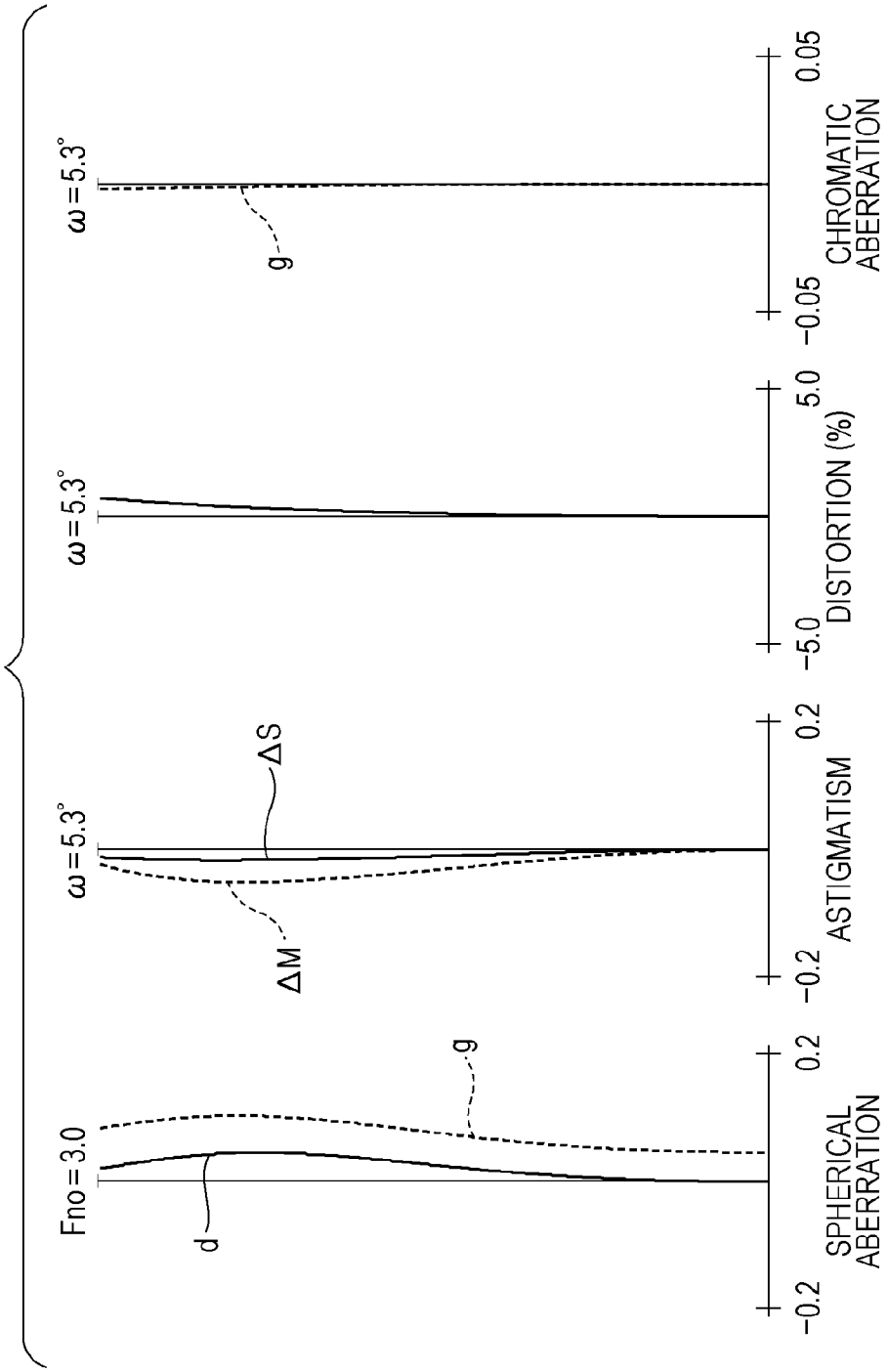

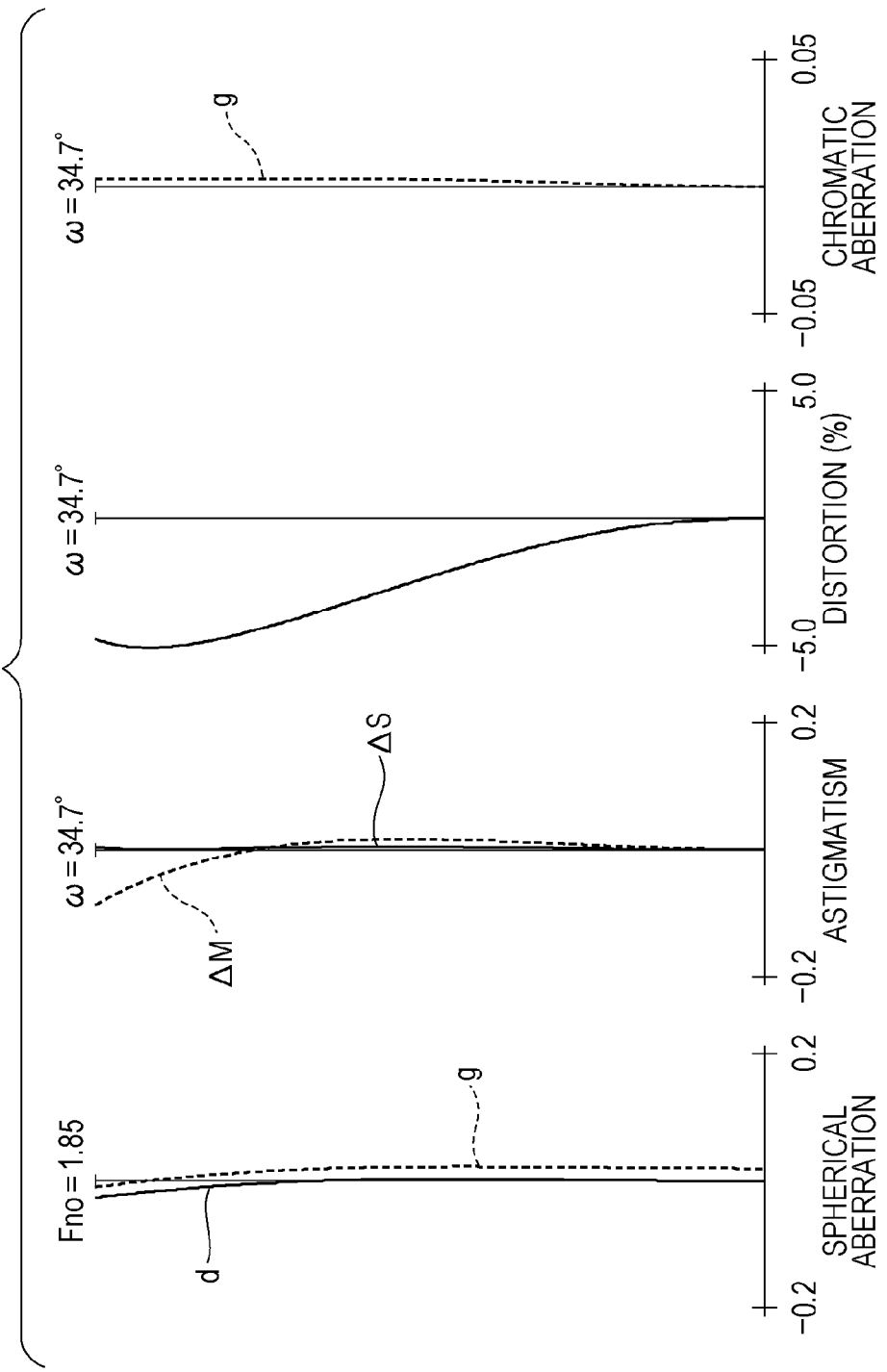

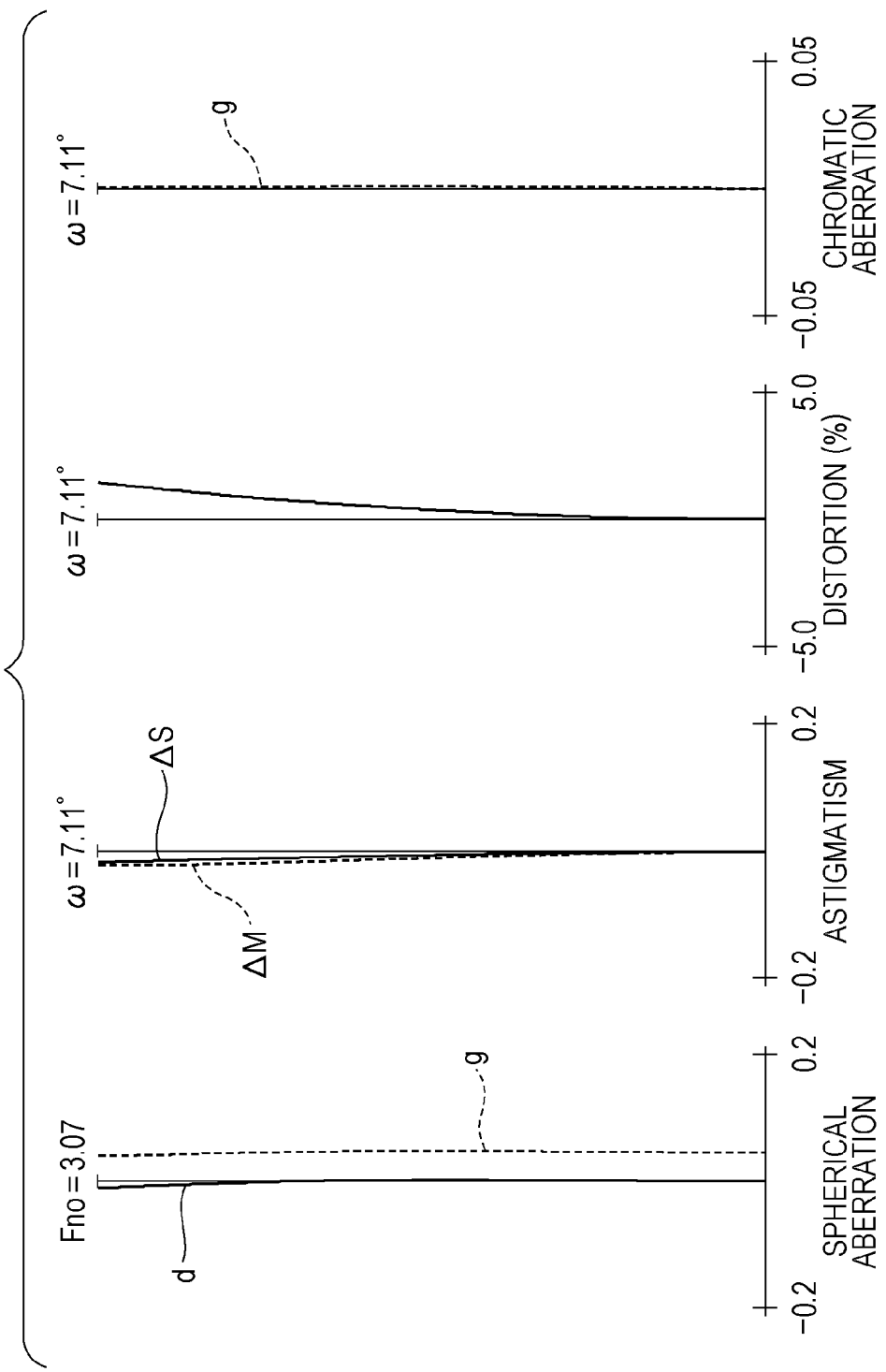

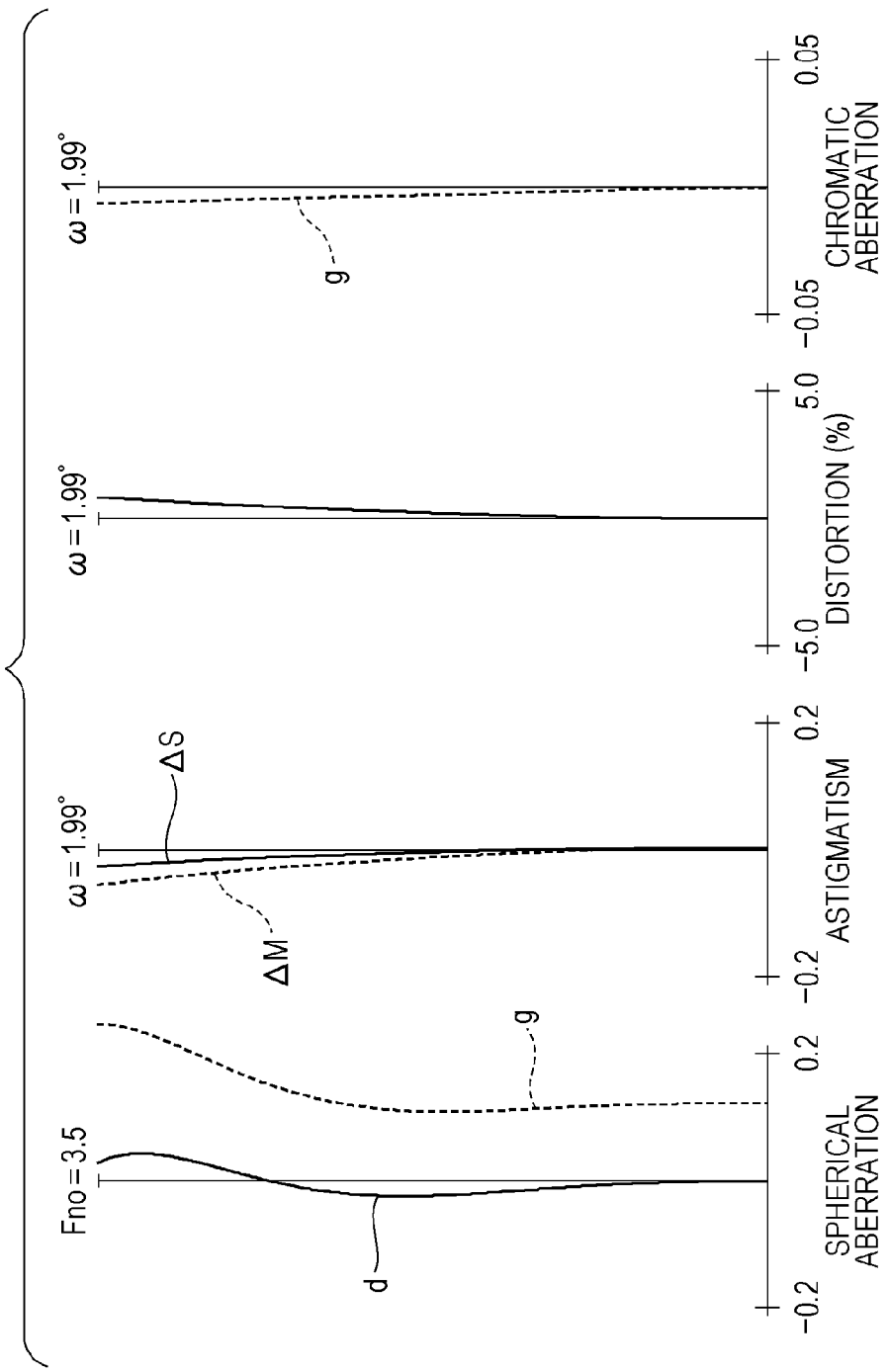

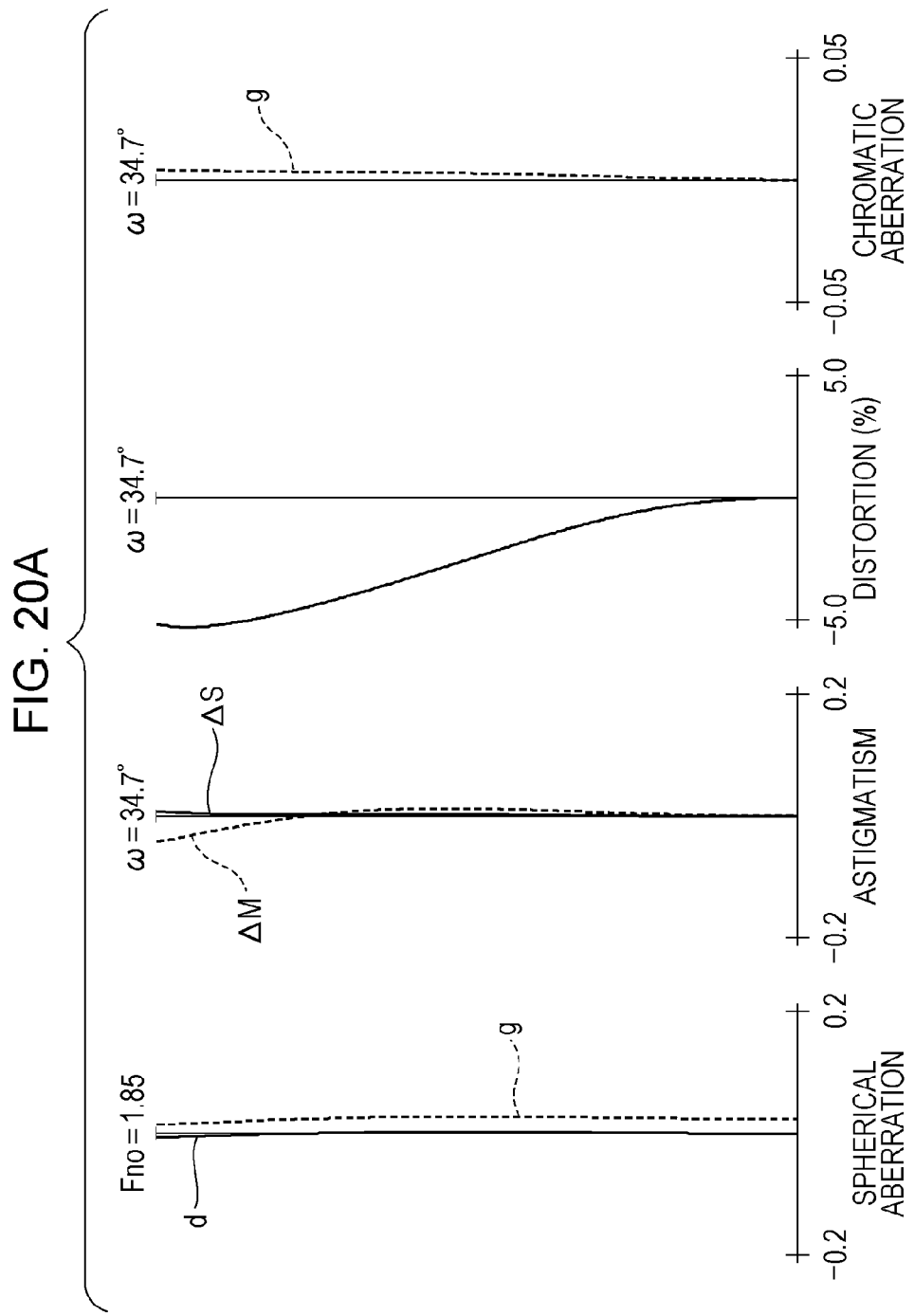

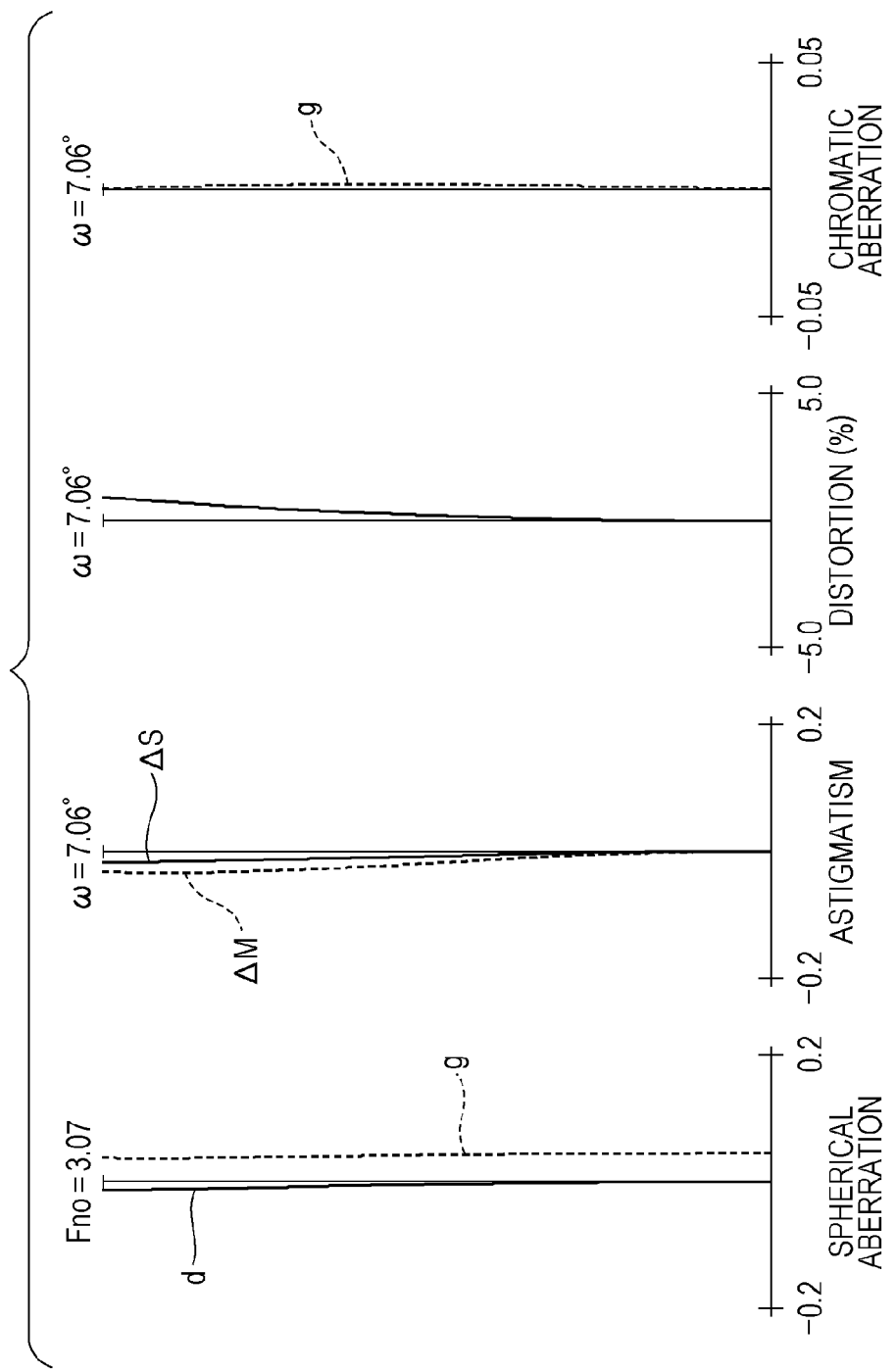

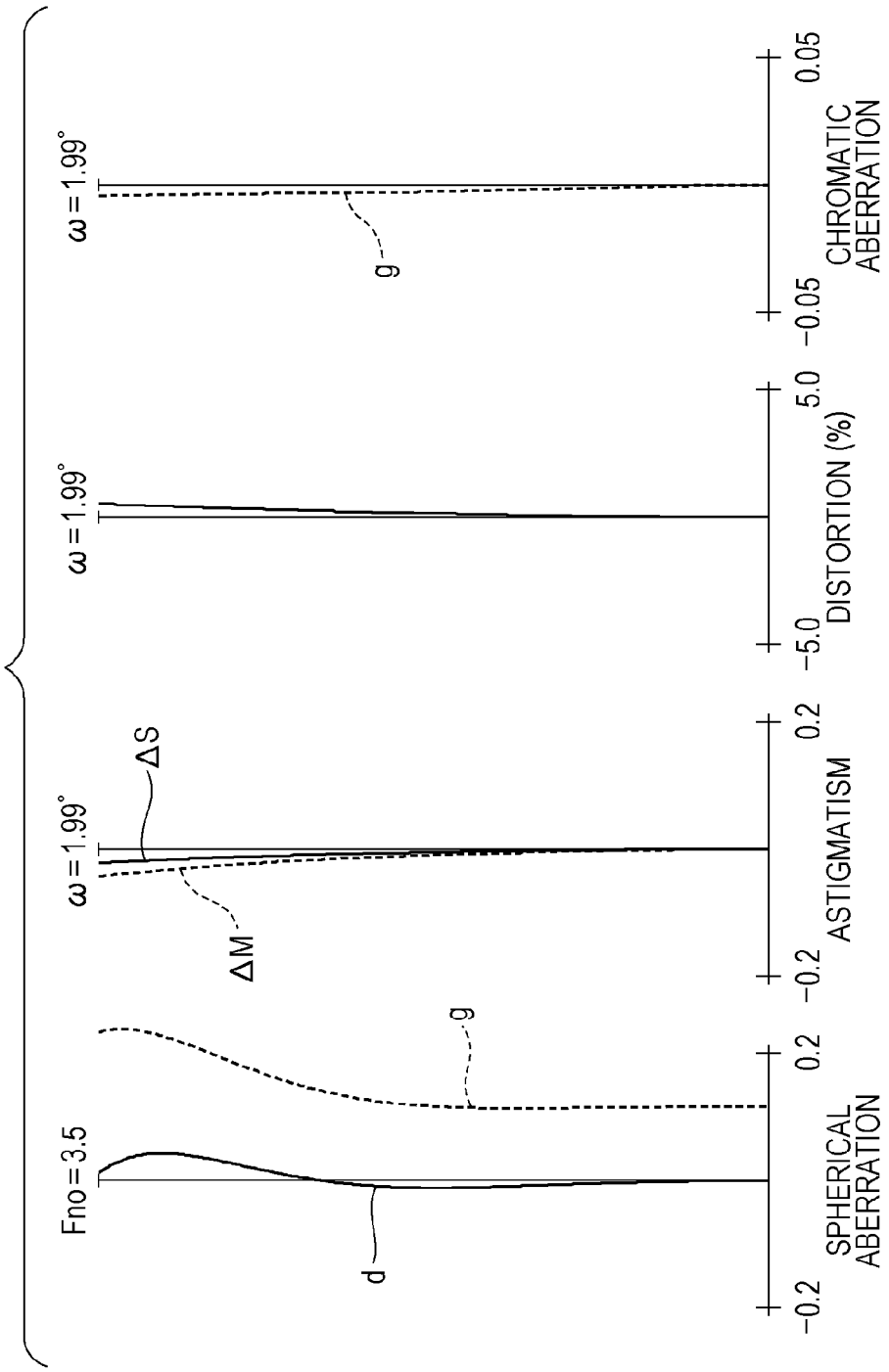

ZOOM LENS AND IMAGE PICKUP APPARATUS EQUIPPED WITH ZOOM LENS

BACKGROUND OF THE INVENTION

1. Field of the Invention

The present invention relates to a zoom lens, which is suitable as an image pickup optical system used in image pickup apparatuses such as video cameras, monitoring cameras, digital still cameras, broadcasting cameras, and silver halide photography cameras.

2. Description of the Related Art

An image pickup optical system used for image pickup apparatuses such as video cameras, monitoring cameras, and digital still cameras using a solid-state image pickup element is required to be a high-zoom-ratio wide-angle zoom lens for which the entire system is compact and, in addition, to be a zoom lens having a high optical performance over the entire zoom range. Furthermore, a reduction in the power consumption of a drive source required for zooming, prevention of imperceptible shaking of images, and fixation of a first lens unit that is large and heavy in order to enhance the strength of a lens barrel at the time of zooming are required.

A positive-lead-type five-unit zoom lens including a first lens unit having a positive refractive power, a second lens unit having a negative refractive power, a third lens unit having a positive refractive power, a fourth lens unit having a negative refractive power, and a fifth lens unit having a positive refractive power in order from an object side to an image side is known. Then, a rear-focus-type five-unit zoom lens configured to perform zooming by moving the second lens unit and the third lens unit, correct an image plane variation in association with the zooming and perform focusing by moving the fifth lens unit is known.

U.S. Pat. No. 7,253,961 discloses a zoom lens having a high optical performance over an entire zoom range at a high zoom ratio.

U.S. Pat. No. 5,388,004 discloses a zoom lens for which the entire system is compact even though the shooting angle of view at a wide-angle end is as wide as 60 degrees or more, and the zoom ratio is as high as twelve times.

U.S. Pat. No. 7,894,135 discloses a zoom lens having a high optical performance in which a variation in aberration at the time of correcting the image shaking is desirably corrected while achieving a reduction in the size and weight of the correction lens unit for correcting the image shaking.

However, when refractive powers of the respective lens surfaces are increased for achieving a reduction in size, the occurrence of axial chromatic aberration, magnification chromatic aberration, and coma aberration is increased at a telephoto end, and correction of such aberrations tends to be difficult.

The five-unit zoom lenses as described above are of a zoom type with which it is relatively easy to obtain a desirable optical performance while achieving a reduction in the size of the entire lens system with a high zoom ratio and a wide angle of view. However, in order to obtain the characteristics as described above, it is important to set the refractive powers of the respective lens units or conditions for movement in association with the zooming operations of the respective lens units appropriately.

In particular, it is important to set the parameters of movement at the time of zooming of the second and third zoom lens unit. If the conditions of movement at the time of zooming of the second and third lens units are not set appropriately, it is difficult to achieve a reduction in the size of the entire system and obtain a high optical performance at a high zoom ratio and a wide angle of view over the entire zoom range.

SUMMARY OF THE INVENTION

The present invention provides a zoom lens for which the entire system is compact, having a high zoom ratio and a wide angle of view, and an image pickup apparatus having the zoom lens.

According to the first aspect of the invention, there is provided a zoom lens including in order from an object side toward an image: a first lens unit having a positive refractive power; a second lens unit having a negative refractive power; a third lens unit having a positive refractive power; a fourth lens unit having a negative refractive power; and a fifth lens unit having a positive refractive power, wherein the second lens unit, the third lens unit and the fifth lens unit move so that the distance between the first lens unit and the second lens unit is increased and the distance between the second lens unit and the third lens unit is decreased at the time of zooming from a wide-angle end to a telephoto end, the first lens unit and the fourth lens unit are fixed for the zooming, and when M2 is the amount of movement of the second lens unit at the time of the zooming from the wide-angle end to the telephoto end, and M3 is the amount of movement of the third lens unit at the time of zooming from the wide-angle end to the telephoto end, the conditional expression; $0.2<|M2/M3|<5.0$ is satisfied.

According to a second aspect of the invention, there is provided a zoom lens in order from an object side toward an image including: a first lens unit having a positive refractive power; a second lens unit having a negative refractive power; a third lens unit having a positive refractive power; a fourth lens unit having a negative refractive power; and a fifth lens unit having a positive refractive power, wherein the second lens unit, the third lens unit and the fifth lens unit move so that the distance between the first lens unit and the second lens unit increase and the distance between the second lens unit and the third lens unit is decreased at the time of zooming from the wide-angle end to the telephoto end, the first lens unit and the fourth lens unit are fixed for the zooming, when M3 is an amount of movement of the third lens unit at the time of zooming from the wide-angle end and fw is a focal length of the entire system at the wide-angle end, the conditional expression: $0.6<M3/fw<10.0$ is satisfied.

Further features of the present invention will become apparent from the following description of exemplary embodiments with reference to the attached drawings.

BRIEF DESCRIPTION OF THE DRAWINGS

FIGS. 2A, 2B and 2C are aberration charts showing various aberrations of the zoom lens at the wide-angle end, an intermediate zoom position, and a telephoto end, respectively, according to Embodiment 1.

FIG. 3 is a cross-sectional view of lenses of a zoom lens at a wide-angle end according to Embodiment 2.

FIGS. 4A, 4B, and 4C are aberration charts showing various aberrations of the zoom lens at the wide-angle end, an intermediate zoom position, and a telephoto end, respectively, according to Embodiment 2.

FIGS. 6A, 6B, and 6C are aberration charts showing various aberrations of the zoom lens at the wide-angle end, an intermediate zoom position, and a telephoto end, respectively, according to Embodiment 3.

FIG. 7 is a cross-sectional view of lenses of a zoom lens at a wide-angle end according to Embodiment 4.

FIGS. 8A, 8B, and 8C are aberration charts showing various aberrations of the zoom lens at the wide-angle end, an intermediate zoom position, and a telephoto end, respectively, according to Embodiment 4.

FIG. 9 is a cross-sectional view of lenses of a zoom lens at a wide-angle end according to Embodiment 5.

FIGS. 10A, 10B and 10C are aberration charts showing various aberrations of the zoom lens at the wide-angle end, an intermediate zoom position, and a telephoto end, respectively, according to Embodiment 5.

FIGS. 12A, 12B and 12C are aberration charts showing various aberrations of the zoom lens at the wide-angle end, an intermediate zoom position, and a telephoto end, respectively, according to Embodiment 6.

FIG. 13 is a cross-sectional view of lenses of a zoom lens at a wide-angle end according to Embodiment 7.

FIGS. 14A, 14B and 14C are aberration charts showing various aberrations of the zoom lens at the wide-angle end, an intermediate zoom position, and a telephoto end, respectively, according to Embodiment 7.

FIGS. 16A, 16B and 16C are aberration charts showing various aberrations of the zoom lens at the wide-angle end, an intermediate zoom position, and a telephoto end, respectively, according to Embodiment 8.

FIGS. 18A, 18B and 18C are aberration charts showing various aberrations of the zoom lens at the wide-angle end, an intermediate zoom position, and a telephoto end, respectively, according to Embodiment 9.

FIGS. 20A, 20B and 20C are aberration charts showing various aberrations of the zoom lens at the wide-angle end, an intermediate zoom position, and a telephoto end, respectively, according to Embodiment 10.

DESCRIPTION OF THE EMBODIMENTS

Figure 1:
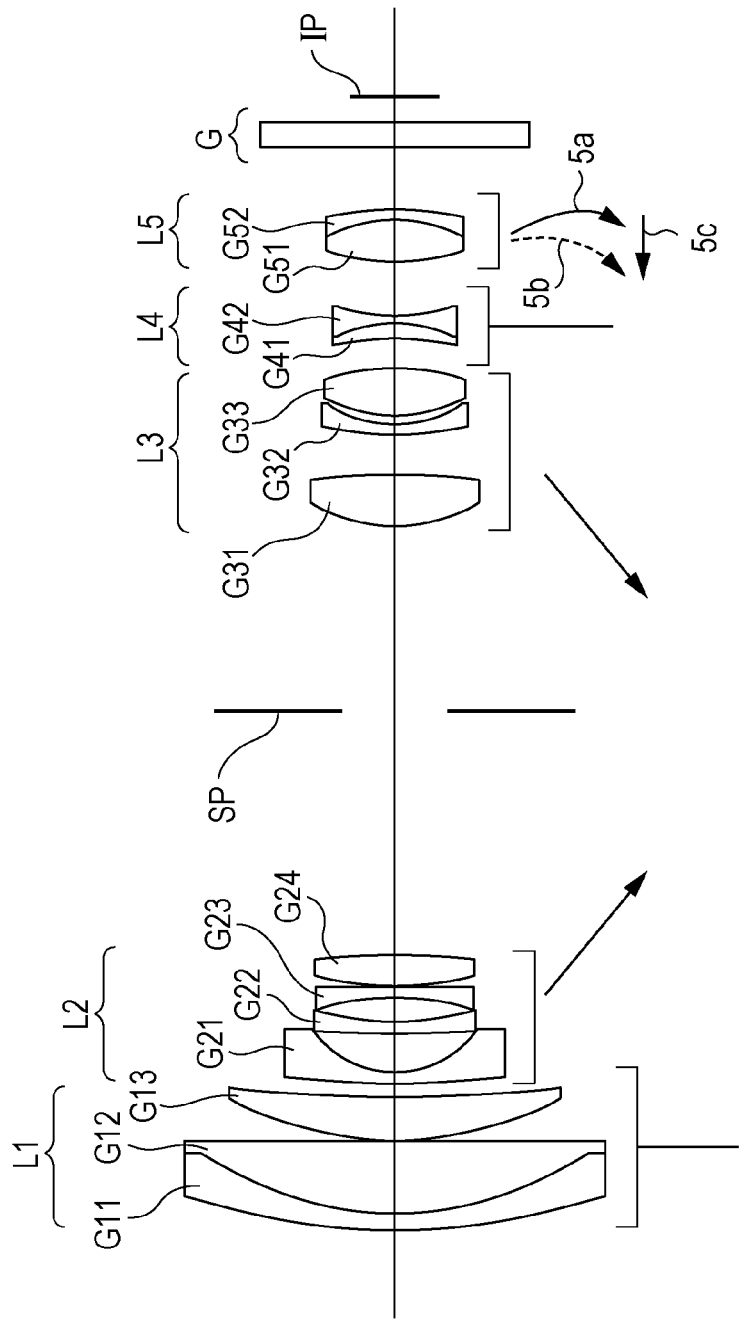
FIG. 1 is a cross-sectional view of lenses of a zoom lens at a wide-angle end according to Embodiment 1.

Referring now to the drawings, preferred embodiments of the invention will be described in detail. The zoom lens described in the various embodiments includes a first lens unit having a positive refractive power, a second lens unit having a negative refractive power, a third lens unit having a positive refractive power, a fourth lens unit having a negative refractive power, and a fifth lens unit having a positive refractive power. A lens unit having a refractive power may be arranged on at least one of the object side of the first lens unit or the image side of the fifth lens unit.

At the time of zooming from the wide-angle end to the telephoto end, the second lens unit, the third lens unit, and the fifth lens unit move so as to increase the distance between the first lens unit and the second lens unit and reduce the distance between the second lens unit and the third lens unit. For zooming, the first lens unit and the fourth lens unit are fixed. A rear focus system which performs focusing by moving the fifth lens unit on an optical axis is employed.

Figure 2C:
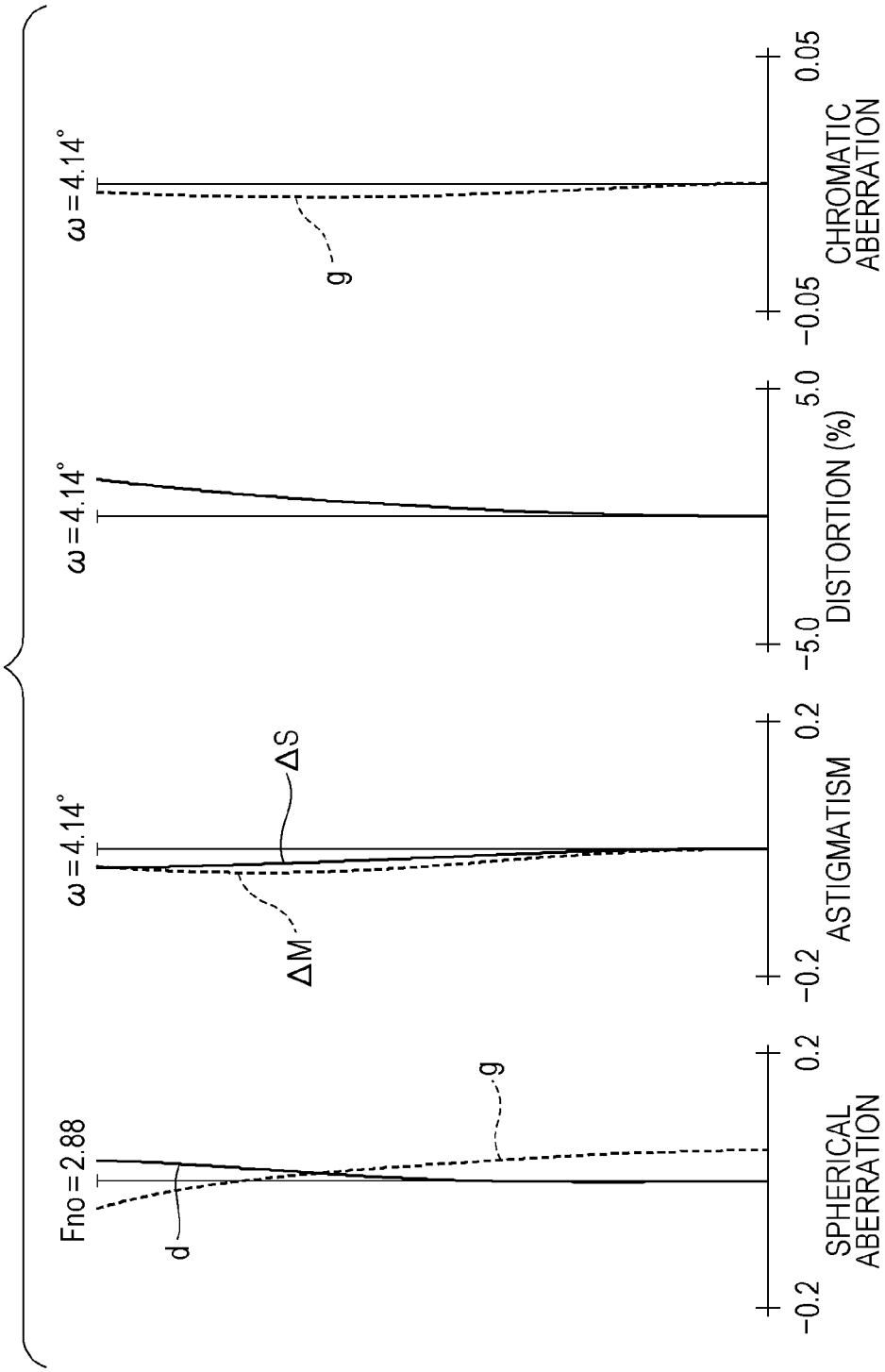

FIG. 1 is a cross-sectional view of lenses of a zoom lens according to Embodiment 1 of the invention at a wide-angle end (end of short focal length). FIGS. 2A, 2B, and 2C are aberration charts of the zoom lens according to Embodiment 1 at the wide-angle end, an intermediate zoom position, and a telephoto end (end of long focal length), respectively. FIG. 3 is a cross-sectional view of lenses of a zoom lens according to Embodiment 2 of the invention at a wide-angle end, and FIGS. 4A, 4B, and 4C are aberration charts of the zoom lens according to Embodiment 2 at the wide-angle end, an intermediate zoom position, and a telephoto end, respectively.

Figure 5:
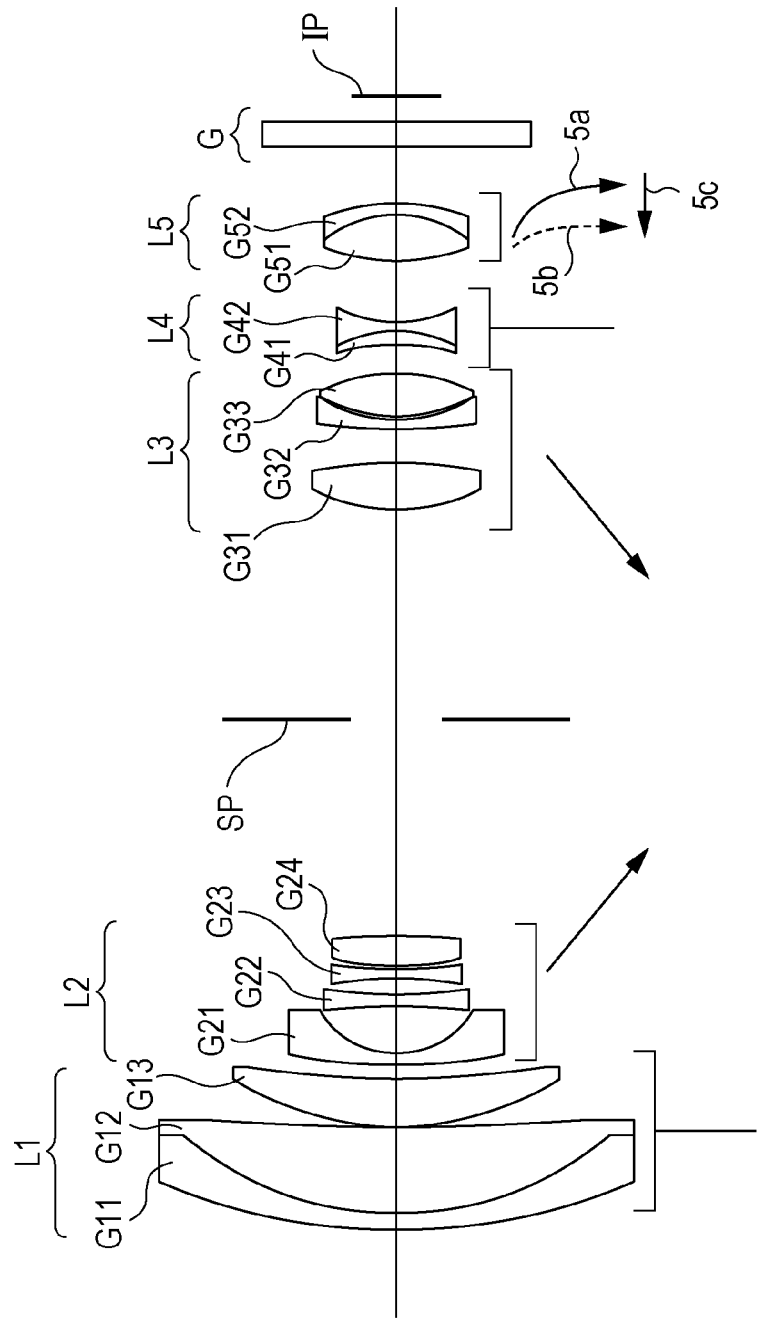
FIG. 5 is a cross-sectional view of lenses of a zoom lens at a wide-angle end according to Embodiment 3.

FIG. 5 is a cross-sectional view of lenses of a zoom lens according to Embodiment 3 of the invention at a wide-angle end, and FIGS. 6A, 6B, and 6C are aberration charts of the zoom lens according to Embodiment 3 at the wide-angle end, an intermediate zoom position, and a telephoto end, respectively. FIG. 7 is a cross-sectional view of lenses of a zoom lens according to Embodiment 4 of the invention at a wide-angle end, and FIGS. 8A, 8B, and 8C are aberration charts of the zoom lens according to Embodiment 4 at the wide-angle end, an intermediate zoom position, and a telephoto end, respectively.

Figure 11:
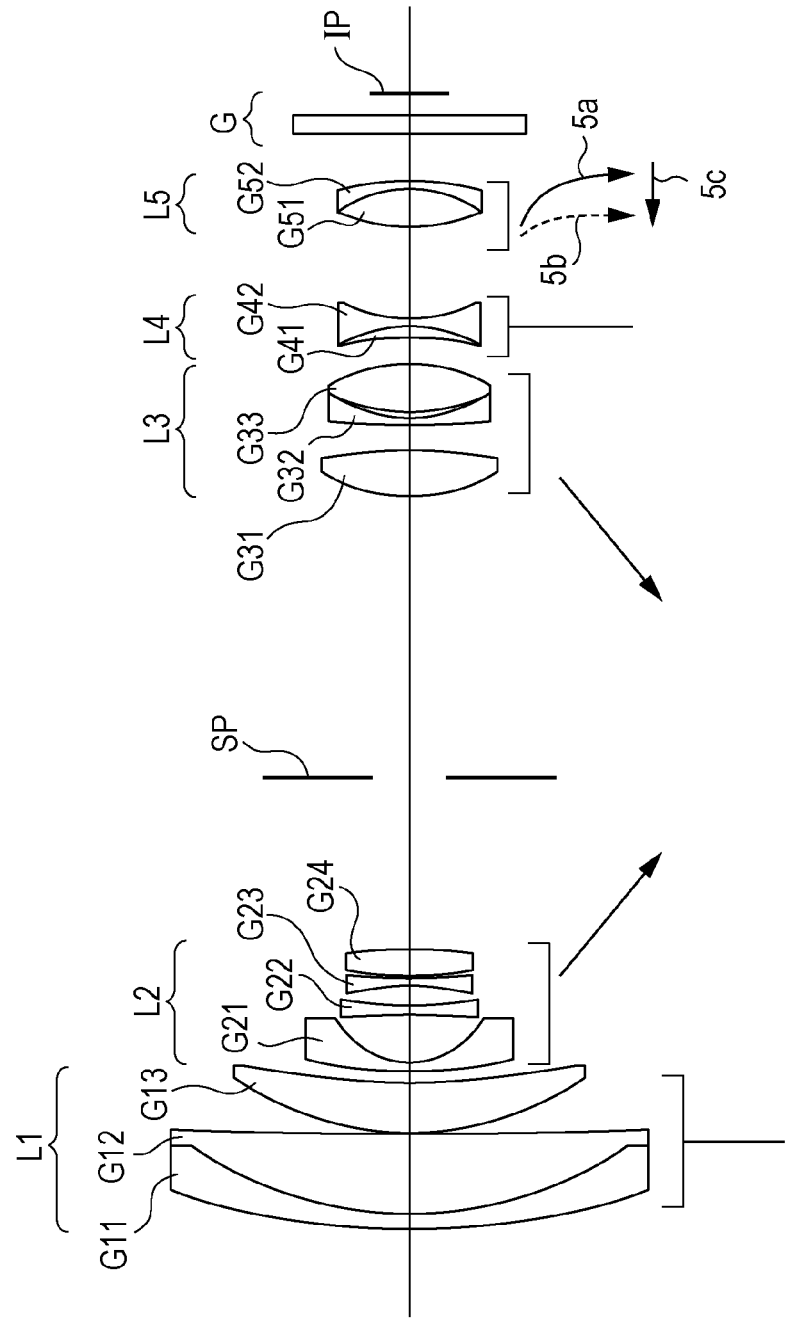
FIG. 11 is a cross-sectional view of lenses of a zoom lens at a wide-angle end according to Embodiment 6.
Figure 12B:
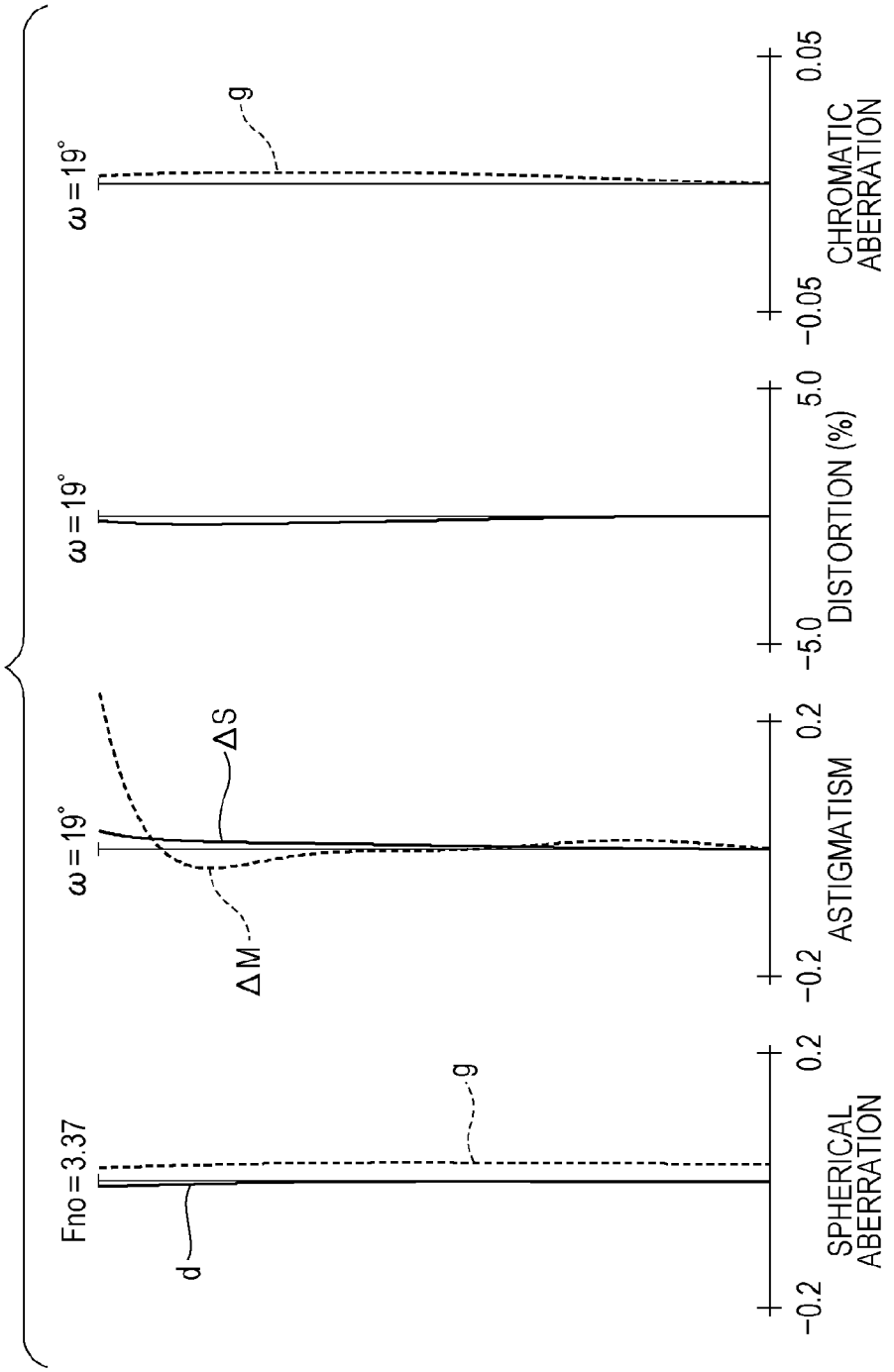

FIG. 9 is a cross-sectional view of lenses of a zoom lens according to Embodiment 5 of the invention at a wide-angle end, and FIGS. 10A, 10B, and 10C are aberration charts of the zoom lens according to Embodiment 5 at the wide-angle end, an intermediate zoom position, and a telephoto end, respectively. FIG. 11 is a cross-sectional view of lenses of a zoom lens according to Embodiment 6 of the invention at a wide-angle end, and FIGS. 12A, 12B, and 12C are aberration charts of the zoom lens according to Embodiment 6 at the wide-angle end, an intermediate zoom position, and a telephoto end, respectively.

Figure 15:
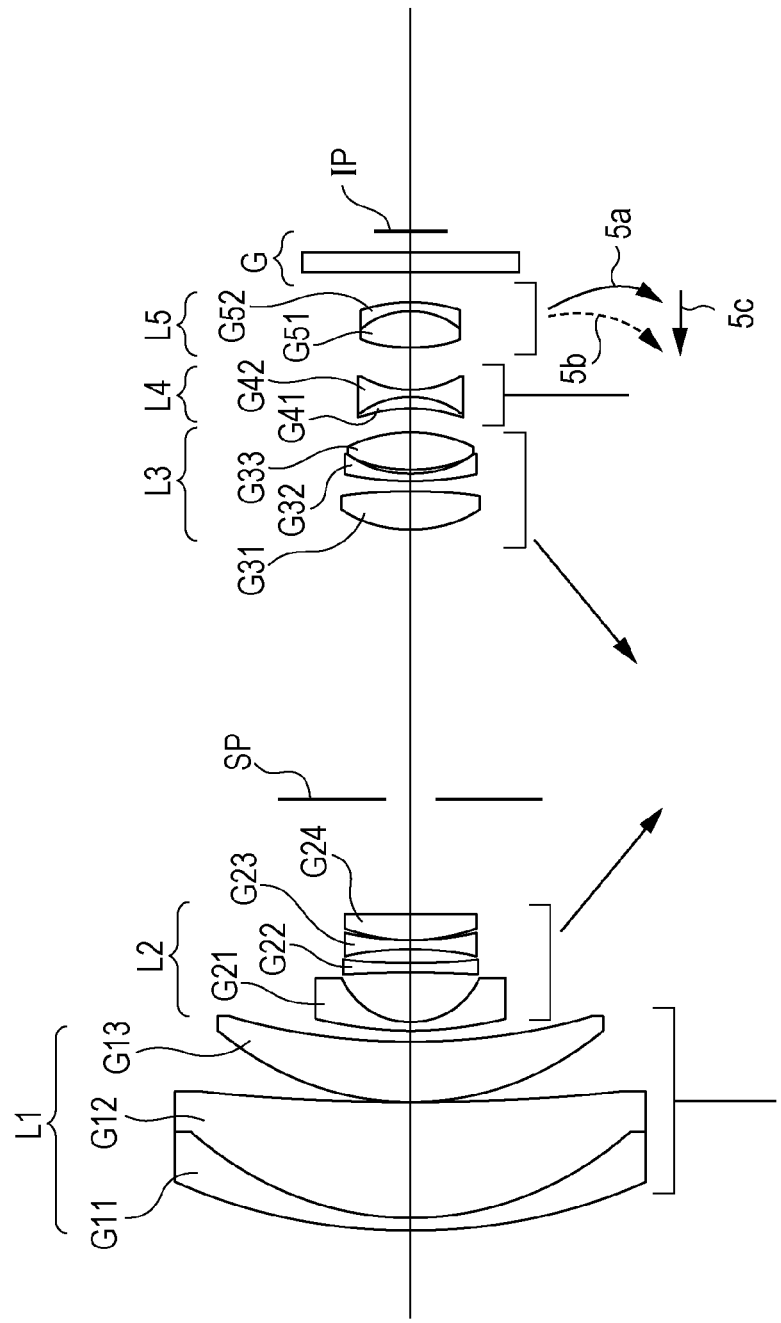
FIG. 15 is a cross-sectional view of lenses of a zoom lens at a wide-angle end according to Embodiment 8.

FIG. 13 is a cross-sectional view of lenses of a zoom lens according to Embodiment 7 of the invention at a wide-angle end, and FIGS. 14A, 14B, and 14C are aberration charts of the zoom lens according to Embodiment 7 at the wide-angle end, an intermediate zoom position, and a telephoto end, respectively. FIG. 15 is a cross-sectional view of lenses of a zoom lens according to Embodiment 8 of the invention at a wide-angle end, and FIGS. 16A, 16B, and 16C are aberration charts of the zoom lens according to Embodiment 8 at the wide-angle end, an intermediate zoom position, and a telephoto end, respectively.

Figure 17:
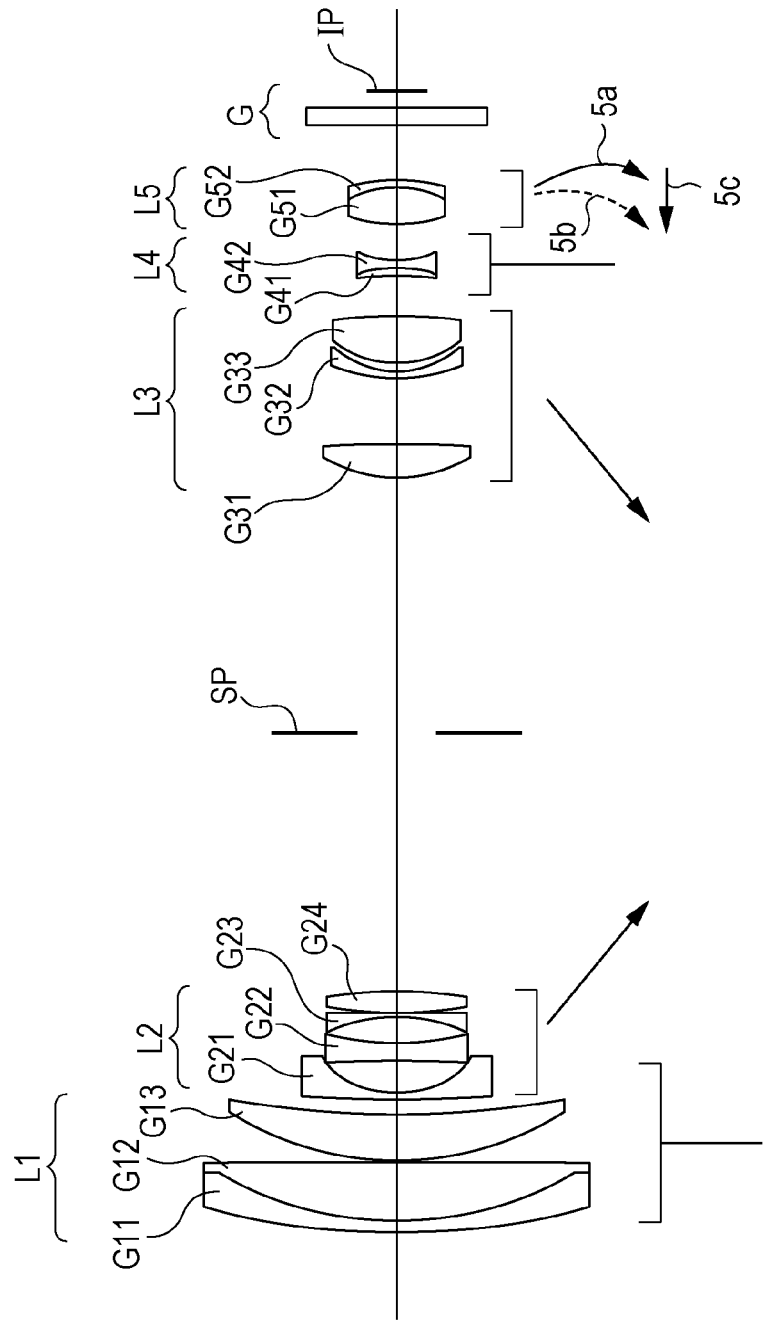
FIG. 17 is a cross-sectional view of lenses of a zoom lens at a wide-angle end according to Embodiment 9.
Figure 19:
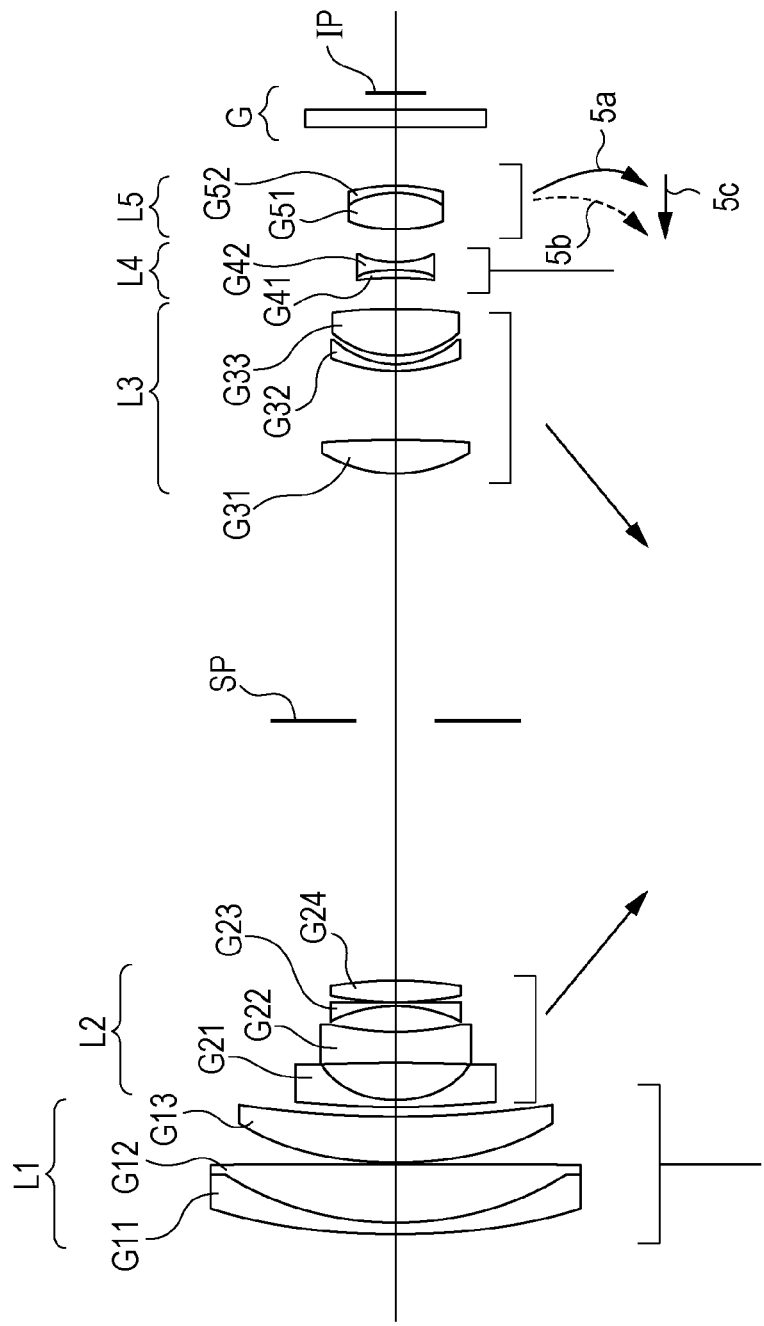
FIG. 19 is a cross-sectional view of lenses of a zoom lens at a wide-angle end according to Embodiment 10.
Figure 21:
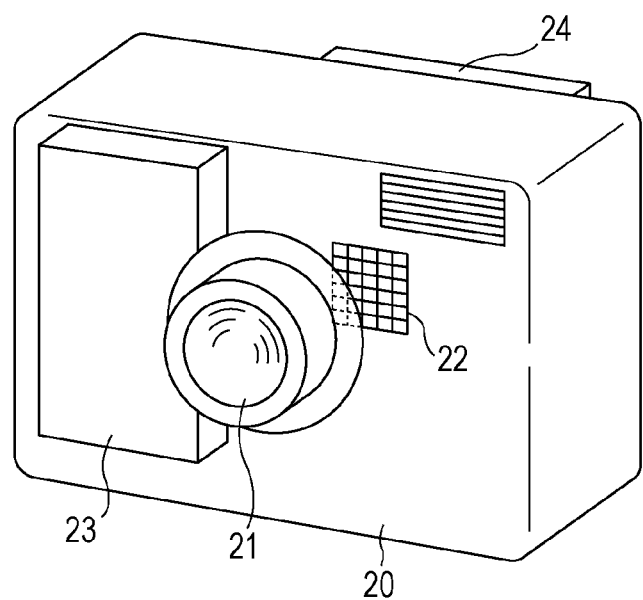
FIG. 21 is a schematic drawing showing a principal portion of an image pickup apparatus according to the invention.

FIG. 17 is a cross-sectional view of lenses of a zoom lens according to Embodiment 9 of the invention at a wide-angle end, and FIGS. 18A, 18B, and 18C are aberration charts of the zoom lens according to Embodiment 9 at the wide-angle end, an intermediate zoom position, and a telephoto end, respectively. FIG. 19 is a cross-sectional view of lenses of a zoom lens according to Embodiment 10 of the invention at a wide-angle end, and FIGS. 20A, 20B, and 20C are aberration charts of the zoom lens according to Embodiment 10 at the wide-angle end, an intermediate zoom position, and a telephoto end, respectively. FIG. 21 is a schematic drawing showing a principal portion of an image pickup apparatus according to the invention.

The zoom lenses according to respective embodiments are an image pickup optical system used in the image pickup apparatus such as video camera, digital cameras, monitoring cameras, TV cameras, and the like. In a cross-sectional view of the lenses, the left side is a side on which an object to be photographed is (an object side (front side)) and the right side is an image side (rear side).

In the cross-sectional view of the lens, L1 denotes a first lens unit having a positive refractive power (optical power=inverse of focal length), L2 denotes a second lens unit having a negative refractive power, and L3 denotes a third lens view having a positive refractive power, L4 denotes a fourth lens unit having a negative refractive power, and L5 denotes a fifth lens unit having a positive refractive power.

In the cross-sectional views of the lenses in the respective embodiments, reference symbol SP denotes an aperture stop which determines an optical flux of a release F number, and is located on the object side of the third lens unit L3. Reference symbol G denotes an optical block corresponding to an optical filter, a face plate, and so on. Reference symbol IP corresponds to an image plane of a solid-state image pickup element (photoelectric conversion element) such as a CCD sensor or a CMOS sensor when used as a photographic optical system such as a video camera, or a digital still camera. Alternatively, IP corresponds to a film plane when used as an image pickup optical system of a camera using a silver-halide film.

In the aberration charts, Fno denotes an F number, and w denotes a half angle of view (degrees). A line d (solid line) and a line g (dot line) are illustrated in the case of a spherical aberration, a meridional image plane ΔM and a sagittal image plane ΔS of the line d are illustrated in the case of astigmatism, a line d is illustrated in the case of distortion aberration, and the line g and the line d are illustrated in the case of lateral chromatic aberration.

In the cross-sectional views of the lenses, arrows indicate movement loci of respective lens units at the time of zooming from the wide-angle end to the telephoto end and the directions of movement when focusing from an object at infinity to a near object. The terms "wide-angle end" and "telephoto end" in the respective embodiments described below refer to zoom positions at which a zoom lens unit (second lens unit) is located at both extremities of a movable range on the optical axis of the mechanism.

In the respective examples, at the time of zooming from the wide-angle end to the telephoto end, zooming is performed by moving the second lens unit L2 toward the image and moving the third lens unit L3 toward the object to be photographed as indicated by an arrow. Also, in Embodiments 1 and 2 and 7 to 10, image plane variations in association with the zooming are corrected by moving the fifth lens unit L5 toward the image along the convex locus. In Embodiments 3 to 6, the image plane variations caused by the zooming are corrected by moving the fifth lens unit L5 toward the image non-linearly.

Also, a rear-focusing technique in which the fifth lens unit L5 is moved on the optical axis for focusing is employed. A solid curved line 5a and a broken curved line 5b relating to the fifth lens unit L5 are movement loci for correcting the image plane variations caused by zooming when focusing on an object at infinity and a near object, respectively.

When focusing from the object at infinity to the near object at the telephoto end, the fifth lens unit L5 is moved forward as indicated by an arrow 5c. Also, at the time of shooting, the shaking of the shooting image when the zoom lens is vibrated is corrected by moving the entirety or part of the fourth lens unit L4 so as to have a component in the vertical direction with respect to the optical axis. In other words, image stabilization is achieved.

The aperture stop SP is fixed or moves independently from other lens units at the time of zooming. When moving the aperture stop SP at the time of zooming, the aperture stop SP is moved toward the photographic object from the wide-angle end to an intermediate position of zooming, and then moved toward the image plane from the intermediate position of zooming to the telephoto end. With movement performed in this manner, the space between the second lens unit L2 and the third lens unit L3 can be utilized effectively, so that a reduction over the entire length of the lenses and a reduction in the size of the front lens effective diameter are facilitated.

The zoom lenses of the respective embodiments are the five-unit zoom lens including the first to fifth lens units having positive, negative, positive, negative, and positive refractive powers in order from the object side to the image side. In the respective embodiments, a high optical performance is obtained at a wide angle of view and a high zoom ratio over the entire zoom range by setting the powers (refractive powers) of the respective lens units and the amounts of movement of the second and third lens units at the time of zooming appropriately.

In the respective embodiments, the amount of movement of the second lens unit in the zooming from the wide-angle end to the telephoto end is represented by M2. The amount of movement of the third lens unit in the zooming from the wide-angle end to the telephoto end is represented by M3. At this time, the conditional expression:

$$0.2<|M2/M3|<5.0 \quad (1)$$

is satisfied.

Alternatively, the focal length of the entire system at the wide-angle end is expressed by fw. At this time, the conditional expression:

$$0.6<M3/fw<10.0 \quad (2)$$

is satisfied.

The sign of the amount of movement of the lens unit is positive when the lens unit is positioned on the object side at the telephoto end and negative when the lens unit is positioned on the image side with respect to the wide-angle end. The amount of movement of the lens unit at the time of zooming from the wide-angle end to the telephoto end is the distance between the position of the lens unit at the wide-angle end and the position of the lens unit at the telephoto end in the direction of the optical axis.

The conditional expression (1) relates to the ratio of the amount of movement of the second lens unit L2 to the amount of movement of the third lens unit L3. When the amount of movement of the second lens unit L2 becomes excessively large with respect to the amount of movement of the third lens unit L3 beyond the upper limit value of the conditional expression (1), the entire lens length and the front lens effective diameter are increased, which is not desirable. If the amount of movement of the second lens unit L2 is smaller than the amount of movement of the third lens unit L3 beyond the lower limit value, a reduction of fluctuations of the longitudinal chromatic aberration at the telephoto end and of the field curvature over the entire zoom range becomes difficult. The range of the numerical values of the conditional expression (1) is preferably set as follows.

$$0.5<|M2/M3|<3.5 \quad (1a)$$

By setting within the range of the conditional expression (1a), the amount of movement of the second lens unit L2 can be set with respect to the amount of movement of the third lens unit L3, and thus the reduction of the fluctuations of longitudinal chromatic aberration at the telephoto end and of the field curvature over the entire zoom range is achieved further effectively. Also, fluctuations of astigmatism, coma aberration, and field curvature over the entire zoom range can easily be reduced.

The conditional expression (2) relates to the ratio of the amount of movement of the third lens unit L3 to the focal length of the entire system at the wide-angle end and is an expression for obtaining a zoom lens for which the entire system is compact and which has a desirable optical performance, the zoom lens having a wide angle of view relating to the ratio of the amount of movement of the third lens unit L3 to the focal length of the entire system at the wide-angle end. If the amount of movement of the third lens unit L3 becomes excessively large beyond the upper end value of the conditional expression (2), the reduction of the fluctuations of the astigmatism, the coma aberration, and the field curvature becomes difficult. If the value is lowered beyond the lower limit value, the amount of movement of the second lens unit L2 becomes excessively large, and thus the front lens diameter is increased, which is not desirable. It is further preferable to set the range of the numerical value of the conditional expression (2) as shown below.

$$1.2 < M3/fw < 5.5 \quad (2a)$$

By setting the value within the range of the conditional expression (2a), the amount of movement of the third lens unit L3 can be set adequately, and thus the fluctuations of astigmatism, coma aberration, and field curvature over the entire zoom range can easily be corrected. Also, an increase over the entire lens length and the front lens effective diameter can easily be inhibited.

In the respective embodiments, with the configuration as described above, a zoom lens for which the entire system is compact and having a wide angle of view and a high zoom ratio, and in addition, having various aberrations corrected over the entire zooming range is obtained.

In the respective embodiments, in order to maintain a high zoom ratio and obtain a higher optical performance, at least one of the following conditional expressions is to be satisfied.

Focal lengths of the first lens unit L1, the second lens unit L2, the third lens unit L3, and the fourth lens unit L4 are denoted by f1, f2, f3, and f4, respectively. The focal length of the entire system at the telephoto end is denoted by ft. The fourth lens unit L4 is formed of a cemented lens having a positive lens and a negative lens cemented to each other, and the focal lengths of the positive lens and the negative lens when the cemented lens is separated are denoted, respectively, by f4p and f4n.

The lateral magnifications of the second lens unit L2 at the wide-angle end and the telephoto end are denoted by β2w and β2t, and the lateral magnifications of the third lens unit L3 at the wide-angle end and the telephoto end are denoted by β3w and β3t. The zoom ratio is denoted by Z. Here, the zoom ratio Z is $$Z = ft/fw.$$

The effective length of the diagonal line of the image pickup element when the zoom lenses of the respective embodiments are applied to the image pickup element is denoted by 2Y'. At this time, preferably, at least one of the following conditional expressions is satisfied.

$$5.0 < f1/fw < 16.0 \quad (3)$$

$$1.0 < |f2/fw| < 4.0 \quad (4)$$

$$0.1 < (\beta 2t/(\beta 2w)/(\beta 3t/(\beta 3w) < 2.5 \quad (5)$$

$$-10.0 < f4p/f4n < -1.0 \quad (6)$$

$$-10.0 < f4/ft < -0.1 \quad (7)$$

$$0.0 < (M3/f3)/Z < 0.5 \quad (8)$$

$$-0.8 < \beta 2w < -0.1 \quad (9)$$

$$1.0 < f1/f3 < 6.0 \quad (10)$$

$$-8.0 < |M2|/f2 < -1.0 \quad (11)$$

$$0.3 < Y'/fw < 1.0 \quad (12)$$

Subsequently, the technical meanings of the respective conditional expressions will be described. The conditional expression (3) relates to the ratio of the focal length of the first lens unit L1 to the focal length of the entire system at the wide-angle end.

If the values exceed the upper limit value of the conditional expression (3), and the focal length of the first lens unit L1 becomes excessively large, correction of the aberration can be achieved easily, but the entire lens length and the front lens effective diameter are increased correspondingly. If the value is lowered beyond the lower limit value, and the focal length of the first lens unit L1 becomes excessively small, correction of spherical aberration, longitudinal chromatic aberration, or coma aberration at the telephoto end becomes difficult. It is further preferable to set the range of the numerical value of the conditional expression (3) as shown below.

$$7.0 < f1/fw < 15.0 \quad (3a)$$

By setting the values in the range of the conditional expression (3a), the focal length of the first lens unit L1 is set to be a further adequate value, and thus an increase over the entire lens length and the front lens effective diameter can effectively be inhibited. At the telephoto end, spherical aberration, longitudinal chromatic aberration, and coma aberration can easily be corrected further appropriately.

The conditional expression (4) relates to the ratio of the focal length of the first lens unit L1 to the focal length at the wide-angle end. If the values exceed the upper limit value of the conditional expression (4), and the focal length of the second lens unit L2 becomes excessively large, and the entire lens length and the front lens effective diameter are increased correspondingly. If the value is lowered beyond the lower limit value, the refractive power of the second lens unit L2 becomes excessively high, and the reduction of the fluctuations of the astigmatism, coma aberration, the field curvature becomes difficult. It is further preferable to set the conditional expression (4) as shown below.

$$1.4 < |f2/fw| < 2.0 \quad (4a)$$

By setting the values in the range of the conditional expression (4a), the focal length of the second lens unit L2 is set to be a further adequate value, and thus an increase over the entire lens length and the front lens effective diameter can effectively be inhibited. The fluctuations of astigmatism, coma aberration, and field curvature over the entire zoom area can also be corrected further adequately.

The conditional expression (5) here is for setting the share of zooming ratio allocated to the second lens unit L2 and the share of zooming ratio allocated to the third lens unit L3 adequately, and correcting the various aberrations over the entire zoom range. If the values exceed the upper limit values of the conditional expression (5), the share of zooming ratio allocated to the second lens unit L2 becomes excessively large, and thus the reduction of the fluctuations of astigmatism, coma aberration, and field curvature becomes difficult. If the value is lowered beyond the lower limit value, the share of zooming ratio allocated to the third lens unit L3 becomes excessively large, and thus the entire lens length and the front lens effective diameter are increased correspondingly. It is further preferable to set the range of the numerical values of the conditional expression (5) as shown below.

$$0.4 < (\beta 2t/\beta 2w)/(\beta 3t/\beta 3w) < 2.0 \quad (5a)$$

By setting the value within the range of the conditional expression (5a), the share of zooming ratio allocated to the third lens unit L2 can be set adequately, and thus further desirable correction of fluctuations of astigmatism, coma aberration, and field curvature over the entire zoom range is achieved. Also, an increase in the entire lens length and the front lens effective diameter can effectively be inhibited.

The conditional expression (6) relates to the focal length ratio of the respective focal lengths (the focal lengths in the air) when the positive lens and the negative lens which constitutes the cemented lens in the fourth lens unit L4 are separated. If the value exceeds the upper limit value of the conditional expression (6), the refractive power of the positive lens becomes excessively low and fluctuations of chromatic aberration at the time of decentering are increased, so that the correction of the chromatic aberration becomes difficult. If the value is lowered beyond the lower limit value, the refractive power of the positive lens becomes excessively high, and thus the correction of various aberrations such as coma aberration at the telephoto end becomes difficult. It is further preferable to set the range of the numerical values of the conditional expression (6) as shown below.

$$-5.0 < f4p/f4n < -1.5 \quad (6a)$$

By setting the value in the range of the conditional expression (6a), the refractive power of the positive lens becomes more adequate, and the fluctuations of the chromatic aberration at the time of decentering are reduced, whereby the correction of the chromatic aberration is achieved. Also, further desirable correction of the various aberrations such as the coma aberration can easily be achieved at the telephoto end.

The conditional expression (7) relates to the ratio of the focal length of the fourth lens unit L4 to the focal length of the entire system at the telephoto end. If the value exceeds the upper end value of the conditional expression (7), the refractive power of the fourth lens unit L4 becomes excessively high, and thus the correction of the various aberrations such as the coma aberration at the telephoto end becomes difficult. If the value is lowered beyond the lower limit value, when the fourth lens unit L4 is set as the image stabilization lens unit, the refractive power of the fourth lens unit L4 becomes too weak, and thus the sensitivity for the image stabilization is lowered, and the movement stroke for the image stabilization (image change) is increased. Consequently, the diameter of the fourth lens unit L4 is increased, and thus the entire lens length and the front lens effective diameter are increased correspondingly. It is further preferable to set the range of the numerical values of the conditional expression (7) as shown below.

$$-8.0 < |f4/ft| < -0.2 \quad (7a)$$

By setting the value in the range of the conditional expression (7a), the fourth lens unit becomes more adequate, and further desirable correction of the various aberrations such as coma aberration at the telephoto end is achieved. Also, an increase over the entire lens length and the front lens effective diameter can effectively be inhibited.

The conditional expression (8) here sets the amount of movement of the third lens unit L3. If the amount of movement of the third lens unit L3 becomes excessively large and beyond the upper end value of the conditional expression (9), the reduction of the fluctuations of astigmatism, coma aberration, and field curvature become difficult. Also, if the amount of movement of the third lens unit L3 is lowered beyond the lower limit value, the front lens effective diameter is increased, which is not desirable. It is further preferable to set the range of the numerical values of the conditional expression (8) as shown below.

$$0.0 < (M3/f3)/Z < 0.2 \quad (8a)$$

By setting the value within the range of the conditional expression (8a), the amount of movement of the third lens unit L3 can be set adequately, and thus astigmatism, coma aberration, and further desirable correction of the fluctuations of field curvature over the entire zoom range is achieved. Also, an increase in the front lens effective diameter can effectively be inhibited.

The conditional expression (9) relates to the lateral magnification of the second lens unit L2 at the wide-angle end. If the lateral magnification of the second lens unit L2 exceeds the upper limit values of the conditional expression (9), a reduction of change of the field curvature in zooming operation becomes difficult. Also, if the lateral magnification of the second lens unit L2 is lowered beyond the lower limit value, the amount of movement at the time of zooming is increased, and thus the reduction in the size of the entire system becomes difficult. It is further preferable to set the range of the numerical values of the conditional expression (9) as shown below.

$$-0.4 < \beta 2w < -0.1 \quad (9a)$$

By setting the value within the range of the conditional expression (9a), the lateral magnification of the second lens unit L2 can be set adequately, and thus the change of the field curvature in the zooming is achieved. Also, increase over the entire lens length and the front lens effective diameter can effectively be inhibited.

The conditional expression (10) relates to a power distribution of the first lens unit L1 and the third lens unit L3. If the value exceeds the upper limit value, the power of the first lens unit L1 becomes too weak, and the amount of movement of the zoom lens unit is increased in order to achieve a predetermined zoom ratio, so that the entire lens length and the front lens effective diameter are increased correspondingly. If the value is lowered beyond the lower limit value, the power of the first lens unit L1 becomes excessively high, and thus the correction of various aberrations such as the spherical aberration at the telephoto end becomes difficult. It is further preferable to set the range of the numerical values of the conditional expression (10) as shown below.

$$2.0 < f1/f3 < 5.0 \quad (10a)$$

By setting the values in the range of the conditional expression (10a), the power of the first lens unit L1 is set to be a further adequate value, and thus increase over the entire lens length and the front lens effective diameter can effectively be reduced. Also, desirable correction of the various aberrations such as the spherical aberration can be achieved at the telephoto end.

The conditional expression (11) relates to the ratio of the amount of movement of the second lens unit L2 to the focal length of the second lens unit L2. If the value exceeds the upper limit value of the conditional expression (11), and the amount of movement of the second lens unit L2 becomes excessively large, and the entire lens length and the front lens effective diameter are increased correspondingly. If the value is lowered beyond the lower limit value, the amount of movement of the second lens unit L2 at the time of zooming becomes too small, and thus the amount of movement of the third lens group L3 must be increased in order to obtain a predetermined zooming ratio, and hence the entire lens length and the front lens effective diameter are increased correspondingly. It is further preferable to set the range of the numerical values of the conditional expression (11) as shown below.

$$-4.0 < |M2/f2| < -2.0 \quad (11a)$$

By setting the values in the range of the conditional expression (11a), the amount of movement of the second lens unit L2 is set to be a further adequate value, and thus increase over the entire lens length and the front lens effective diameter can effectively be reduced.

By setting the value within the range of the conditional expression (12), further desirable correction of the fluctuations of the astigmatism, the coma aberration, and further desirable correction of the field curvature over the entire zoom range is achieved. Also, increase in the entire length and the front lens effective diameter can easily be inhibited. It is further preferable to set the range of the numerical value of the conditional expression (12) as shown below.

$$0.6 < Y'/fw \leq 0.9 \quad (12a)$$

In the respective embodiments, with the configuration as described above, the reduction in the size of the entire system having a wide angle of view is achieved, whereby a zoom lens having desirable optical performance over the entire zoom range from the wide-angle end to the telephoto end and over general object distance from the object at infinity to the near object is obtained. For example, the chromatic aberration or the field curvature is corrected over the entire zoom range from the wide-angle end to the telephoto end while achieving the wide angle of view. Also, high an optical performance corresponding to high-pixel values in association with the increase in image size is achieved, and a higher resolution power is obtained in a high-frequency area.

Subsequently, preferred configuration in the respective embodiments other than those described above will be described. In the respective embodiments, the aperture stop arranged between the second lens unit L2 and the third lens unit L3 is moved toward the image at the time of the zooming from a wide-angle end to a telephoto end.

Also, the third lens unit L3 is moved toward the object at the time of zooming from the wide-angle end to the telephoto end. The second lens unit L2 includes a negative lens, a negative lens, a negative lens, and a positive lens in order from the object side toward the image side. The third lens unit L3 includes a positive lens, a negative lens, and a positive lens in order from the object side toward the image side.

When the zoom lenses in the respective embodiments are applied to the image pickup apparatus, the correction of the distortion aberration from among the various aberrations may be corrected by an electric image processing.

As described above, according to the respective embodiments, a zoom lens having a wide shooting angle of view of at least 60°, a high zoom ratio on the order of 20 times the zoom ratio, for which the entire system is compact, and having a high optical performance over the entire zoom range from the wide-angle end to the telephoto end and over the entire focus range from the distance to object at infinity to the distance to near object is obtained.

Subsequently, referring now to FIG. 21, an Embodiment of a digital steel camera having the zoom lens according to the invention used as a photographic optical system will be described.

In FIG. 21, reference numeral 20 denotes a video camera body, and reference numeral 21 denotes a photographic optical system including one of the zoom lenses described in Embodiments 1 to 10. Reference numeral 22 denotes a solid-state image pickup element (photoelectric conversion element) such as a CCD sensor or a CMOS sensor which is integrated in the camera body and receives an object image formed by the photographic optical system 21. Reference numeral 23 denotes a memory configured to record information corresponding to the object image having been subjected to photoelectric conversion 22. Reference numeral 24 is composed of a liquid crystal display panel or the like, and is a finder for observing the object image formed on the light sources 22.

The zoom lens according to the invention may be applied to a video camera (image pickup apparatus) used as a photographic optical system.

By applying the zoom lens in the invention to an image pickup apparatus such as a digital still camera or a video camera, a compact image pickup apparatus having high optical performance is realized. In the respective embodiments, a significant negative distortion is generated in the vicinity of the wide-angle end, and the image pickup range of the solid-state image pickup element is set to a range smaller than other zoom positions. The obtained image information may be output as an image with little distortion by electrically correcting the distortion by a signal processing circuit which processes the image data of the solid-state image pickup element.

Numerical Examples corresponding to the respective embodiments of the invention will be shown below. In the respective numerical examples, the symbol i denotes the order of the optical surface from the object side. The symbol ri denotes the radius of curvature of the $i^{th}$ optical surface, the symbol di denotes the ith surface distance, the symbols ndi and vdi denote an index of refraction and the Abbe number of the material of the optical member with respect to the d line. The back focus (BF) is a value of the distance from the final surface of the lens to the near axial image surface subjected to air conversion. The entire lens length is a value of the distance from the front most surface of the lens to the last surface of the lens added with a back focus (BF).

Last two surfaces in the numerical example are surfaces of the optical block such as a filter, a face plate, and the like. The unit of length is millimeter (mm). When K is an eccentricity, A4, A6, and A8 are coefficient of aspherical surface, and x is a displacement in the direction of the optical axis at the position of a height H from the optical axis with reference to a surface apex, the aspherical shape is expressed by $$X = \frac{(1/R)H^2}{1 + \sqrt{1-(1+K)(H/R)^2}} + A4H^4 + A6H^6 + A8H^8$$

where R is a radius of curvature. Also, for example, the indication "e-Z" means "$10^{-z}$". Also, the correspondence with respect to the above-described conditional expressions in the respective numerical value embodiments will be shown in Table 1. A half angle of view is a value obtained by a light-beam trace.

The aspherical surface is shown with asterisk (*) added after the surface numbers. The aperture stop SP and the glass block G are indicated as individual groups. Accordingly, in the respective embodiments, seven units are included. The relation between the above-described respective conditional expressions and the various numerical values in the numerical value examples will be shown in Table 1.

Numerical Example 1

Plane Data

| Plane Number | r | d | nd | vd |
|---|---|---|---|---|
| 1 | 51.977 | 1.30 | 1.84666 | 23.8 |
| 2 | 26.388 | 5.64 | 1.51633 | 64.1 |
| 3 | 574.024 | 0.15 | | |
| 4 | 27.403 | 3.42 | 1.80400 | 46.6 |
| 5 | 107.773 | (Variable) | | |
| 6 | 76.775 | 0.90 | 1.88300 | 40.8 |
| 7 | 7.936 | 3.07 | | |
| 8 | 185.260 | 0.90 | 1.83481 | 42.7 |
| 9 | 21.631 | 1.92 | | |
| 10 | −19.663 | 0.80 | 1.83481 | 42.7 |
| 11 | −347.805 | 0.15 | | |
| 12 | 28.445 | 2.36 | 1.94595 | 18.0 |
| 13 | −65.380 | (Variable) | | |
| 14 (Aperture) | ∞ | (Variable) | | |
| 15* | 12.632 | 4.02 | 1.58313 | 59.4 |
| 16* | −45.714 | 3.18 | | |
| 17 | 27.376 | 0.80 | 1.84666 | 23.8 |
| 18 | 9.481 | 0.68 | | |
| 19 | 10.918 | 3.74 | 1.48749 | 70.2 |
| 20 | −16.949 | (Variable) | | |
| 21 | −22.202 | 1.20 | 1.84666 | 23.8 |
| 22 | −10.504 | 0.70 | 1.58313 | 59.4 |
| 23* | 17.241 | (Variable) | | |
| 24 | 18.707 | 3.25 | 1.71300 | 53.9 |
| 25 | −11.247 | 0.80 | 1.94595 | 18.0 |
| 26 | −24.849 | (Variable) | | |
| 27 | ∞ | 1.94 | 1.51633 | 64.1 |
| 28 | ∞ | 1.99 | | |
| Image Plane | ∞ | | | |

Aspherical Surface Data

15th surface

K = −1.81913e−002   A4 = −2.86139e−005
A6 = 3.12186e−007   A8 = 1.15908e−009

16th surface

K = 0.00000e+000   A4 = 9.85637e−005
A6 = 3.76346e−007

23rd surface

K = 0.00000e+000   A4 = 5.53659e−005
A6 = −1.69511e−007

Various Data
Zoom Ratio 9.57

| | Wide Angle | Intermediate | Zoom |
|---|---|---|---|
| Focal Length | 5.01 | 25.30 | 47.93 |
| F number | 1.85 | 2.62 | 2.88 |
| Angle of View | 34.72 | 7.82 | 4.14 |
| Image Height | 3.47 | 3.47 | 3.47 |
| Total Length of Lenses | 88.34 | 88.34 | 88.34 |
| BF | 8.19 | 8.19 | 8.19 |
| d 5 | 1.02 | 16.10 | 21.40 |
| d13 | 19.18 | 6.40 | 2.68 |
| d14 | 14.49 | 4.77 | 2.35 |
| d20 | 2.30 | 9.72 | 10.57 |
| d23 | 4.20 | 7.24 | 6.44 |
| d26 | 4.92 | 1.89 | 2.68 |

Data on Zoom Lens Group

| Group | Start Plane | Focal Length |
|---|---|---|
| 1 | 1 | 40.35 |
| 2 | 6 | −8.07 |
| 3 | 14 | ∞ |
| 4 | 15 | 15.62 |
| 5 | 21 | −21.15 |
| 6 | 24 | 18.55 |
| 7 | 27 | ∞ |

Numerical Example 2

Plane Data

| Plane Number | r | d | nd | vd |
|---|---|---|---|---|
| 1 | 51.363 | 1.30 | 1.84666 | 23.8 |
| 2 | 26.876 | 5.48 | 1.51633 | 64.1 |
| 3 | 373.456 | 0.15 | | |
| 4 | 28.350 | 3.36 | 1.80400 | 46.6 |
| 5 | 113.030 | (Variable) | | |
| 6 | 75.075 | 0.90 | 1.88300 | 40.8 |
| 7 | 8.266 | 3.32 | | |
| 8 | −355.074 | 0.90 | 1.83481 | 42.7 |
| 9 | 23.046 | 1.99 | | |
| 10 | −20.217 | 0.80 | 1.83481 | 42.7 |
| 11 | −80.125 | 0.15 | | |
| 12 | 30.788 | 2.37 | 1.94595 | 18.0 |
| 13 | −72.122 | (Variable) | | |
| 14 (Aperture) | ∞ | (Variable) | | |
| 15* | 11.494 | 3.76 | 1.58313 | 59.4 |
| 16* | −52.395 | 2.63 | | |
| 17 | 31.034 | 0.80 | 1.84666 | 23.8 |
| 18 | 9.854 | 0.43 | | |
| 19 | 12.493 | 3.37 | 1.48749 | 70.2 |
| 20 | −19.215 | (Variable) | | |
| 21 | −22.257 | 1.19 | 1.84666 | 23.8 |
| 22 | −10.479 | 0.70 | 1.58313 | 59.4 |
| 23* | 24.967 | (Variable) | | |
| 24 | 20.603 | 3.09 | 1.71300 | 53.9 |
| 25 | −11.529 | 0.80 | 1.94595 | 18.0 |
| 26 | −26.770 | (Variable) | | |
| 27 | ∞ | 1.94 | 1.51633 | 64.1 |
| 28 | ∞ | 1.98 | | |
| Image Plane | ∞ | | | |

Aspherical Surface Data

15th surface

K = −7.03409e−002   A4 = −4.17196e−005
A6 = 1.25612e−007   A8 = 1.28813e−010

16th surface

K = 0.00000e+000   A4 = 8.50250e−005
A6 = 1.35345e−007

23rd surface

K = 0.00000e+000   A4 = 5.64705e−005
A6 = −3.00301e−007

Various Data
Zoom Ratio 9.53

| | Wide Angle | Intermediate | Zoom |
|---|---|---|---|
| Focal Length | 5.01 | 24.22 | 47.75 |
| F number | 1.85 | 2.62 | 2.88 |
| Angle of View | 34.72 | 8.16 | 4.16 |
| Image Height | 3.47 | 3.47 | 3.47 |
| Total Length of Lenses | 88.63 | 88.63 | 88.63 |
| BF | 8.37 | 5.11 | 8.19 |
| d 5 | 1.00 | 15.99 | 21.40 |
| d13 | 19.09 | 6.26 | 2.68 |
| d14 | 16.20 | 6.25 | 2.35 |
| d20 | 2.30 | 10.08 | 10.57 |

-continued

| | | | |
|---|---|---|---|
| d23 | 4.20 | 7.46 | 6.44 |
| d26 | 5.11 | 1.84 | 2.68 |

Data on Zoom Lens Group

| Group | Start Plane | Focal Length |
|---|---|---|
| 1 | 1 | 41.57 |
| 2 | 6 | −8.57 |
| 3 | 14 | ∞ |
| 4 | 15 | 16.11 |
| 5 | 21 | −27.53 |
| 6 | 24 | 20.59 |
| 7 | 27 | ∞ |

Numerical Example 3

Plane Data

| Plane Number | r | d | nd | vd |
|---|---|---|---|---|
| 1 | 48.994 | 1.30 | 1.84666 | 23.8 |
| 2 | 25.651 | 6.99 | 1.51633 | 64.1 |
| 3 | 198.766 | 0.15 | | |
| 4 | 25.180 | 3.75 | 1.80400 | 46.6 |
| 5 | 79.348 | (Variable) | | |
| 6 | 43.437 | 0.90 | 1.88300 | 40.8 |
| 7 | 6.990 | 3.91 | | |
| 8 | −44.516 | 0.90 | 1.83481 | 42.7 |
| 9 | 50.833 | 1.31 | | |
| 10 | −25.066 | 0.80 | 1.83481 | 42.7 |
| 11 | 46.783 | 0.15 | | |
| 12 | 23.694 | 2.41 | 1.94595 | 18.0 |
| 13 | −76.150 | (Variable) | | |
| 14 (Aperture) | ∞ | (Variable) | | |
| 15* | 13.921 | 3.73 | 1.58313 | 59.4 |
| 16* | −25.124 | 2.68 | | |
| 17 | 41.073 | 0.80 | 1.84666 | 23.8 |
| 18 | 11.433 | 0.19 | | |
| 19 | 12.399 | 3.44 | 1.48749 | 70.2 |
| 20 | −13.946 | (Variable) | | |
| 21 | −18.249 | 1.13 | 1.84666 | 23.8 |
| 22 | −9.454 | 0.70 | 1.58313 | 59.4 |
| 23* | 10.505 | (Variable) | | |
| 24 | 15.363 | 3.80 | 1.71300 | 53.9 |
| 25 | −8.848 | 0.80 | 1.94595 | 18.0 |
| 26 | −17.508 | (Variable) | | |
| 27 | ∞ | 1.94 | 1.51633 | 64.1 |
| 28 | ∞ | 1.97 | | |
| Image Plane | ∞ | | | |

Aspherical Surface Data

15th surface

K = −4.140449e−001  A4 = −3.68984e−005
A6 = 5.18126e−007  A8 = −1.71153e−010

16th surface

K = 0.00000e+000  A4 = 1.23695e−004
A6 = 3.46411e−007

23rd surface

K = 0.00000e+000  A4 = 4.29614e−005
A6 = −1.03306e−006

Various Data
Zoom Ratio 9.58

| | Wide Angle | Intermediate | Zoom |
|---|---|---|---|
| Focal Length | 4.20 | 16.34 | 40.22 |
| F number | 1.85 | 2.62 | 2.88 |
| Angle of View | 39.58 | 11.99 | 4.93 |

-continued

| | | | |
|---|---|---|---|
| Image Height | 3.47 | 3.47 | 3.47 |
| Total Length of Lenses | 89.86 | 89.86 | 88.86 |
| BF | 7.89 | 5.21 | 5.19 |
| d 5 | 1.00 | 14.64 | 19.43 |
| d13 | 17.23 | 5.79 | 2.50 |
| d14 | 16.79 | 9.64 | 2.50 |
| d20 | 2.30 | 7.25 | 12.89 |
| d23 | 4.82 | 7.49 | 7.51 |
| d26 | 4.64 | 1.96 | 1.94 |

Data on Zoom Lens Group

| Group | Start Plane | Focal Length |
|---|---|---|
| 1 | 1 | 42.00 |
| 2 | 6 | −6.88 |
| 3 | 14 | ∞ |
| 4 | 15 | 13.63 |
| 5 | 21 | −13.29 |
| 6 | 24 | 14.13 |
| 7 | 27 | ∞ |

Numerical Example 4

Plane Data

| Plane Number | r | d | nd | vd |
|---|---|---|---|---|
| 1 | 54.943 | 1.30 | 1.84666 | 23.8 |
| 2 | 28.403 | 6.56 | 1.51633 | 64.1 |
| 3 | 5458.963 | 0.15 | | |
| 4 | 28.888 | 6.63 | 1.80400 | 46.6 |
| 5 | 121.639 | (Variable) | | |
| 6 | 223.127 | 0.90 | 1.88300 | 40.8 |
| 7 | 8.532 | 2.88 | | |
| 8 | 321.652 | 0.90 | 1.83481 | 42.7 |
| 9 | 35.177 | 1.70 | | |
| 10 | −20.286 | 0.80 | 1.83481 | 42.7 |
| 11 | 69.172 | 0.15 | | |
| 12 | 27.272 | 2.51 | 1.94595 | 18.0 |
| 13 | −60.198 | (Variable) | | |
| 14 (Aperture) | ∞ | (Variable) | | |
| 15* | 12.522 | 3.86 | 1.58313 | 59.4 |
| 16* | −47.133 | 2.45 | | |
| 17 | 43.029 | 0.80 | 1.84666 | 23.8 |
| 18 | 11.492 | 0.46 | | |
| 19 | 14.538 | 3.78 | 1.48749 | 70.2 |
| 20 | −18.246 | (Variable) | | |
| 21 | −23.746 | 1.51 | 1.84666 | 23.8 |
| 22 | −10.973 | 2.55 | 1.58313 | 59.4 |
| 23* | 47.410 | (Variable) | | |
| 24 | 30.958 | 2.93 | 1.71300 | 53.9 |
| 25 | −11.279 | 0.80 | 1.94595 | 18.0 |
| 26 | −25.336 | (Variable) | | |
| 27 | ∞ | 1.94 | 1.51633 | 64.1 |
| 28 | ∞ | 1.98 | | |
| Image Plane | ∞ | | | |

Aspherical Surface Data

15th surface

K = −3.19676e−001  A4 = −2.61669e−005
A6 = 2.08299e−007  A8 = 3.81647e−010

16th surface

K = 0.00000e+000  A4 = 7.06333e−005
A6 = 1.12784e−007

23rd surface

K = 0.00000e+000  A4 = 6.25383e−005
A6 = −1.53421e−007

Various Data
Zoom Ratio 9.57

|  | Wide Angle | Intermediate | Zoom |
|---|---|---|---|
| Focal Length | 5.66 | 20.00 | 54.22 |
| F number | 1.85 | 2.62 | 2.88 |
| Angle of View | 31.51 | 9.85 | 3.66 |
| Image Height | 3.47 | 3.47 | 3.47 |
| Total Length of Lenses | 95.82 | 95.82 | 95.82 |
| BF | 8.18 | 6.11 | 5.23 |
| d 5 | 1.20 | 13.29 | 17.52 |
| d13 | 15.12 | 5.24 | 2.50 |
| d14 | 20.38 | 12.56 | 2.50 |
| d20 | 2.33 | 7.95 | 16.51 |
| d23 | 4.98 | 7.05 | 7.94 |
| d26 | 4.92 | 2.85 | 1.97 |

Data on Zoom Lens Group

| Group | Start Plane | Focal Length |
|---|---|---|
| 1 | 1 | 39.71 |
| 2 | 6 | −8.06 |
| 3 | 14 | ∞ |
| 4 | 15 | 16.91 |
| 5 | 21 | −42.00 |
| 6 | 24 | 25.64 |
| 7 | 27 | ∞ |

Numerical Example 5

Plane Data

| Plane Number | r | d | nd | vd |
|---|---|---|---|---|
| 1 | 53.988 | 1.30 | 1.84666 | 23.8 |
| 2 | 27.921 | 7.21 | 1.51633 | 64.1 |
| 3 | 58650.511 | 0.15 | | |
| 4 | 26.274 | 4.10 | 1.80400 | 46.6 |
| 5 | 92.993 | (Variable) | | |
| 6 | 108.709 | 0.90 | 1.88300 | 40.8 |
| 7 | 8.733 | 3.67 | | |
| 8 | −255.028 | 0.90 | 1.83481 | 42.7 |
| 9 | 31.082 | 2.03 | | |
| 10 | −20.217 | 0.80 | 1.83481 | 42.7 |
| 11 | 143.249 | 0.15 | | |
| 12 | 34.787 | 2.58 | 1.94595 | 18.0 |
| 13 | −47.845 | (Variable) | | |
| 14 (Aperture) | ∞ | (Variable) | | |
| 15* | 13.587 | 3.86 | 1.58313 | 59.4 |
| 16* | −130.486 | 2.58 | | |
| 17 | 30.426 | 0.83 | 1.84666 | 23.8 |
| 18 | 11.592 | 0.37 | | |
| 19 | 13.977 | 3.46 | 1.48749 | 70.2 |
| 20 | −24.643 | (Variable) | | |
| 21 | −31.192 | 1.17 | 1.84666 | 23.8 |
| 22 | −13.690 | 0.70 | 1.58313 | 59.4 |
| 23* | 26.776 | (Variable) | | |
| 24 | 24.699 | 3.26 | 1.71300 | 53.9 |
| 25 | −12.504 | 0.80 | 1.94595 | 18.0 |
| 26 | −25.293 | (Variable) | | |
| 27 | ∞ | 1.94 | 1.51633 | 64.1 |
| 28 | ∞ | 1.98 | | |
| Image Plane | ∞ | | | |

Aspherical Surface Data

15th surface
K = 2.12743e−001  A4 = −2.89364e−005
A6 = 3.60505e−008  A8 = −4.99977e−010

16th surface
K = 0.00000e+000  A4 = 5.19800e−005
A6 = 1.29888e−007

23rd surface
K = 0.00000e+000  A4 = 4.81034e−005
A6 = −5.23276e−008

Various Data
Zoom Ratio 14.95

|  | Wide Angle | Intermediate | Zoom |
|---|---|---|---|
| Focal Length | 5.01 | 20.71 | 74.89 |
| F number | 1.85 | 3.29 | 3.80 |
| Angle of View | 34.72 | 9.52 | 2.65 |
| Image Height | 3.47 | 3.47 | 3.47 |
| Total Length of Lenses | 108.31 | 108.31 | 108.31 |
| BF | 10.28 | 5.40 | 5.27 |
| d 5 | 1.32 | 13.81 | 18.20 |
| d13 | 15.68 | 5.39 | 2.50 |
| d14 | 28.77 | 19.24 | 2.50 |
| d20 | 2.30 | 9.63 | 24.87 |
| d23 | 9.14 | 14.02 | 14.15 |
| d26 | 7.02 | 2.14 | 2.01 |

Data on Zoom Lens Group

| Group | Start Plane | Focal Length |
|---|---|---|
| 1 | 1 | 38.58 |
| 2 | 6 | −8.00 |
| 3 | 14 | ∞ |
| 4 | 15 | 18.98 |
| 5 | 21 | −33.57 |
| 6 | 24 | 21.54 |
| 7 | 27 | ∞ |

Numerical Example 6

Plane Data

| Plane Number | r | d | nd | vd |
|---|---|---|---|---|
| 1 | 68.778 | 1.30 | 1.84666 | 23.8 |
| 2 | 33.445 | 7.25 | 1.51633 | 64.1 |
| 3 | 364.781 | 0.15 | | |
| 4 | 27.177 | 4.52 | 1.80400 | 46.6 |
| 5 | 75.983 | (Variable) | | |
| 6 | 40.721 | 0.90 | 1.88300 | 40.8 |
| 7 | 7.468 | 4.19 | | |
| 8 | −84.784 | 0.90 | 1.83481 | 42.7 |
| 9 | 30.882 | 1.72 | | |
| 10 | −21.404 | 0.80 | 1.83481 | 42.7 |
| 11 | 47.855 | 0.15 | | |
| 12 | 25.992 | 2.44 | 1.94595 | 18.0 |
| 13 | −59.415 | (Variable) | | |
| 14 (Aperture) | ∞ | (Variable) | | |
| 15* | 14.110 | 4.18 | 1.58313 | 59.4 |
| 16* | −27.514 | 2.25 | | |
| 17 | 63.696 | 0.80 | 1.84666 | 23.8 |
| 18 | 13.233 | 0.44 | | |

-continued

| | | | | |
|---|---|---|---|---|
| 19 | 15.794 | 4.37 | 1.48749 | 70.2 |
| 20 | −14.870 | (Variable) | | |
| 21 | −25.983 | 1.10 | 1.84666 | 23.8 |
| 22 | −11.548 | 0.70 | 1.58313 | 59.4 |
| 23* | 13.430 | (Variable) | | |
| 24 | 15.449 | 3.49 | 1.71300 | 53.9 |
| 25 | −10.281 | 0.80 | 1.94595 | 18.0 |
| 26 | −23.843 | (Variable) | | |
| 27 | ∞ | 1.94 | 1.51633 | 64.1 |
| 28 | ∞ | 1.97 | | |
| Image Plane | ∞ | | | |

Aspherical Surface Data

15th surface

K = −4.00925e−001          A4 = −3.30097e−005
A6 = 3.59850e−007          A8 = −3.12207e−010

16th surface

K = 0.00000e+000           A4 = 1.01427e−004
A6 = 2.01032e−007

23rd surface

K = 0.00000e+000           A4 = 5.10380e−005
A6 = −3.13574e−007

Various Data
Zoom Ratio 9.58

| | Wide Angle | Intermediate | Zoom |
|---|---|---|---|
| Focal Length | 3.86 | 10.09 | 36.97 |
| F number | 1.85 | 3.37 | 3.90 |
| Angle of View | 41.97 | 18.99 | 5.37 |
| Image Height | 3.47 | 3.47 | 3.47 |
| Total Length of Lenses | 102.07 | 102.07 | 102.07 |
| BF | 7.21 | 5.37 | 5.19 |
| d 5 | 1.00 | 13.34 | 17.68 |
| d13 | 15.48 | 5.34 | 2.50 |
| d14 | 25.39 | 19.54 | 2.50 |
| d20 | 2.30 | 5.95 | 21.49 |
| d23 | 8.25 | 10.09 | 10.27 |
| d26 | 3.96 | 2.12 | 1.94 |

Data on Zoom Lens Group

| Group | Start Plane | Focal Length |
|---|---|---|
| 1 | 1 | 48.69 |
| 2 | 6 | −6.84 |
| 3 | 14 | ∞ |
| 4 | 15 | 15.40 |
| 5 | 21 | −18.60 |
| 6 | 24 | 16.35 |
| 7 | 27 | ∞ |

Numerical Example 7

Plane Data

| Plane Number | r | d | nd | vd |
|---|---|---|---|---|
| 1 | 55.115 | 1.30 | 1.84666 | 23.8 |
| 2 | 30.093 | 9.13 | 1.51633 | 64.1 |
| 3 | 187.836 | 0.15 | | |
| 4 | 28.677 | 5.19 | 1.80400 | 46.6 |
| 5 | 73.020 | (Variable) | | |
| 6 | 36.407 | 0.90 | 1.88300 | 40.8 |
| 7 | 7.304 | 4.91 | | |
| 8 | −34.621 | 0.90 | 1.83481 | 42.7 |
| 9 | 50.385 | 1.35 | | |
| 10 | −29.980 | 0.80 | 1.83481 | 42.7 |

-continued

| | | | | |
|---|---|---|---|---|
| 11 | 45.916 | 0.15 | | |
| 12 | 25.186 | 2.55 | 1.94595 | 18.0 |
| 13 | −67.699 | (Variable) | | |
| 14 (Aperture) | ∞ | (Variable) | | |
| 15* | 11.699 | 3.68 | 1.58313 | 59.4 |
| 16* | −28.834 | 1.94 | | |
| 17 | 31.961 | 0.80 | 1.84666 | 23.8 |
| 18 | 10.100 | 0.27 | | |
| 19 | 11.748 | 3.16 | 1.48749 | 70.2 |
| 20 | −15.931 | (Variable) | | |
| 21 | −17.523 | 1.12 | 1.84666 | 23.8 |
| 22 | −9.116 | 0.70 | 1.58313 | 59.4 |
| 23* | 10.415 | (Variable) | | |
| 24 | 15.309 | 3.62 | 1.71300 | 53.9 |
| 25 | −8.585 | 0.80 | 1.94595 | 18.0 |
| 26 | −17.227 | (Variable) | | |
| 27 | ∞ | 1.94 | 1.51633 | 64.1 |
| 28 | ∞ | 1.98 | | |
| Image Plane | ∞ | | | |

Aspherical Surface Data

15th surface

K = −4.00338e−001          A4 = −3.45955e−005
A6= 3.34057e−007           A8 = 1.48183e−009

16th surface

K = 0.00000e+000           A4 = 1.33183e−004
A6 = 5.38554e−008

23rd surface

K = 0.0000e+000            A4 = 1.51739e−005
A6 = −6.25274e−007

Various Data
Zoom Ratio 9.59

| | Wide Angle | Intermediate | Zoom |
|---|---|---|---|
| Focal Length | 3.86 | 15.60 | 37.00 |
| F number | 1.85 | 2.62 | 2.88 |
| Angle of View | 41.97 | 12.55 | 5.36 |
| Image Height | 3.47 | 3.47 | 3.47 |
| Total Length of Lenses | 96.27 | 96.27 | 96.27 |
| d 5 | 1.00 | 18.33 | 24.41 |
| d13 | 11.41 | 2.50 | 2.50 |
| d14 | 26.66 | 13.59 | 2.50 |
| d20 | 2.30 | 6.95 | 11.95 |
| d23 | 4.20 | 6.30 | 4.93 |
| d26 | 4.04 | 1.94 | 3.31 |

Data on Zoom Lens Group

| Group | Start Plane | Focal Length |
|---|---|---|
| 1 | 1 | 52.23 |
| 2 | 6 | −7.24 |
| 3 | 14 | ∞ |
| 4 | 15 | 13.33 |
| 5 | 21 | −13.05 |
| 6 | 24 | 14.06 |
| 7 | 27 | ∞ |

Numerical Example 8

Plane Data

| Plane Number | r | d | nd | vd |
|---|---|---|---|---|
| 1 | 56.002 | 1.30 | 1.84666 | 23.8 |
| 2 | 31.018 | 11.30 | 1.51633 | 64.1 |
| 3 | 192.795 | 0.15 | | |

-continued

| | | | | |
|---|---|---|---|---|
| 4 | 29.173 | 5.82 | 1.80400 | 46.6 |
| 5 | 66.131 | (Variable) | | |
| 6 | 35.011 | 0.90 | 1.88300 | 40.8 |
| 7 | 7.446 | 4.83 | | |
| 8 | −70.659 | 0.90 | 1.83481 | 42.7 |
| 9 | 81.457 | 1.31 | | |
| 10 | −26.953 | 0.80 | 1.83481 | 42.7 |
| 11 | 25.058 | 0.15 | | |
| 12 | 19.421 | 2.53 | 1.94595 | 18.0 |
| 13 | −474.630 | (Variable) | | |
| 14 (Aperture) | ∞ | (Variable) | | |
| 15* | 11.488 | 3.82 | 1.58313 | 59.4 |
| 16* | −25.828 | 0.93 | | |
| 17 | 30.289 | 0.80 | 1.84666 | 23.8 |
| 18 | 10.635 | 0.29 | | |
| 19 | 12.236 | 3.68 | 1.48749 | 70.2 |
| 20 | −13.369 | (Variable) | | |
| 21 | −16.699 | 1.16 | 1.84666 | 23.8 |
| 22 | −8.640 | 0.70 | 1.58313 | 59.4 |
| 23* | 9.165 | (Variable) | | |
| 24 | 17.024 | 3.53 | 1.71300 | 53.9 |
| 25 | −7.025 | 0.80 | 1.94595 | 18.0 |
| 26 | −15.590 | (Variable) | | |
| 27 | ∞ | 1.94 | 1.51633 | 64.1 |
| 28 | ∞ | 1.97 | | |
| Image Plane | ∞ | | | |

Aspherical Surface Data

15th surface

K = −4.34835e−001  A4 = −5.15260e−005
A6= 9.86032e−007  A8 = 7.72593e−010

16th surface

K = 0.00000e+000  A4 = 1.85355e−004
A6 = 7.28392e−007

23rd surface

K = 0.00000e+000  A4 = −4.92787e−005
A6 = −2.53334e−006

Various Data
Zoom Ratio 9.70

| | Wide Angle | Intermediate | Zoom |
|---|---|---|---|
| Focal Length | 3.86 | 14.77 | 37.44 |
| F number | 1.85 | 2.70 | 3.00 |
| Angle of View | 41.97 | 13.23 | 5.30 |
| Image Height | 3.47 | 3.47 | 3.47 |
| Total Length of Lenses | 96.94 | 96.94 | 96.94 |
| BF | 6.26 | 4.88 | 5.06 |
| d 5 | 1.04 | 19.30 | 25.74 |
| d13 | 11.11 | 2.94 | 2.58 |
| d14 | 26.32 | 12.89 | 2.31 |
| d20 | 2.30 | 5.66 | 10.15 |
| d23 | 4.20 | 5.58 | 5.41 |
| d26 | 3.01 | 1.63 | 1.81 |

Data on Zoom Lens Group

| Group | Start Plane | Focal Length |
|---|---|---|
| 1 | 1 | 56.04 |
| 2 | 6 | −6.99 |
| 3 | 14 | ∞ |
| 4 | 15 | 11.85 |
| 5 | 21 | −11.71 |
| 6 | 24 | 14.98 |
| 7 | 27 | ∞ |

Numerical Example 9

Plane Data

| Plane Number | r | d | nd | vd |
|---|---|---|---|---|
| 1 | 93.362 | 1.30 | 1.94177 | 25.4 |
| 2 | 41.935 | 6.88 | 1.72434 | 54.8 |
| 3 | −1192.784 | 0.15 | | |
| 4 | 37.154 | 5.40 | 1.69940 | 55.7 |
| 5 | 117.418 | (Variable) | | |
| 6 | 220.304 | 0.90 | 1.86931 | 35.4 |
| 7 | 11.468 | 3.57 | | |
| 8 | −239.892 | 2.20 | 1.73111 | 54.4 |
| 9 | 34.189 | 2.94 | | |
| 10 | −19.645 | 0.43 | 1.69887 | 55.8 |
| 11 | 169.169 | 0.15 | | |
| 12 | 47.736 | 2.49 | 1.94589 | 18.0 |
| 13 | −52.727 | (Variable) | | |
| 14 (Aperture) | ∞ | (Variable) | | |
| 15* | 16.200 | 3.99 | 1.49025 | 68.1 |
| 16* | −113.188 | 7.76 | | |
| 17 | 20.460 | 0.80 | 1.85741 | 25.2 |
| 18 | 11.085 | 0.98 | | |
| 19 | 12.408 | 5.48 | 1.49389 | 69.7 |
| 20 | −57.977 | (Variable) | | |
| 21 | −75.361 | 0.87 | 1.84666 | 23.8 |
| 22 | −36.967 | 1.00 | 1.58313 | 59.4 |
| 23* | 14.003 | (Variable) | | |
| 24 | 16.706 | 4.35 | 1.69724 | 55.5 |
| 25 | −11.563 | 0.80 | 1.84666 | 23.8 |
| 26 | −23.506 | (Variable) | | |
| 27 | ∞ | 1.94 | 1.51633 | 64.1 |
| 28 | ∞ | 1.99 | | |
| Image Plane | ∞ | | | |

Aspherical Surface Data

15th surface

K = 6.57339e−002  A4 = −1.26997e−005
A6= 5.76578e−009  A8 = −9.11044e−011

16th surface

K = 0.00000e+000  A4 = 2.31453e−005
A6 = 2.8131e−008

23rd surface

K = 0.00000e+000  A4 = 467576e−005
A6 = −7.47059e−008

Various Data
Zoom Ratio 9.70

| | Wide Angle | Intermediate | Zoom |
|---|---|---|---|
| Focal Length | 5.01 | 27.84 | 100.01 |
| F number | 1.85 | 3.07 | 3.50 |
| Angle of View | 34.72 | 7.11 | 1.99 |
| Image Height | 3.47 | 3.47 | 3.47 |
| Total Length of Lenses | 132.88 | 132.88 | 132.88 |
| BF | 9.83 | 5.34 | 6.54 |
| d 5 | 1.73 | 22.36 | 29.61 |
| d13 | 30.27 | 9.64 | 2.38 |
| d14 | 29.76 | 18.47 | 2.50 |
| d20 | 4.65 | 15.95 | 31.92 |
| d23 | 4.20 | 8.69 | 7.49 |
| d26 | 6.55 | 2.07 | 3.26 |

Data on Zoom Lens Group

| Group | Start Plane | Focal Length |
|---|---|---|
| 1 | 1 | 54.07 |
| 2 | 6 | −9.79 |
| 3 | 14 | ∞ |
| 4 | 15 | 24.02 |

-continued

| | | |
|---|---|---|
| 5 | 21 | −21.72 |
| 6 | 24 | 16.16 |
| 7 | 27 | ∞ |

Numerical Example 10

Plane Data

| Plane Number | r | d | nd | νd |
|---|---|---|---|---|
| 1 | 81.746 | 1.30 | 1.99449 | 25.9 |
| 2 | 39.938 | 6.88 | 1.72201 | 54.9 |
| 3 | 666.310 | 0.15 | | |
| 4 | 37.594 | 5.70 | 1.72849 | 54.7 |
| 5 | 122.752 | (Variable) | | |
| 6 | 109.949 | 0.90 | 1.81209 | 40.2 |
| 7 | 11.262 | 4.13 | | |
| 8 | −571.700 | 4.00 | 1.68226 | 56.4 |
| 9 | 32.224 | 3.01 | | |
| 10 | −20.124 | 0.43 | 1.70971 | 55.4 |
| 11 | 130.050 | 0.15 | | |
| 12 | 46.000 | 2.43 | 1.94595 | 18.0 |
| 13 | −66.407 | (Variable) | | |
| 14 (Aperture) | ∞ | (Variable) | | |
| 15* | 16.616 | 4.13 | 1.48749 | 70.4 |
| 16* | −81.195 | 8.36 | | |
| 17 | 20.867 | 0.80 | 1.82118 | 24.8 |
| 18 | 11.026 | 1.00 | | |
| 19 | 12.283 | 5.51 | 1.48749 | 70.4 |
| 20 | −58.839 | (Variable) | | |
| 21 | −58.485 | 0.87 | 1.84666 | 23.8 |
| 22 | −31.732 | 1.00 | 1.58313 | 59.4 |
| 23* | 13.983 | (Variable) | | |
| 24 | 18.347 | 4.31 | 1.69680 | 55.5 |
| 25 | −12.215 | 0.80 | 1.84666 | 23.8 |
| 26 | −21.949 | (Variable) | | |
| 27 | ∞ | 1.94 | 1.51633 | 64.1 |
| 28 | ∞ | 1.99 | | |
| Image Plane | ∞ | | | |

Aspherical Surface Data

15th surface

K = 6.48279e−002  A4 = −1.28952e−005
A6 = 6.60944e−009  A8 = −7.46413e−011

16th surface

K = 0.00000e+000  A4 = 2.32717e−005
A6 = 2.26643e−008

23rd surface

K = 0.00000e+000  A4 = 4.65118e−005
A6 = 3.72789e−008

Various Data
Zoom Ratio 19.97

| | Wide Angle | Intermediate | Zoom |
|---|---|---|---|
| Focal Length | 5.01 | 28.03 | 100.05 |
| F number | 1.85 | 3.07 | 3.50 |
| Angle of View | 34.72 | 7.06 | 1.99 |
| Image Height | 3.47 | 3.47 | 3.47 |
| Total Length of Lenses | 136.97 | 132.15 | 136.06 |
| BF | 1.99 | 1.99 | 1.99 |
| d 5 | 1.11 | 22.49 | 30.00 |
| d13 | 31.34 | 9.96 | 2.45 |
| d14 | 29.66 | 15.55 | 2.50 |
| d20 | 3.55 | 17.66 | 30.71 |
| d23 | 4.20 | 4.76 | 7.19 |
| d26 | 7.30 | 1.92 | 3.40 |

Data on Zoom Lens Group

| Group | Start Plane | Focal Length |
|---|---|---|
| 1 | 1 | 56.07 |
| 2 | 6 | −9.82 |
| 3 | 14 | ∞ |
| 4 | 15 | 23.96 |
| 5 | 21 | −20.72 |
| 6 | 24 | 16.31 |
| 7 | 27 | ∞ |

TABLE 1

| | CONDITIONAL EXPRESSION | EMBODIMENT 1 | EMBODIMENT 2 | EMBODIMENT 3 | EMBODIMENT 4 | EMBODIMENT 5 |
|---|---|---|---|---|---|---|
| (1) | |M2/M3| | 2.47 | 2.03 | 1.74 | 1.15 | 0.75 |
| (2) | M3/fw | 1.65 | 1.99 | 2.52 | 2.50 | 4.51 |
| (3) | f1/fw | 8.05 | 8.30 | 10.00 | 7.01 | 7.70 |
| (4) | |f2/fw| | 1.61 | 1.71 | 1.64 | 1.42 | 1.60 |
| (5) | (β2t/β2w)/(β3t/β3w) | 1.88 | 1.58 | 0.95 | 1.13 | 0.94 |
| (6) | f4p/f4n | −2.03 | −1.78 | −2.60 | −1.52 | −1.81 |
| (7) | f4/ft | −0.44 | −0.58 | −0.33 | −0.77 | −0.45 |
| (8) | (M3/f3)/Z | 0.06 | 0.06 | 0.08 | 0.09 | 0.08 |
| (9) | β2w | −0.30 | −0.31 | −0.24 | −0.33 | −0.33 |
| (10) | f1/f3 | 2.58 | 2.58 | 3.08 | 2.35 | 2.03 |

TABLE 1-continued

| | | | | | | |
|---|---|---|---|---|---|---|
| (11) | $|M2|/f2$ | −2.52 | −2.36 | −2.68 | −2.02 | −2.11 |
| (12) | $Y'/fw$ | 0.69 | 0.69 | 0.83 | 0.61 | 0.69 |

| CONDITIONAL EXPRESSION | | EMBODIMENT 6 | EMBODIMENT 7 | EMBODIMENT 8 | EMBODIMENT 9 | EMBODIMENT 10 |
|---|---|---|---|---|---|---|
| (1) | $|M2/M3|$ | 0.87 | 2.43 | 3.15 | 1.02 | 1.06 |
| (2) | $M3/fw$ | 4.97 | 2.50 | 2.03 | 5.44 | 5.42 |
| (3) | $f1/fw$ | 12.61 | 13.53 | 14.52 | 10.79 | 11.19 |
| (4) | $|f2/fw|$ | 1.77 | 1.87 | 1.81 | 1.95 | 1.96 |
| (5) | $(\beta 2t/\beta 2w)/(\beta 3t/\beta 3w)$ | 0.43 | 0.86 | 0.84 | 1.26 | 1.24 |
| (6) | $f4p/f4n$ | −2.25 | −2.57 | −2.64 | −4.91 | −4.89 |
| (7) | $f4/ft$ | −0.50 | −0.35 | −0.31 | −0.22 | −0.21 |
| (8) | $(M3/f3)/Z$ | 0.13 | 0.08 | 0.07 | 0.06 | 0.06 |
| (9) | $\beta 2w$ | −0.20 | −0.20 | −0.18 | −0.27 | −0.27 |
| (10) | $f1/f3$ | 3.16 | 3.92 | 4.73 | 2.25 | 2.34 |
| (11) | $|M2|/f2$ | −2.44 | −3.24 | −3.53 | −2.85 | −2.94 |
| (12) | $Y'/fw$ | 0.90 | 0.90 | 0.90 | 0.69 | 0.69 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-149734 filed Jul. 6, 2011, which is hereby incorporated by reference herein in its entirety.

What is claimed is:

1. A zoom lens comprising in order from an object side to an image side:
   a first lens unit having a positive refractive power;
   a second lens unit having a negative refractive power;
   a third lens unit having a positive refractive power;
   a fourth lens unit having a negative refractive power; and
   a fifth lens unit having a positive refractive power, wherein
   the second lens unit and the third lens unit move so that the distance between the first lens unit and the second lens unit is increased and the distance between the second lens unit and the third lens unit is decreased at the time of zooming from a wide-angle end to a telephoto end,
   the first lens unit and the fourth lens unit are fixed for the zooming, and
   when M2 is the amount of movement of the second lens unit at the time of the zooming from the wide-angle end to the telephoto end, and M3 is the amount of movement of the third lens unit at the time of zooming from the wide-angle end to the telephoto end, the conditional expression;

$$0.2<|M2/M3|<5.0$$

is satisfied.

2. The zoom lens according to claim 1, wherein when f1 is a focal length of the first lens unit and fw is a focal length of the entire system at the wide-angle end, the conditional expression;

$$5.0<f1/fw<16.0$$

is satisfied.

3. The zoom lens according to claim 1, wherein when f2 is a focal length of the second lens unit and fw is a focal length of the entire system at the wide-angle end, the conditional expression;

$$1.0<|f2/fw|<4.0$$

is satisfied.

4. The zoom lens according to claim 1, wherein β2w and β2t are lateral magnifications of the second lens unit at the wide-angle end and the telephoto end, and β3w and β3t are the lateral magnifications of the third lens unit at the wide-angle end and the telephoto end, the conditional expression;

$$0.1<(\beta 2t/\beta 2w)/(\beta 3t\beta 3w)<2.5$$

is satisfied.

5. The zoom lens according to claim 1, wherein the fourth lens unit is formed of a cemented lens having a positive lens and a negative lens cemented to each other, and f4p and f4n are focal lengths of the positive lens and the negative lens when the cemented lens is separated, the conditional expression;

$$-10.0-f4p/f4n<-1.0$$

is satisfied.

6. The zoom lens according to claim 1, wherein when f4 is a focal length of the fourth lens unit and ft is a focal length of the entire system at the telephoto end, the conditional expression;

$$-10.0<f4/ft<-0.1$$

is satisfied.

7. The zoom lens according to claim 1, wherein when f3 is a focal length of the third lens unit, and Z is a zoom ratio of the zoom lens, the conditional expression;

$$0.0<(M3/f3)/Z<0.5$$

is satisfied.

8. The zoom lens according to claim 1, wherein when β2w is a lateral magnification at the wide-angle end of the second lens unit, the conditional expression;

$$-0.8<\beta 2w<-0.1$$

is satisfied.

9. The zoom lens according to claim 1, wherein f1, f3 are focal lengths of the first lens unit and the third lens unit, the conditional expression;

$$1.0<f1/f3<6.0$$

is satisfied.

10. The zoom lens according to claim 1, wherein when f2 is a focal length of the second lens unit, the conditional expression;

$$-8.0<|M2|/f2<-1.0$$

is satisfied.

11. An image pickup apparatus comprising:
a zoom lens comprising in order from an object side to an image side:
   a first lens unit having a positive refractive power;
   a second lens unit having a negative refractive power;
   a third lens unit having a positive refractive power;
   a fourth lens unit having a negative refractive power; and
   a fifth lens unit having a positive refractive power, wherein
   the second lens unit and the third lens unit move so that the distance between the first lens unit and the second lens unit is increased and the distance between the second lens unit and the third lens unit is decreased at the time of zooming from a wide- angle end to a telephoto end,
   the first lens unit and the fourth lens unit are fixed for the zooming, and
   when M2 is the amount of movement of the second lens unit at the time of the zooming from the wide-angle end to the telephoto end, and M3 is the amount of movement of the third lens unit at the time of zooming from the wide-angle end to the telephoto end, the conditional expression;

$$0.2<|M2/M3|<5.0$$

is satisfied; and
   an image pickup element configured to receive an image formed by the zoom lens.

12. The image pickup apparatus according to claim 11, wherein moving the entirety or part of the fourth lens unit reduces the effect of shaking of the image pickup apparatus.

13. The image pickup apparatus according to claim 11, wherein when 2Y' is the length of an effective diagonal line of the image pickup element and fw is a focal length of the entire system at the wide-angle end of the zoom lens, the conditional expression;

$$0.3<Y'/fw<1.0$$

is satisfied.

14. A zoom lens comprising in order from an object side to an image side:
   a first lens unit having a positive refractive power;
   a second lens unit having a negative refractive power;
   a third lens unit having a positive refractive power;
   a fourth lens unit having a negative refractive power; and
   a fifth lens unit having a positive refractive power, wherein
   the second lens unit and the third lens unit move so that the distance between the first lens unit and the second lens unit is increased and the distance between the second lens unit and the third lens unit is decreased at the time of zooming from the wide-angle end to the telephoto end
   the first lens unit and the fourth lens unit are fixed for the zooming,
   when M3 is an amount of movement of the third lens unit at the time of zooming from the wide-angle end and fw is a focal length of the entire system at the wide-angle end, the conditional expression:

$$0.6<M3/fw<10.0$$

is satisfied.

15. The image pickup apparatus comprising:
a zoom lens comprising in order from an object side to an image side:
   a first lens unit having a positive refractive power;
   a second lens unit having a negative refractive power;
   a third lens unit having a positive refractive power;
   a fourth lens unit having a negative refractive power; and
   a fifth lens unit having a positive refractive power, wherein
   the second lens unit and the third lens unit move so that the distance between the first lens unit and the second lens unit is increased and the distance between the second lens unit and the third lens unit is decreased at the time of zooming from the wide-angle end to the telephoto end
   the first lens unit and the fourth lens unit are fixed for the zooming,
   when M3 is an amount of movement of the third lens unit at the time of zooming from the wide-angle end and fw is a focal length of the entire system at the wide-angle end, the conditional expression:

$$0.6<M3/fw<10.0$$

is satisfied; and
   an image pickup element configured to receive an image formed by the zoom lens.

16. The image pickup apparatus according to claim 15, wherein when 2Y' is the length of an effective diagonal line of the image pickup element and fw is a focal length of the entire system at the wide-angle end of the zoom lens, the conditional expression $$0.3<Y'/fw<1.0$$

is satisfied.

17. The image pickup apparatus according to claim 15, wherein moving the entirety or part of the fourth lens unit reduces the effect of shaking of the image pickup apparatus.

* * * * *